US012619591B2

(12) United States Patent　(10) Patent No.:　US 12,619,591 B2

Reichinger et al.　(45) **Date of Patent:　*May 5, 2026**

(54) COMPACT PROBABILISTIC DATA STRUCTURE FOR STORING LOG DATA

(71) Applicant: Dynatrace LLC, Waltham, MA (US)

(72) Inventors: Julian Reichinger, Sankt Johann am Wimberg (AT); Renee Trisberg, Muraste (EE)

(73) Assignee: Dynatrace LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/768,401

(22) Filed: Jul. 10, 2024

(65) Prior Publication Data

US 2024/0370423 A1　Nov. 7, 2024

Related U.S. Application Data

(63) Continuation-in-part of application No. 18/383,031, filed on Oct. 23, 2023, which is a continuation-in-part of application No. 18/119,331, filed on Mar. 9, 2023, now Pat. No. 12,229,107.

(60) Provisional application No. 63/437,865, filed on Jan. 9, 2023.

(51) Int. Cl.
G06F 16/22　(2019.01)
(52) U.S. Cl.
CPC ................................. G06F 16/2255 (2019.01)
(58) Field of Classification Search
CPC ......................... G06F 16/2225; G06F 16/2255
USPC ......................................................... 707/747
See application file for complete search history.

(56) References Cited

U.S. PATENT DOCUMENTS

| | | |
|---|---|---|
| 10,853,359 B1 | 12/2020 | Waugh et al. |
| 2008/0275847 A1 | 11/2008 | Chellapilla et al. |
| 2010/0205364 A1 | 8/2010 | Gazit |
| 2013/0085999 A1 | 4/2013 | Tung et al. |
| 2016/0004769 A1 | 1/2016 | Gukal |
| 2017/0357710 A1 | 12/2017 | Shtossel et al. |
| 2017/0364700 A1 | 12/2017 | Goldfarb et al. |
| 2018/0152708 A1 | 5/2018 | George et al. |
| 2021/0075614 A1 | 3/2021 | Wang et al. |
| 2021/0194900 A1 | 6/2021 | Schmidtler et al. |
| 2023/0421365 A1 | 12/2023 | Wright et al. |

*Primary Examiner* — Muluemebet Gurmu
(74) *Attorney, Agent, or Firm* — Harness, Dickey & Pierce, P.L.C.

(57) ABSTRACT

A computer-implemented method is presented for storing log data generated in a distributed computing environment. The method includes: receiving a log line from a given storage entity; applying a first tokenization rule to create a plurality of base tokens; applying a second tokenization rule to create a plurality of combination tokens; applying a third tokenization rule to create a plurality of n-gram tokens; combining the plurality of tokens into a set of tokens; for each token in the set of tokens, storing a given token by applying a hash function to the given token to generate a hash value, where the given token is associated with the given storage entity containing the log line; updating a listing of entities with the given storage entity, where entries in the listing of entities are configured to identify more than one storage entity and each entry in the listing of entities specifies a unique set of storage entities; and storing the hash value, along with an address, in a token map table of a probabilistic data structure, where the address maps the hash value to an entry in the listing of entities.

10 Claims, 22 Drawing Sheets

Fig. 1

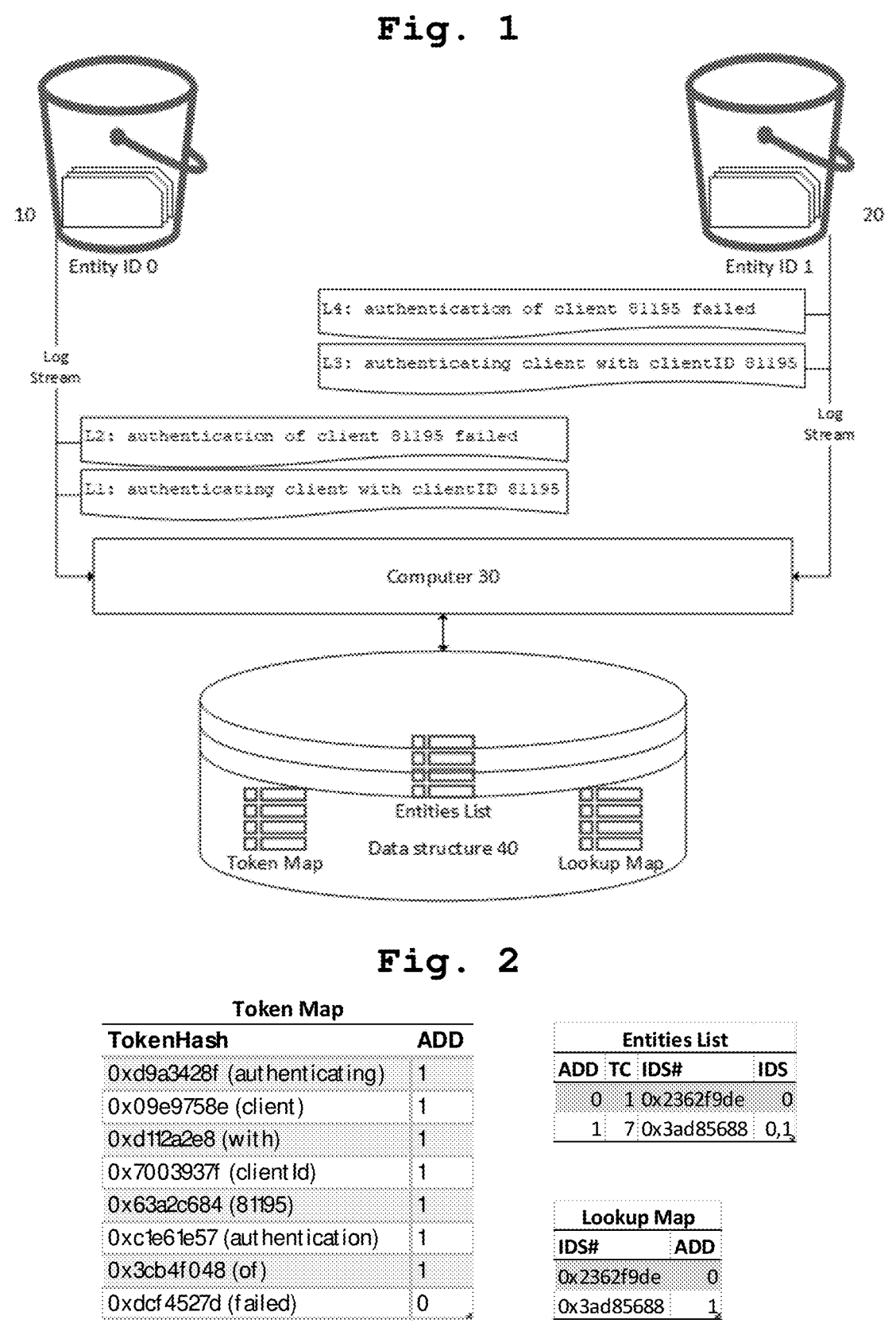

Fig. 2

Token Map

Figure 3A:
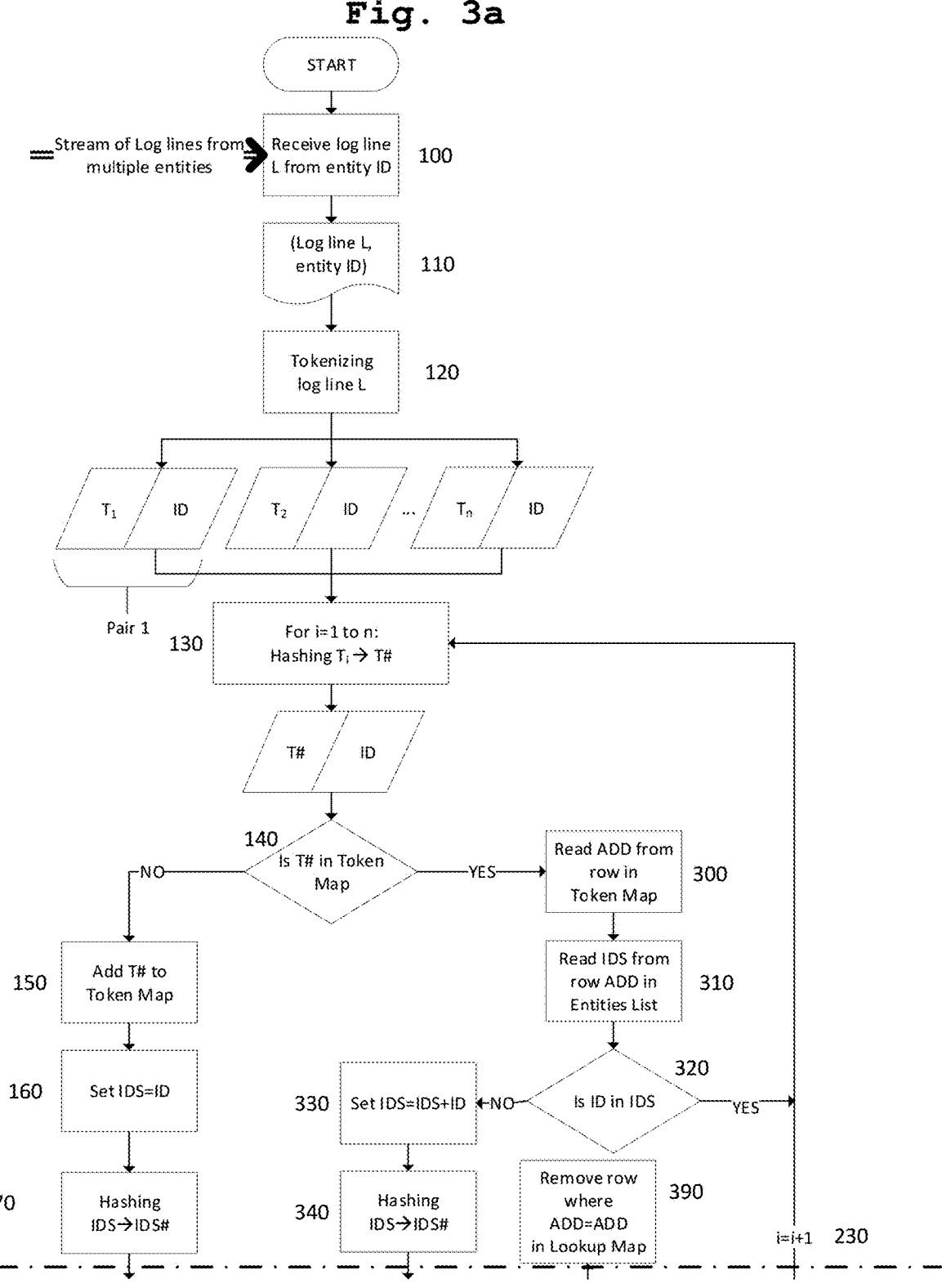

| TokenHash | ADD |
|---|---|
| 0xd9a3428f (authenticating) | 1 |
| 0x09e9758e (client) | 1 |
| 0xd112a2e8 (with) | 1 |
| 0x7003937f (clientId) | 1 |
| 0x63a2c684 (81195) | 1 |
| 0xc1e61e57 (authentication) | 1 |
| 0x3cb4f048 (of) | 1 |
| 0xdcf4527d (failed) | 0 |

Entities List

| ADD | TC | IDS# | IDS |
|---|---|---|---|
| 0 | 1 | 0x2362f9de | 0 |
| 1 | 7 | 0x3ad85688 | 0,1 |

Lookup Map

| IDS# | ADD |
|---|---|
| 0x2362f9de | 0 |
| 0x3ad85688 | 1 |

Fig. 4

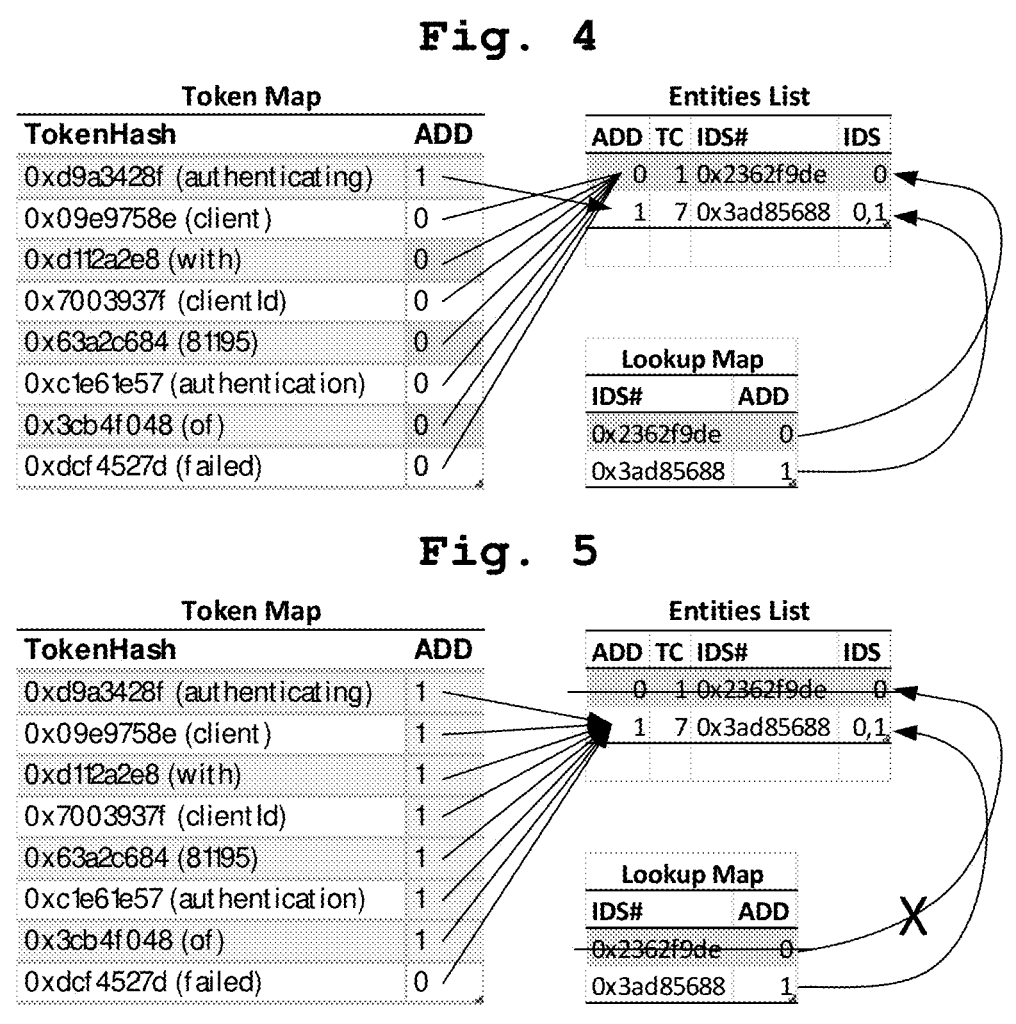

Token Map

| TokenHash | ADD |
|---|---|
| 0xd9a3428f (authenticating) | 1 |
| 0x09e9758e (client) | 0 |
| 0xd112a2e8 (with) | 0 |
| 0x7003937f (clientId) | 0 |
| 0x63a2c684 (81195) | 0 |
| 0xc1e61e57 (authentication) | 0 |
| 0x3cb4f048 (of) | 0 |
| 0xdcf4527d (failed) | 0 |

Entities List

| ADD | TC | IDS# | IDS |
|---|---|---|---|
| 0 | 1 | 0x2362f9de | 0 |
| 1 | 7 | 0x3ad85688 | 0,1 |

Lookup Map

| IDS# | ADD |
|---|---|
| 0x2362f9de | 0 |
| 0x3ad85688 | 1 |

Fig. 5

Token Map

| TokenHash | ADD |
|---|---|
| 0xd9a3428f (authenticating) | 1 |
| 0x09e9758e (client) | 1 |
| 0xd112a2e8 (with) | 1 |
| 0x7003937f (clientId) | 1 |
| 0x63a2c684 (81195) | 1 |
| 0xc1e61e57 (authentication) | 1 |
| 0x3cb4f048 (of) | 1 |
| 0xdcf4527d (failed) | 0 |

Entities List

| ADD | TC | IDS# | IDS |
|---|---|---|---|
| 0 | 1 | 0x2362f9de | 0 |
| 1 | 7 | 0x3ad85688 | 0,1 |

Lookup Map

| IDS# | ADD |
|---|---|
| 0x2362f9de | 0 |
| 0x3ad85688 | 1 |

Fig. 11

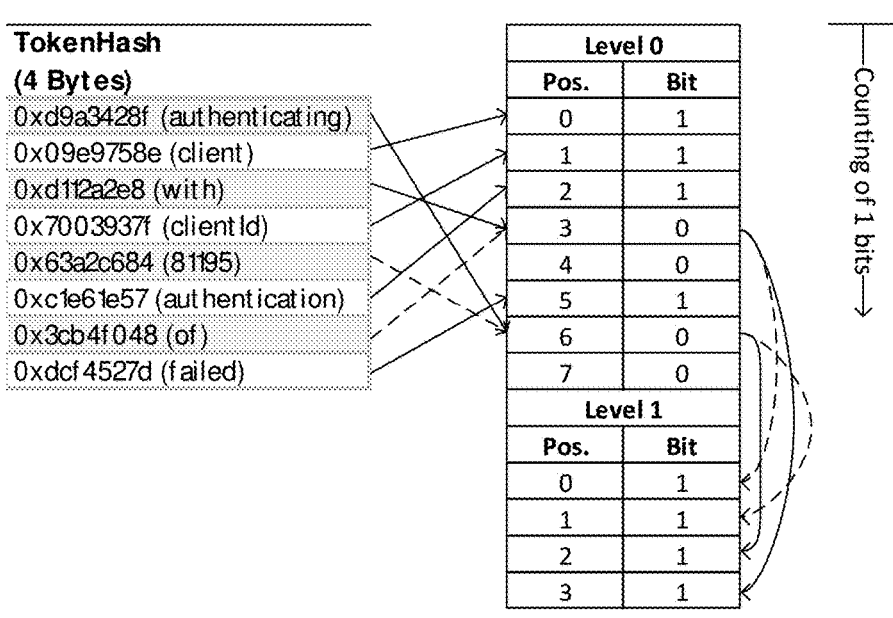

| TokenHash (4 Bytes) | | Level 0 | |
|---|---|---|---|
| | | Pos. | Bit |
| 0xd9a3428f (authenticating) | | 0 | 1 |
| 0x09e9758e (client) | | 1 | 1 |
| 0xd112a2e8 (with) | | 2 | 1 |
| 0x7003937f (clientId) | | 3 | 0 |
| 0x63a2c684 (81195) | | 4 | 0 |
| 0xc1e61e57 (authentication) | | 5 | 1 |
| 0x3cb4f048 (of) | | 6 | 0 |
| 0xdcf4527d (failed) | | 7 | 0 |

| Level 1 | |
|---|---|
| Pos. | Bit |
| 0 | 1 |
| 1 | 1 |
| 2 | 1 |
| 3 | 1 |

Counting of 1 bits→

Fig. 12

| TokenHash (4 Bytes) | Token Hash* (3 Bits) | Token Hash Signature (8 Bits) |
|---|---|---|
| 0xd9a3428f (authenticating) | 0b110 (authenticating) | 0b1000111 |
| 0x09e9758e (client) | 0b000 (client) | 0b1000110 |
| 0xd112a2e8 (with) | 0b111 (with) | 0b1101000 |
| 0x7003937f (clientId) | 0b001 (clientId) | 0b1011111 |
| 0x63a2c684 (81195) | 0b101 (81195) | 0b1000100 |
| 0xc1e61e57 (authentication) | 0b010 (authentication) | 0b1010111 |
| 0x3cb4f048 (of) | 0b100 (of) | 0b01001000 |
| 0xdcf4527d (failed) | 0b011 (failed) | 0b0111101 |

66% compression 4 bytes (32 Bits) per row

11 Bits per row

Fig. 17

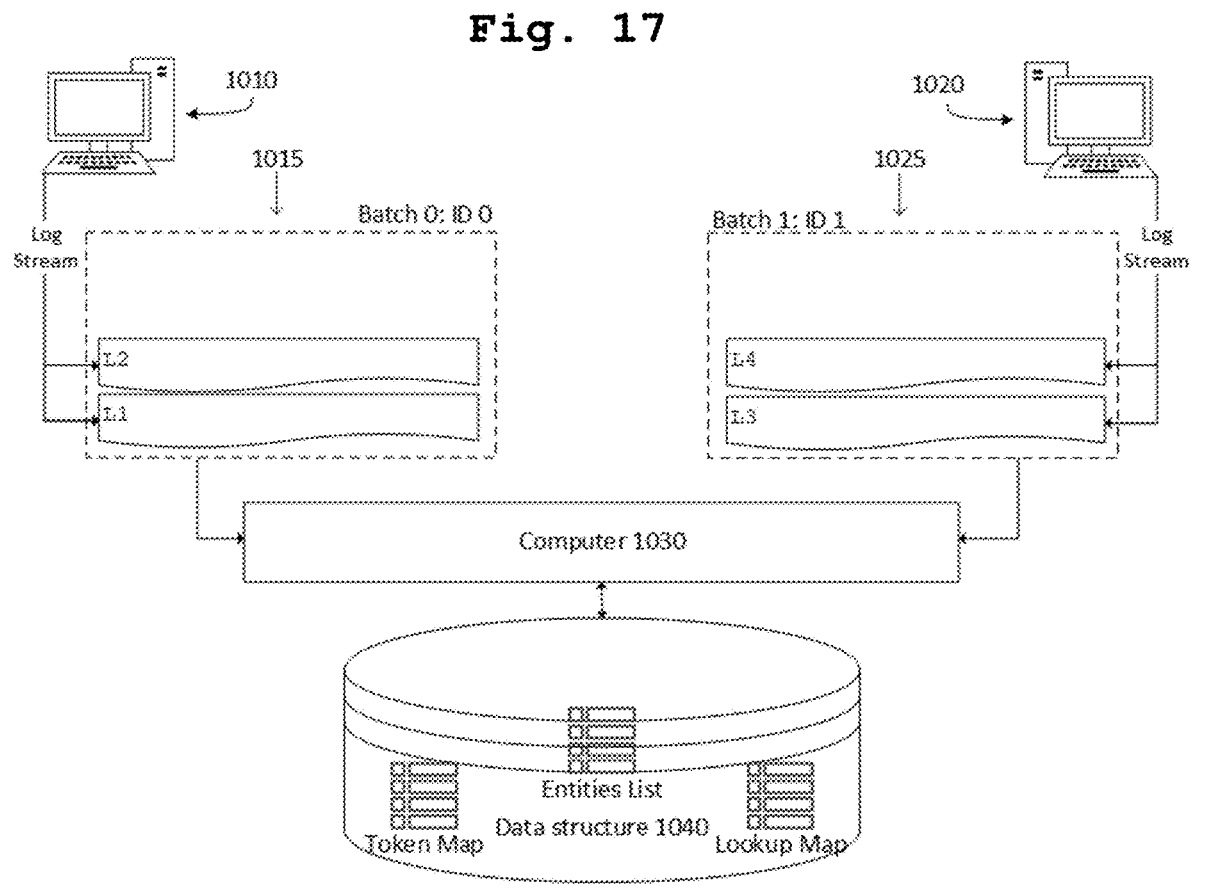

1010

1020

1015

1025

Batch 0: ID 0

Batch 1: ID 1

Log
Stream

Log
Stream

L2

L4

L1

L3

Computer 1030

Entities List

Token Map

Data structure 1040

Lookup Map

Fig. 18

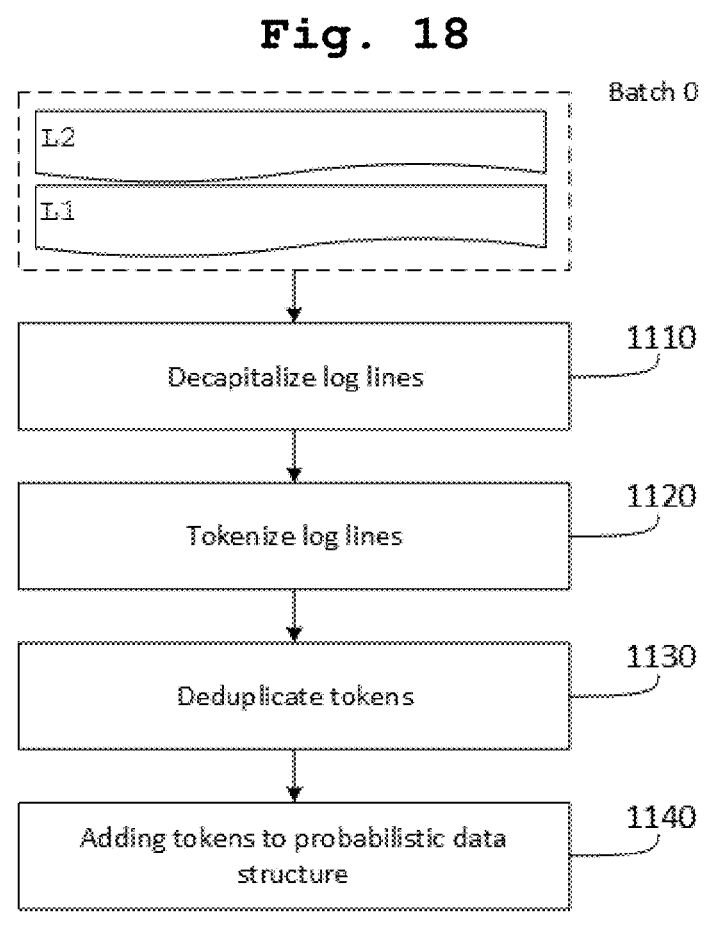

Batch 0

L2

L1

Decapitalize log lines — 1110

Tokenize log lines — 1120

Deduplicate tokens — 1130

Adding tokens to probabilistic data structure — 1140

Fig. 23

| Short token | ASCII values of token chars | | | Sequential values SV | | | UV |
|---|---|---|---|---|---|---|---|
| " " | 32 | | | 6 | | | 6 |
| " " | 32 | | | 6 | | | 6 |
| " " | 32 | | | 6 | | | 6 |
| " " | 32 | | | 6 | | | 6 |
| " " | 32 | | | 6 | | | 6 |
| " " | 32 | | | 6 | | | 6 |
| " " | 32 | | | 6 | | | 6 |
| " " | 32 | | | 6 | | | 6 |
| of | 111 | 102 | - | 24 | 15 | - | 820 |
| aut | 97 | 117 | 116 | 10 | 30 | 29 | 58131 |
| cli | 99 | 108 | 105 | 12 | 21 | 18 | 43553 |
| wit | 119 | 105 | 116 | 32 | 18 | 29 | 57721 |
| cli | 99 | 108 | 105 | 12 | 21 | 18 | 43553 |
| 811 | 56 | 49 | 49 | 8 | 1 | 1 | 20797 |
| uth | 117 | 116 | 104 | 30 | 29 | 17 | 42563 |
| lie | 108 | 105 | 101 | 21 | 18 | 14 | 38270 |
| ith | 105 | 116 | 104 | 18 | 29 | 17 | 42551 |
| lie | 108 | 105 | 101 | 21 | 18 | 14 | 38270 |
| 119 | 49 | 49 | 57 | 1 | 1 | 9 | 31158 |
| the | 116 | 104 | 101 | 29 | 17 | 14 | 38242 |
| ien | 105 | 101 | 110 | 18 | 14 | 23 | 49787 |
| ien | 105 | 101 | 110 | 18 | 14 | 23 | 49787 |
| 195 | 49 | 57 | 53 | 1 | 9 | 5 | 26262 |
| hen | 104 | 101 | 110 | 17 | 14 | 23 | 49786 |
| ent | 101 | 110 | 116 | 14 | 23 | 29 | 57883 |
| ent | 101 | 110 | 116 | 14 | 23 | 29 | 57883 |
| ent | 101 | 110 | 116 | 14 | 23 | 29 | 57883 |
| nti | 110 | 116 | 105 | 23 | 29 | 18 | 43852 |
| nti | 110 | 116 | 105 | 23 | 29 | 18 | 43852 |
| tid | 116 | 105 | 100 | 29 | 18 | 13 | 36982 |
| tic | 116 | 105 | 99 | 29 | 18 | 12 | 35686 |
| ica | 105 | 99 | 97 | 18 | 12 | 10 | 32867 |
| cat | 99 | 97 | 116 | 12 | 10 | 29 | 57413 |
| ati | 97 | 116 | 105 | 10 | 29 | 18 | 43839 |
| tin | 116 | 105 | 110 | 29 | 18 | 23 | 49942 |
| ing | 105 | 110 | 103 | 18 | 23 | 16 | 41039 |
| aut | 97 | 117 | 116 | 10 | 30 | 29 | 58131 |
| cli | 99 | 108 | 105 | 12 | 21 | 18 | 43553 |
| 811 | 56 | 49 | 49 | 8 | 1 | 1 | 20797 |
| fai | 102 | 97 | 105 | 15 | 10 | 18 | 43160 |
| uth | 117 | 116 | 104 | 30 | 29 | 17 | 42563 |
| lie | 108 | 105 | 101 | 21 | 18 | 14 | 38270 |
| 119 | 49 | 49 | 57 | 1 | 1 | 9 | 31158 |
| ail | 97 | 105 | 108 | 10 | 18 | 21 | 47331 |
| the | 116 | 104 | 101 | 29 | 17 | 14 | 38242 |
| ien | 105 | 101 | 110 | 18 | 14 | 23 | 49787 |
| 195 | 49 | 57 | 53 | 1 | 9 | 5 | 26262 |
| ile | 105 | 108 | 101 | 18 | 21 | 14 | 38375 |
| hen | 104 | 101 | 110 | 17 | 14 | 23 | 49786 |
| ent | 101 | 110 | 116 | 14 | 23 | 29 | 57883 |
| led | 108 | 101 | 100 | 21 | 14 | 13 | 36830 |
| ent | 101 | 110 | 116 | 14 | 23 | 29 | 57883 |
| nti | 110 | 116 | 105 | 23 | 29 | 18 | 43852 |
| tic | 116 | 105 | 99 | 29 | 18 | 12 | 35686 |
| ica | 105 | 99 | 97 | 18 | 12 | 10 | 32867 |
| cat | 99 | 97 | 116 | 12 | 10 | 29 | 57413 |
| ati | 97 | 116 | 105 | 10 | 29 | 18 | 43839 |
| tio | 116 | 105 | 111 | 29 | 18 | 24 | 51238 |
| ion | 105 | 111 | 110 | 18 | 24 | 23 | 50147 |

Fig. 25

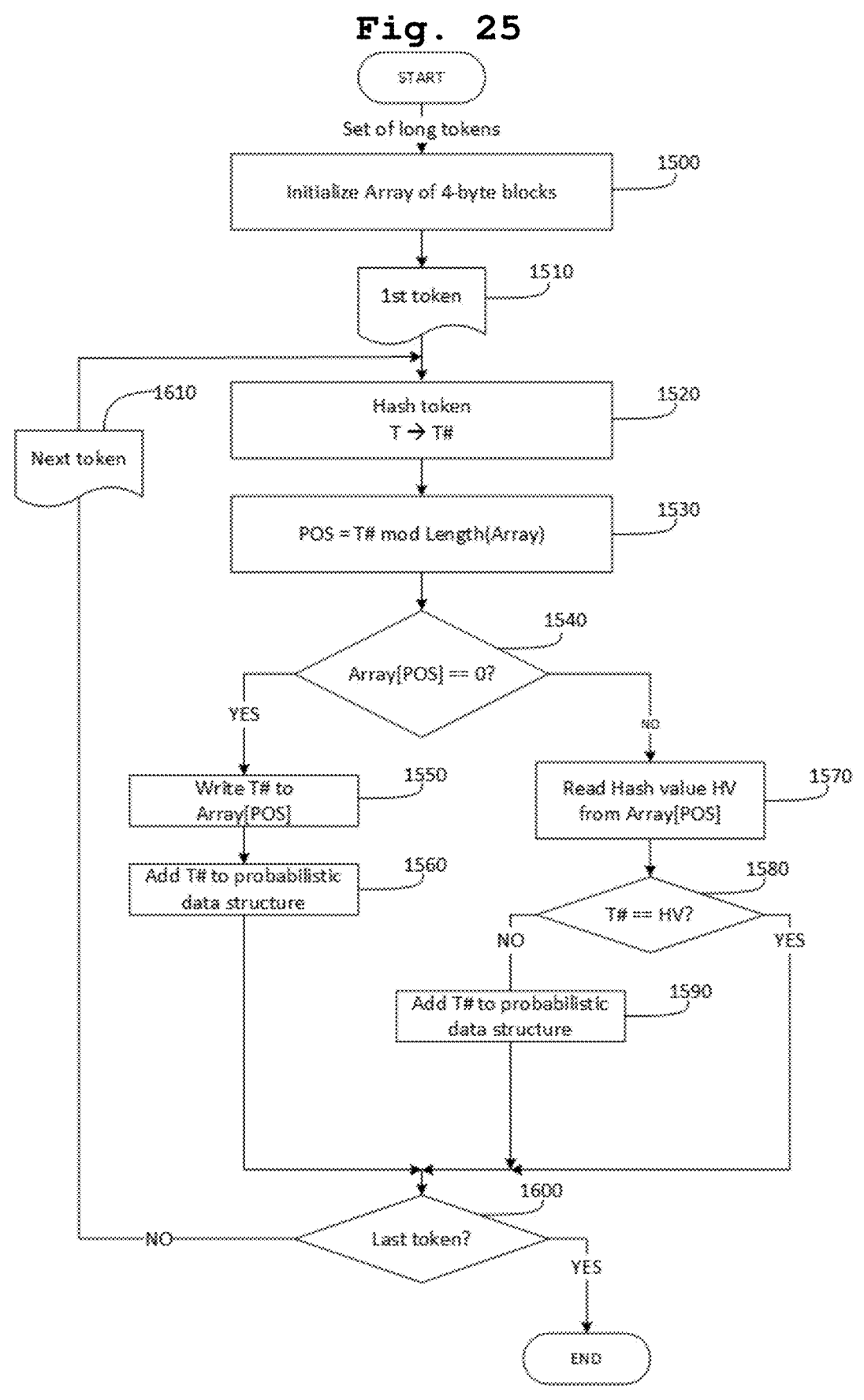

START

Set of long tokens

Initialize Array of 4-byte blocks — 1500

1st token — 1510

1610
Next token

Hash token
T → T# — 1520

POS = T# mod Length(Array) — 1530

Array[POS] == 0? — 1540

YES

Write T# to
Array[POS] — 1550

Add T# to probabilistic
data structure — 1560

NO

Read Hash value HV
from Array[POS] — 1570

T# == HV? — 1580

NO                                    YES

Add T# to probabilistic
data structure — 1590

1600

Last token?

NO                              YES

END

Fig. 26

Token Map

| TokenHash | ADD |
|---|---|
| 0xe96ccf45 (" ") | 0 |
| 0x076da1fa ("of") | 0 |
| 0x42ba6ab2 ("811") | 0 |
| 0x82df1f2c ("195") | 0 |
| 0x43b0d90f ("119") | 0 |
| 0xcc224017 ("ica") | 0 |
| 0xcc3df992 ("tic") | 0 |
| 0xecd9d1f5 ("led") | 0 |
| 0x52596c31 ("tid") | 0 |
| 0x3c456de6 ("the") | 0 |
| 0x376bae6f ("lie") | 0 |
| 0x4cd798c1 ("ile") | 0 |
| 0x90ef9b6f ("ing") | 0 |
| 0xb07d7c25 ("ith") | 0 |
| 0xa5412631 ("uth") | 0 |
| 0xfb93ed9a ("fai") | 0 |
| 0x48f6513c ("cli") | 0 |
| 0xc9691d0b ("ati") | 0 |
| 0xc2355a36 ("nti") | 0 |
| 0x466f8598 ("ail") | 0 |
| 0x0b059037 ("hen") | 0 |
| 0x0ac7fa00 ("ien") | 0 |
| 0xb28c852f ("tin") | 0 |
| 0xf028128a ("ion") | 0 |
| 0xc58bb5b9 ("tio") | 0 |
| 0x9e5e43a8 ("cat") | 0 |
| 0x4da8c20c ("wit") | 0 |
| 0x1d4b23d5 ("ent") | 0 |
| 0xb3744093 ("aut") | 0 |
| 0x9e734018 ("authenticating") | 0 |
| 0xc7440455 ("client") | 0 |
| 0x9890e20e ("with") | 0 |
| 0x7f98cd1c ("clientid") | 0 |
| 0x627a5da0 ("81195") | 0 |
| 0xfeb4c9fd ("authentication") | 0 |
| 0x9e8ba377 ("failed") | 0 |

Entities List

| ADD | TC | IDS# | IDS |
|---|---|---|---|
| 0 | 36 | 0xf4dbdf21 | 0 |

Fig. 28

| Token Map | |
|---|---|
| TokenHash | ADD |
| 0xb6aa9c40 ("trisberg") | 0 |
| 0xbbc18746 ("dynatrace") | 0 |
| 0x64b6c6e6 ("com") | 0 |
| 0x1ab718b5 ("connected") | 0 |
| 0xb91aa170 ("from") | 0 |
| 0xee8dcc44 ("ssh") | 0 |
| 0x1cbb8a8f ("192") | 0 |
| 0x7bf67f5e ("168") | 0 |
| 0x237750ea ("100") | 0 |
| 0x7f5d33bf ("131") | 0 |
| 0xa4deae1d ("@") | 0 |
| 0x0ed4e242 (".") | 0 |
| 0xe96ccf45 (" ") | 0 |
| 0x6f70bc60 ("://") | 0 |
| 0xeacbcb6a ("trisberg@dynatrace | 0 |
| 0x2e099e0a ("dynatrace.com") | 0 |
| 0xafb6b25a ("192.168") | 0 |
| 0x4cd1379a ("168.1") | 0 |
| 0xf6d2fc13 ("100.131") | 0 |
| 0x2b03fc16 ("192.168.100") | 0 |
| 0xf525e68c ("168.100.131") | 0 |
| 0x85dedb16 ("tri") | 0 |
| 0xd5079544 ("ris") | 0 |
| 0x1fe903fc ("isb") | 0 |
| 0xc3e593e9 ("sbe") | 0 |
| 0x129349ae ("ber") | 0 |
| 0x7f823f56 ("erg") | 0 |
| 0xe468340e ("dyn") | 0 |
| 0x65aa9d2a ("yna") | 0 |
| 0x9686d0fb ("nat") | 0 |
| 0x430cd4e7 ("atr") | 0 |
| 0x8b055324 ("tra") | 0 |
| 0x00690f28 ("rac") | 0 |
| 0xc55cd5b6 ("ace") | 0 |
| 0xfdbf975c ("con") | 0 |
| 0xedbe5f79 ("onn") | 0 |
| 0x7baeecc6 ("nne") | 0 |
| 0x71399038 ("nec") | 0 |
| 0xa8e55d98 ("ect") | 0 |
| 0xc35b854e ("cte") | 0 |
| 0xfeec233d ("ted") | 0 |
| 0x731f093d ("fro") | 0 |
| 0x79520fa1 ("rom") | 0 |
| 0x140e363f (":") | 0 |
| 0x79d3d2d4 ("/") | 0 |
| 0xcfa1f1df (":/") | 0 |
| 0xf81417cb ("//") | 0 |

| Entities List | | | |
|---|---|---|---|
| ADD | TC | IDS# | IDS |
| 0 | 47 | 0xf4dbdf21 | 0 |

2644200.1

COMPACT PROBABILISTIC DATA STRUCTURE FOR STORING LOG DATA

CROSS-REFERENCE TO RELATED APPLICATIONS

This application is a continuation-in-part of U.S. application Ser. No. 18/383,031, filed on Oct. 23, 2023 which is a continuation-in-part of U.S. application Ser. No. 18/119, 331, filed on Mar. 9, 2023. These applications also claim the benefit of U.S. Provisional Application No. 63/437,865, filed on Jan. 9, 2023. The entire disclosure of the above applications is incorporated herein by reference.

FIELD

The disclosure concerns a computer-implemented method for storing log data generated in a distributed computing environment.

BACKGROUND

Operating systems for clients and servers, applications (both locally installed, web based and hybrid), networks including the cloud, and containers (such as Docker or Kubernetes) etc. generate log messages during their operation. Subsequently, the terms log message, log line or simply log are used synonymously for each other as all these terms are used frequently in the art. Each log line is associated to an identity (short ID), i.e. the ID (typically a number) of an entity, e.g. a specific storage location or more specifically a batch or bucket of data containing the log line. Logs can be stored in compressed or uncompressed form. Generally, logs can be stored and analyzed for many different purposes. In the field of application/computer monitoring, log lines are used to detect anomalies occurring during the operation of the computer system. Since an anomaly is often not detected in real time, log lines are typically stored in a database (short DB). The DB containing the log lines as data can be queried/searched later for one or more keywords in order to identify the root cause of the anomaly. The DB can be a local DB, e.g. a DB stored on a server in the local network, a hybrid DB, e.g. where a DB index is stored locally and the log lines are stored in the cloud, or a cloud DB, where both the index and the data are stored in a cloud network. In response to a database query, the ID of a storage location is returned to the query consumer which indicates where, i.e. in which storage entity, a logline comprising the keyword is stored. Typically, the storage location or data batch containing matching logs is downloaded for inspection. In many cases, the keyword, e.g. an IP address, is present in multiple locations/batches. In a subsequent analysis step, the root cause of the problem can be identified by examining the occurrence of log lines over time.

Many database management systems (short DBMS) exist which allow the storage and the indexing of log lines in a database. Working without an index is currently not an option since it would take 71000 CPU cores approx. 10 s to search and find an IP address in 700 TB of log data. This is both in terms of the required CPU power and time unacceptable. On the other hand, DBMS exist that can handle big data and can perform queries within a reasonable period of time. One such solution is the Elastic/Lucene DBMS, which is widely used in the industry. However, even established solutions have limitations, as indexing is a tradeoff between query performance and storage costs. In some cases, a full index done by an Elastic/Lucene DBMS may be larger than the actual data from which the index is constructed in compressed form. This is an issue particularly when massive amounts of data/log lines are stored over longer periods of time. It is noted that although computer systems become ever more powerful, the rate of data ingest exceeds the performance gain of computers by far. Consequently, there is a need to make storing log data lines in a data structure more efficient, the data structure more compact, and querying the data structure both faster and more flexible than in prior art systems.

This section provides background information related to the present disclosure which is not necessarily prior art.

SUMMARY

This section provides a general summary of the disclosure and is not a comprehensive disclosure of its full scope or all of its features.

According to a first aspect of the disclosure, the technical problem is solved by a computer-implemented method for storing log data generated in a distributed computing environment, comprising: receiving a log line from a given storage entity; applying a first tokenization rule to the log line to create a plurality of base tokens, where each base token is a sequence of successive characters in the log line having same type; applying a second tokenization rule to the log line to create a plurality of combination tokens, where each combination token is comprised of two or more base tokens appended together; applying a third tokenization rule to the log line to create a plurality of n-gram tokens, where each n-gram token is an n-gram derived from a base token in the plurality of base tokens; combining tokens from the plurality of base tokens, the plurality of combination tokens and the plurality of n-gram tokens to form a set of tokens; for each token in the set of tokens, storing a given token by i) applying a hash function to the given token to generate a hash value, where the given token is associated with the given storage entity containing the log line; ii) updating a listing of entities with the given storage entity, where entries in the listing of entities are configured to identify more than one storage entity and each entry in the listing of entities specifies a unique set of storage entities; and iii) storing the hash value, along with an address, in a token map table of a probabilistic data structure, where the address maps the hash value to an entry in the listing of entities.

During the process of storing log lines or more generally log data in the probabilistic data structure (also referred to as the construction of the probabilistic data structure) three tables are used, namely a Token Map table, an Entities List table, and a Lookup Map table. The token map table comprises two columns, namely a TokenHash column containing hash values of stored tokens, and an ADD column. Each field in the ADD column contains just one pointer from the token map table to a row in the entities list table. A hash value typically is 4 bytes long; in 64-bit operating systems, a pointer typically is 8 bytes long. The entities list table comprises four columns, namely an ADD column as described above, a TC column containing the "token counts", i.e. the number of token hashes pointing to a row in the entities list table, an IDS # column containing the hash values of the list of identities IDS, and the lists of identities IDS themselves. Note that the ADD fields in the ADD column of the entities list table are not data fields per se since every row in a table inherently has an address associated to it. The TC column contains integer values. The IDS # column contains hash values, and the fields in the IDS column contain a list of integers representing the identities IDS of entities, respectively. Finally, the lookup map table comprises two columns, namely another IDS # column and another ADD column, both as described above.

The entities list table containing the list of identities IDS can be accessed by two external keys, namely i. via token hashes in the table token map, and ii. via the hashes IDS # of the list of identities IDS in the table lookup map. Both hash keys are used during the construction of the probabilistic data structure.

As the token map table contains hash values of atomized tokens, the data structure is by definition a so-called "probabilistic data structure", i.e. that some level of false-positives need to be accepted due to the design of the data structure. Probabilistic data structures rely on hashes for storing and/or querying data to/from the data structure. Due to the transformation (also known as hashing) from tokens into hash values (short hashes), it cannot be ruled out that two distinct tokens are mapped to the same hash value. In prior art solutions, indexes are used to quickly retrieve tokens from a database. The process of adding tokens to an index is called indexing. However, as traditional indexes do not employ hash tokens, they are not considered to be probabilistic data structures.

A token typically is an element of a log line, e.g. a word separated by blanks from another word in the same log line. In the disclosure at least three tokenization rules are used: A first rule generates so-called base tokens, where each base token is a sequence of successive characters in the log line having the same type. A second rule generates so-called combination tokens, where each combination token is comprised of two or more base tokens appended together. Finally, a third rule generates so-called n-gram tokens, where each n-gram token is an n-gram derived from a base token in the plurality of base tokens. By applying three tokenization rules to the log line, a plurality of tokens of different types is received.

The token hash in this disclosure is a 4-byte value representing the token and has the function of a signature identifying the token in compact form. Nevertheless, it cannot be ruled out that due to the design of the hashing algorithm and particularly the length of the hash value, two differing tokens are mapped to the same hash value. This unlikely case is possible due to the design of the probabilistic data structure and must be considered during storing and retrieving data from the probabilistic data structure. Using hash values as keys for the token map table is, however, not a design fault but rather a feature of the data structure, allowing the probabilistic data structure to be much more compact than a traditional index, and in addition allowing searching/querying the probabilistic data structure at much higher speeds etc. The rate of false-positives of the probabilistic data structure is typically <0.0001%, which is lower than 1 false hit in some 10 million cases.

According to the teaching of the disclosure, data can be stored much more compact (actually some 93% smaller compared to an index on a Lucene DBMS) and data can be searched/queried at some 1000× faster querying speeds, again compared to the Lucene in-memory index.

After having received a log line from a storage entity having the identity ID, the first step in constructing the probabilistic data structure is the tokenization of the log line into a list of atomized tokens T. As pointed out above, base tokens, combination tokens and n-gram tokens are generated. Each token is then subjected to a hashing operation such that the token T is represented by a token hash T #; the token hash may be a 4-byte value. Subsequently, the token map is checked whether the token hash is already contained in it. If not, the token hash value T # of the token T is added to the token map table. Typically, adding is done by adding a new row at the bottom of the table and by writing the token hash into the column TokenHash, such that all unique token hashes of all log lines are eventually contained in the token map. For compactness, a token hash is contained only once in the token map, i.e. without duplicates. Furthermore, a temporary entities list is constructed comprising the tuple (1, IDS #, IDS). In the tuple, the value "1" represents the token count 1, the field IDS is the ID of the entity containing the token, and the hash value IDS # is set to the hash value of IDS. The temporary entities list may be used in a subsequent step. If the token hash T # is already contained in the token map table, then the pointer from the row in the token map table is followed to the respective row in the entities list table. The field IDS there is checked whether it contains the ID of the token being currently processed. If the ID is contained in IDS then no additional action needs to be taken and the next token is processed. Otherwise, the token count in the row is decreased by 1 and the field IDS is read out. Furthermore, the ID is added to the read-out list of entities IDS, a hash value IDS # is generated by hashing IDS, and the token count is set to 1. As described above, the tuple (1, IDS #, IDS) is contained in a temporary entities list. The hashing of IDS, i.e. the list of the identities IDS, is preferably done by applying a commutative hash function. The commutative hash function allows the quick and computationally inexpensive generation of hash values IDS # for a list of identities IDS. Assuming that IDS $\#_1$ is the hash value for a first list of identities $IDS_1$, ID # is the hash value of ID, and that ID shall be added to the list of identities $IDS_1$, say "IDS: =$IDS_1$+ID", then the hash value IDS # of the enlarged list of identities IDS is XOR(IDS $\#_1$, ID #).

The next step in the construction is to check whether IDS # is already contained in the lookup map table. If IDS # is already contained then the link from the lookup map table to the entities list table is followed and the token count TC in this row is incremented by 1 and the address ADD of the row in the entities list is added to the token map. If IDS # is not contained in the lookup map, then the temporary entities list is added as a new row to the entities list, the address ADD of the new row is stored, the tuple (IDS #, ADD) is added to the lookup map and ADD is also added to the token map.

After performing all these steps for a single token, another token is being processed and after having processed all tokens of a log line, another log line is being processed.

According to a preferred embodiment, the first tokenization rule defines a base token as one of a sequence of successive alphanumeric characters in the log line; a sequence of successive separator characters in the log line; or a sequence of successive characters outside of 7-bit ASCII space.

According to another preferred embodiment, the second tokenization rule defines a combination token as two base tokens comprised of alphanumeric characters and connected by a separator character or a combination token as three base tokens comprised of alphanumeric characters connected by a dot.

It is preferred that the third tokenization rule generates n-gram tokens for alphanumeric, separator, and Unicode base tokens.

Preferably each entry in the listing of entities further includes a counter, a list of storage entities and a hash value for the list of storage entities, where the counter indicates the number of entries in the probabilistic data structure mapped to a given entry in the listing of entities.

It is advantageous to perform the following steps when updating the listing of entities with the given storage entity: determining whether the hash value is stored in the probabilistic data structure; retrieving an entry in the listing of entities corresponding to the hash value, where the entry is retrieved in response to a determination that the hash value is stored in the probabilistic data structure; from the retrieved entry, determining whether the given storage entity is in the list of storage entities; incrementing the counter by one in the retrieved entry in response to a determination that the given storage entity is contained in the list of storage entities; and creating a new entry in the listing of entities and setting the counter in the new entry to one in response to a determination that the given storage entity is absent from the list of storage entities.

In a very preferred embodiment, creating a new entry in the listing of entities includes generating a hash value for the list of storage entities using a commutative hash function. One example of such a case is when the hash value IDS # of a list of identities $ID_1$, $ID_2$ is formed by IDS #:=XOR (Hashing($ID_1$), Hashing($ID_2$)).

During the construction of the probabilistic data structure it is advantageous to read-in the field IDS # after the "step read field IDS", and in case the ID is not contained in IDS that the hashing of IDS into IDS # is performed by IDS #:=XOR(IDS #, Hashing(ID)).

In order to clean up unused memory during the construction of the probabilistic data structure it is beneficial to delete both the row in the lookup map pointing to an entities list having TC=0 and the row in the entities list having TC=0.

According to another preferred embodiment, updating the listing of entities with the given storage entity further comprises adding an entry into the probabilistic data structure for the hash value, where the entry is added in response to a determination that the hash value is absent from the probabilistic data structure.

A lookup table having an index is generated, where each entry in the lookup table includes a hash value for the list of storage entities and each entry corresponds to an entry in the listing of entities. In addition, each entry in the lookup table includes an address, where the address maps the hash value of the entry to an entry in the listing of entities.

According to another aspect of the disclosure, the technical problem is also solved by a computer-implemented method for storing log data generated in a distributed computing environment, comprising: receiving a batch of log lines from a storage entity; tokenizing each log line in the batch of log line to create a plurality of tokens; for each token in the plurality of tokens, determining a length of a given token; deduplicating tokens in the plurality of tokens to form a set of unique tokens, where a first deduplication procedure is performed on the given token in response to the length of the given token being less than or equal to a threshold and a second deduplication procedure is performed on the given token in response to the length of the given token exceeds the threshold, such that the first deduplication procedure differs from the second deduplication procedure; for each token in the set of tokens, storing a given token by i) applying a hash function to the given token to generate a hash value, where the given token is associated with the given storage entity containing the log line; ii) updating a listing of entities with the given storage entity, where entries in the listing of entities are configured to identify more than one storage entity and each entry in the listing of entities specifies a unique set of storage entities; and iii) storing the hash value, along with an address, in a token map table of a probabilistic data structure, where the address maps the hash value to an entry in the listing of entities.

According to this embodiment, not just a single log line is processed but a batch of multiple log lines, e.g. originating at one or multiple computing entities, is being processed and each log line in the batch is tokenized into a plurality of tokens, e.g. base tokens, combination tokens and n-gram tokens. The ID of the batch is used to add tokens to the probabilistic data structure. Deduplicating tokens in the plurality of tokens into a set of unique tokens takes into account the length of the tokens. A first deduplication procedure is performed on the given token in response to the length of the given token being less than or equal to a threshold and a second deduplication procedure is performed on the given token in response to the length of the given token exceeds the threshold, such that the first deduplication procedure differs from the second deduplication procedure.

According to a preferred embodiment, the first deduplication procedure further comprises initializing a bit array for the first deduplication procedure; for a given token in the plurality of tokens, converting characters of the given token to ASCII values; determining a unique index value for the bit array from the ASCII values for the given token; checking bit value in the bit array at the index value; discarding the given token in response to the value of the bit at the index value indicating that the given token is a duplicate; and storing the given token in the probabilistic data structure in response to the value of the bit at the index value indicating that the given token is not a duplicate.

Determining the unique index value preferably comprises the steps of converting each character of the given token to an ASCII value; mapping each ASCII value for the given token to a value in a set of sequential values; and determining a unique index value for the bit array from the sequential values corresponding to the given token. The at least one ASCII value of a token are first mapped to sequential values. Note that it is not necessary to map each and every ASCII value to a separate sequential value. E.g. mapping the characters A-Z to the same sequential values as the characters a-z automatically converts uppercase characters to lowercase characters.

It is preferred to use the first deduplication procedure for tokens having a max. length of 3 and to employ a bit array having 125,432 bits.

According to another very preferred embodiment of the disclosure, performing the second deduplication procedure further comprises initializing a deduplication array for the second deduplication procedure; for a given token in the plurality of tokens, generating a hash value for the given token to yield a given hash value; computing an index value in the deduplication array based on the given hash value; comparing the given hash value to value of the deduplication array at the computed index value; discarding the given hash value in response to the given hash value matching value of the deduplication array at the computed index value; storing the given hash value in the deduplication array at the location of computed index value when the deduplication array is empty at the location of the computed index value; and storing the given hash value in the probabilistic data structure when the deduplication array is empty at the location of the computed index value.

The computation of an index value in the deduplication array preferably comprises setting the index value to modulo of the given hash value divided by length of the deduplication array. This ensures that all hash values are mapped to one member of the deduplication array.

According to a very preferred embodiment, the hash value for the given token generated during the second deduplication procedure is used for storing the given token in the probabilistic data structure. Accordingly, hashing a token is performed only once although the hash value is used for deduplication and storing the hash value in the probabilistic data structure.

According to one embodiment, if the given hash value does not match value of the deduplication array at the computed index value, the given hash value is stored in the probabilistic data structure.

According to a second aspect of the disclosure, the technical problem is also solved by a computer-implemented method for deduplicating log data generated in a distributed computing environment, comprising: receiving a batch of log lines from a given storage entity; tokenizing each log line in the batch of log lines to create a plurality of tokens; for each token in the plurality of tokens, determining a length of a given token; performing a first deduplication procedure on the given token in response to the length of the given token being less than or equal to a threshold; and performing a second deduplication procedure on the given token in response to the length of the given token exceeds the threshold, wherein the first deduplication procedure includes—initializing a bit array for the first deduplication procedure;—converting characters of the given token to ASCII values;—mapping ASCII values for the given token to a unique index value for the bit array;—checking value of bit in the bit array at the index value;—discarding the given token in response to the value of the bit at the index value indicating that the given token is a duplicate; and—storing the given token in the non-transitory computer memory in response to the value of the bit at the index value indicating that the given token is not a duplicate.

As mentioned above, it is preferred that determining the unique index value comprises the steps of converting each character of the given token to an ASCII value; mapping each ASCII value for the given token to a value in a set of sequential values; and determining a unique index value for the bit array from the sequential values corresponding to the given token.

According to another preferred embodiment of the disclosure, performing a second deduplication procedure further comprises initializing a deduplication array for the second deduplication procedure; generating a hash value for the given token to yield a given hash value; computing an index value in the deduplication array based on a given hash value; comparing the given hash value to value of the deduplication array at the computed index value; discarding the given hash value in response to the given hash value matching value of the deduplication array at the computed index value; storing the given hash value in the deduplication array at the location of computed index value when the deduplication array is empty at the location of the computed index value; and storing the given hash value in the probabilistic data structure when the deduplication array is empty at the location of the computed index value.

Computing an index value in the deduplication array comprises setting the index value to modulo of the given hash value divided by length of the deduplication array.

Preferably, the method further comprises storing the given hash value in the probabilistic data structure when the given hash value does not match value of the deduplication array at the computed index value.

According to a third aspect of the disclosure, the technical problem is also solved by a computer-implemented method for querying a probabilistic data structure, comprising: receiving a query term; applying a first tokenization rule to the query term to create a set of base tokens, where each base token is a sequence of successive characters in the log line having same type; applying a second tokenization rule to the query term to create a set of combination tokens, where each combination token is comprised of two or more base tokens appended together; determining whether the set of combination tokens is empty; processing combination tokens in the set of combination tokens prior to processing base tokens in the set of base tokens and in response to presence of combination tokens in the set of combination tokens; and processing base tokens in the set of base tokens in response to absence of combination tokens in the set of combination tokens.

In an optional step after having received the query term, the query term is decapitalized, i.e. uppercase characters are converted into lowercase characters. After this, the query term is tokenized into a set of base tokens and combination tokens applying the first and second tokenization rules as mentioned above. Subsequently, it is checked whether the set of combination tokens is empty. If there is at least one combination token in the set of combination tokens, these tokens are processed prior to the processing of base tokens in the set of base tokens.

Processing combination tokens in the set of combination tokens comprises for a given combination token in the set of combination tokens, generating a hash value for the given combination token, querying the probabilistic data structure using the hash value, and adding query result to a set of query results.

After having processed a given combination token in the set of combination tokens, the method comprises removing the given combination token from the set of combination tokens, and removing base tokens that comprise the given combination token from the set of base tokens. As combination tokens comprise two or three base tokens, this steps ensures that not just the given combination token but also the base tokens comprised in the combination token are removed from the respective set of tokens.

The method further comprises outputting a result for the query term as an intersection of the query results in the set of query results when the set of base tokens is empty and the set of combination tokens is empty.

Processing base tokens in the set of base tokens further comprises determining whether the set of base tokens is empty; processing base tokens in the set of base tokens prior to processing n-gram and in response to presence of base tokens in the set of base tokens; and processing n-gram tokens in response to absence of base tokens in the set of base tokens.

The method steps for processing base tokens in the set of base tokens further comprises for a given base token in the set of base tokens, generating a hash value for the given base token, querying the probabilistic data structure using the hash value, adding query result to the set of query results, and removing the given base token from the set of base tokens.

The method further comprises determining whether the set of base tokens is empty; and outputting a result for the query term as an intersection of the query results in the set of query results in response to the absence of base tokens in the set of base tokens.

Finally, processing n-gram tokens further comprises applying a third tokenization rule to base tokens in the set of base tokens to create a set of n-gram tokens, where each n-gram token is an n-gram derived from a base token; for each n-gram token in the set of n-gram tokens, generating a hash value for a given n-gram token, querying the probabilistic data structure using the hash value, and adding query result to the set of query results; and outputting a result for the query term as an intersection of the query results in the set of query results.

According to one embodiment, for querying the uncompressed data structure only the Token Map table and the Entities List table are used.

In the first step during querying, a token hash T # is generated for the query token T. Note that the same hashing function used for storing log lines in the probabilistic data structure is used for querying.

In the next step, it is checked whether the token hash T # is contained in the token map. If the token map comprises T #, the link from the corresponding row in the token map to the entities list is followed and the field IDS is read-out. Finally, IDS is output to the query consumer. The query consumer may be an application, a function etc.

If, however, the token hash T # is not contained in the token map, then an empty list " " for IDS is output to the query consumer.

A computer-implemented method for compressing the probabilistic data structure for storing log lines constitutes the fourth aspect of the disclosure. For compressing the data structure only the Token Map table and the Entities List table are used; the Lookup Map is irrelevant.

The compression of the probabilistic data structure reduces its size considerably, namely the token map by more than 75% of its size before compression, and the list of identities IDS in the entities list by more than 90%. The compression allows the probabilistic data structure to be loaded into the RAM or a RAM disk of a computer and consequently, to achieve very high querying speeds. Due to the small size of the data structure, multiple computers or CPUs can load the data structure and data retrieval/querying can be done in parallel.

The compression comprises three main steps, namely i. encoding the token hashes in the column TokenHash of the token map, ii. encoding the addresses in the column ADD of the token map, and iii. encoding the list of identities in the column IDS of the entities list.

In a preferred embodiment, a Minimal Perfect Hash Function (short MPHF), preferably the BBHash function, is used to encode the token hashes. The MPHF maps K token hashes to the value range $[0, |K|-1]$, without any gaps or collisions and is therefore optimal in terms of size. The BBHash function is a preferred MPHF due to its simplicity and fast construction speed. In a typical example, a token hash is compressed to 3 bits.

In order to reduce the likelihood of hash collisions due to the compression of the token hashes, a number of signature bits, preferably the last 8 bits of an unencoded token hash, are added to the encoded token hash.

For compressing the addresses in the column ADD of the token map, an entropy encoding technique is used. In a first step, the addresses ADD in the token map are sorted according to the corresponding token count value TC in the entities list. Subsequently, the addresses of each MPHF encoded token are compressed according to their token count TC.

Preferably a Compressed Static Function is used to encode the token hashes T # and the addresses ADD in the token map.

For compressing the list of identities IDS in the entities list table, preferably Binary Interpolative Coding is used.

A computer-implemented method for querying the compressed probabilistic data structure for storing log lines constitutes the fifth aspect of the disclosure.

During querying, the query token T is hashed first into a token hash T #. Subsequently, T # is hashed into T #* using a Minimal Perfect Hash Function. If T #* is contained in the compressed static function, then the signature bits in the row of the compressed static function are read out. If the signature bits are identical to the n least significant bits of T #, then the rank is read-out from the compressed static function and subsequently, IDS is read from the row "rank" in entities list. Note that as IDS is stored in encoded form, a decoding step needs to be performed in order to receive IDS. If the signature bits≠n least significant bits of T # then IDS: =" ", i.e. an empty set. Likewise, if T #* is not contained in the compressed static function then IDS: =" ". Finally, IDS is output to the query consumer.

Preferably the Minimal Perfect Hash Function is the BBHash function.

A file format for storing the compressed probabilistic data structure for storing log lines constitutes the fifth aspect of the disclosure.

It is noted that the disclosure is not limited to log data, as it is equally applicable to application performance monitoring data, such as trace data, topology and metric data etc. All mentioned data types contain atomized text elements (or tokens) that can be added to the probabilistic data structure. After having added application performance monitoring data, the data can be queried using the disclosed methods.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 3B:
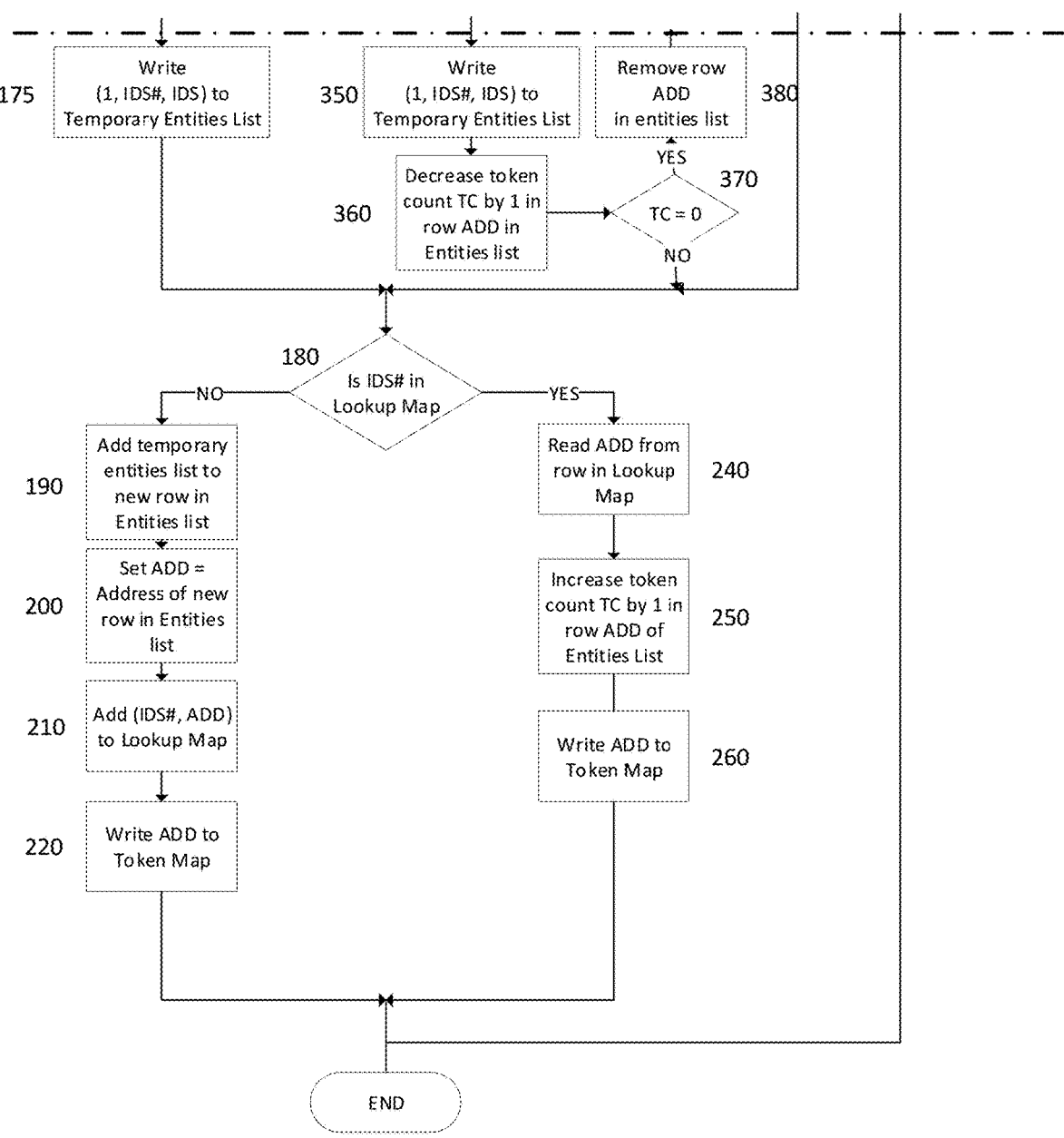
Figure 6:
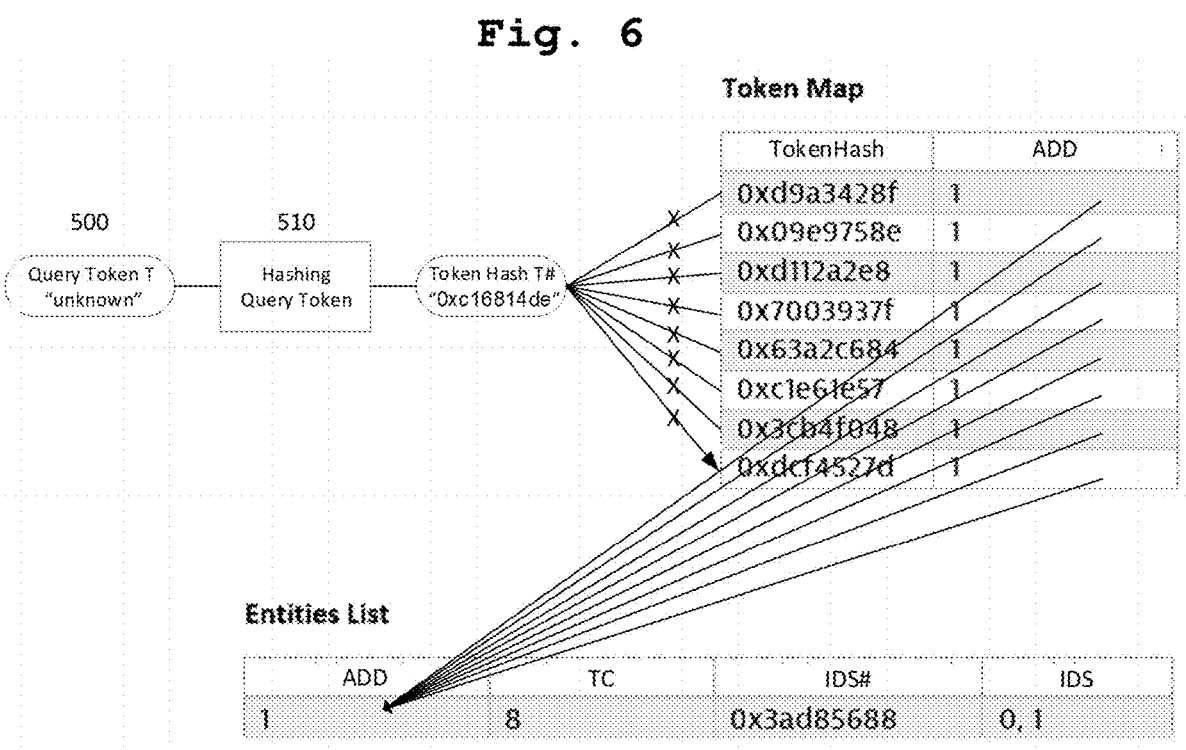
Figure 7:
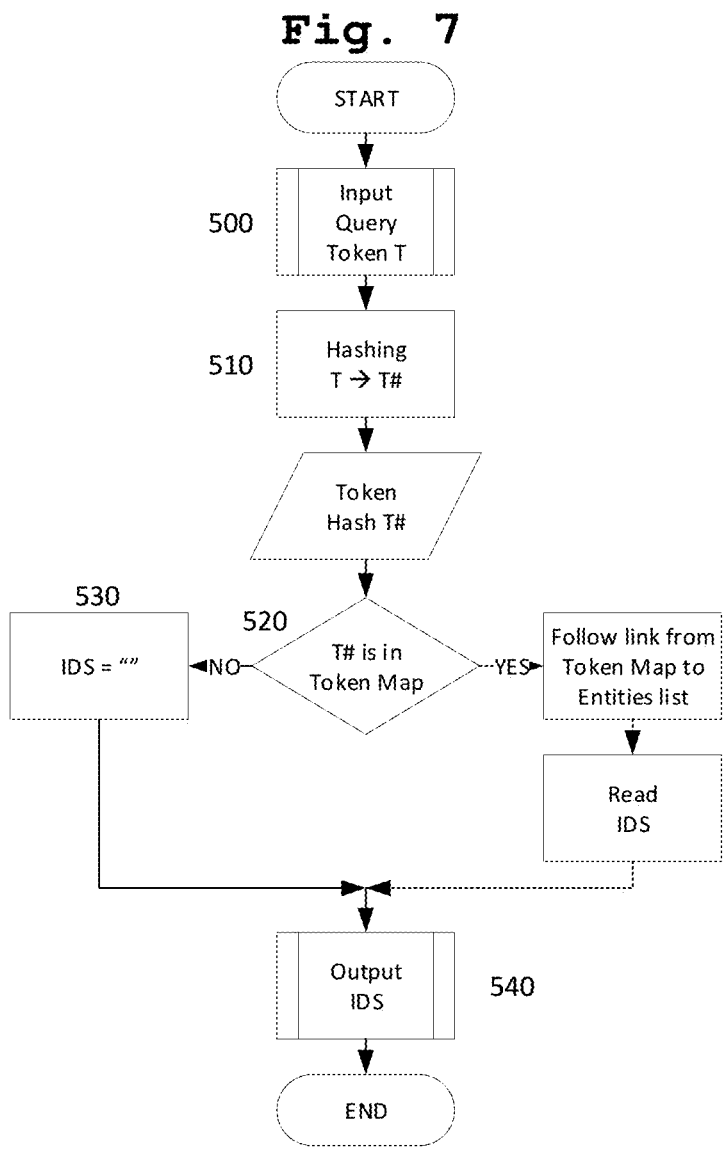
Figure 8:
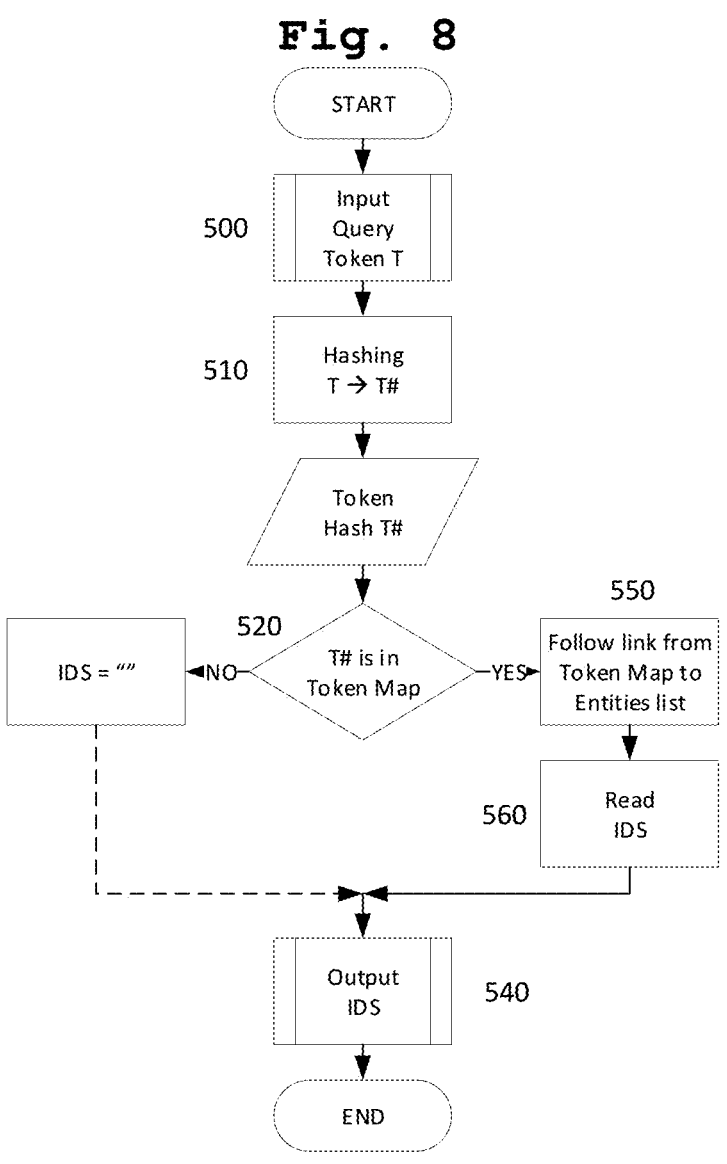
Figure 9:
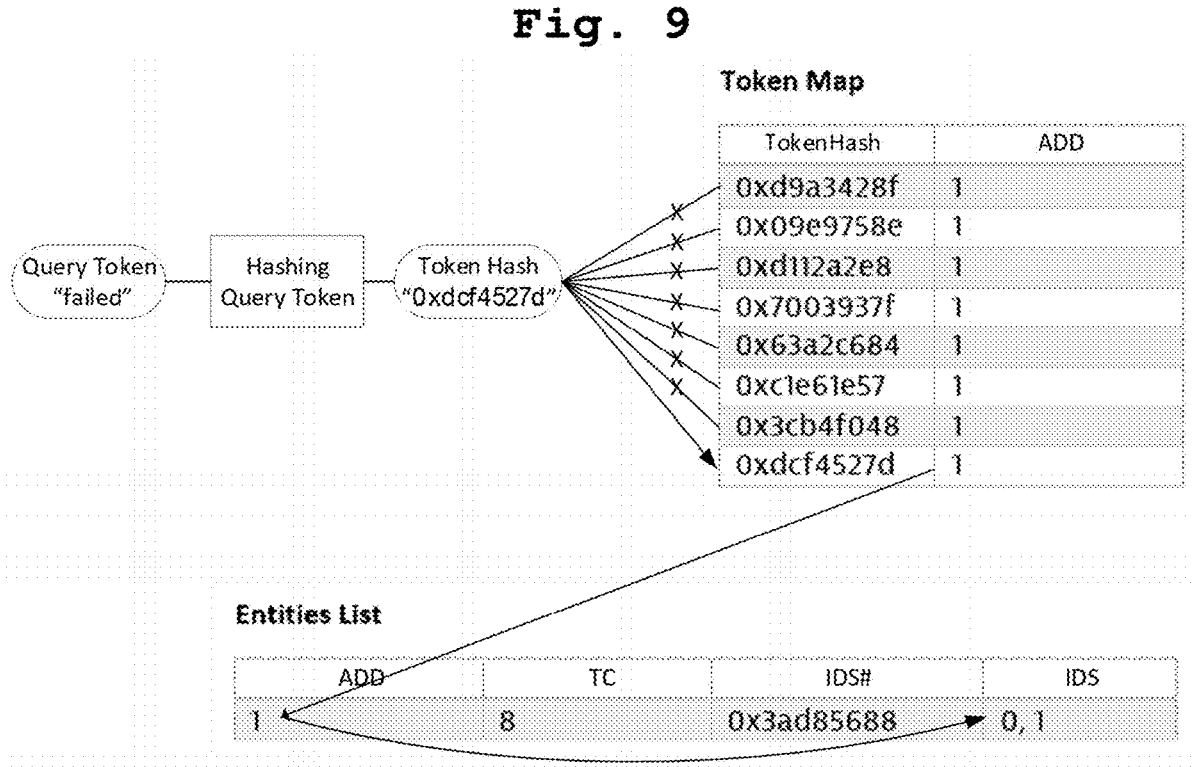
Figure 10:
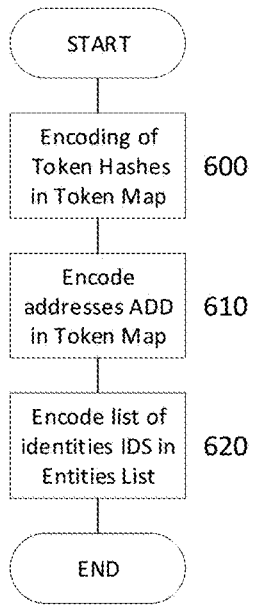
Figure 13:
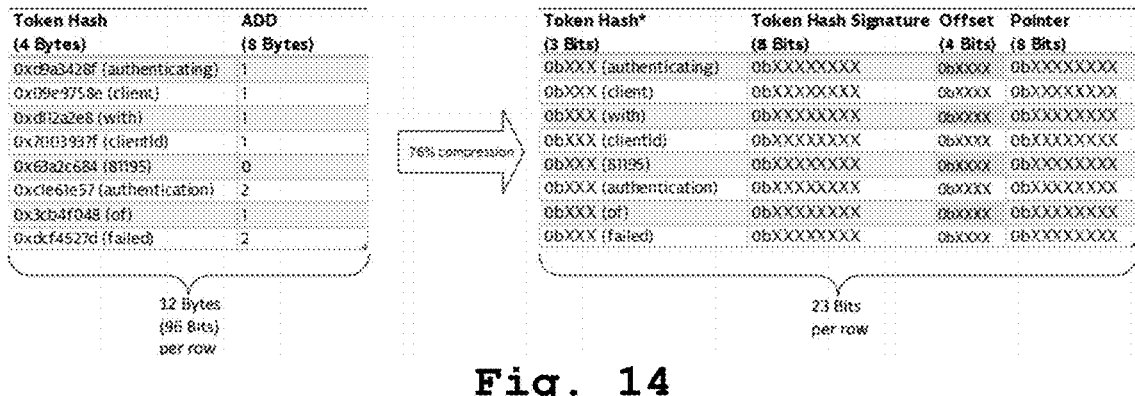
Figure 14:
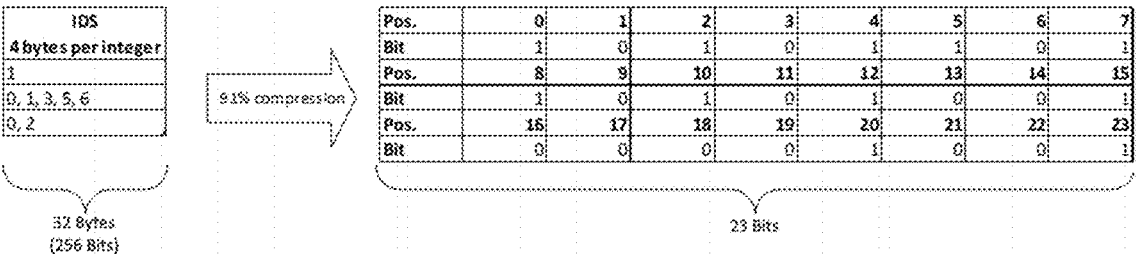
Figure 16:
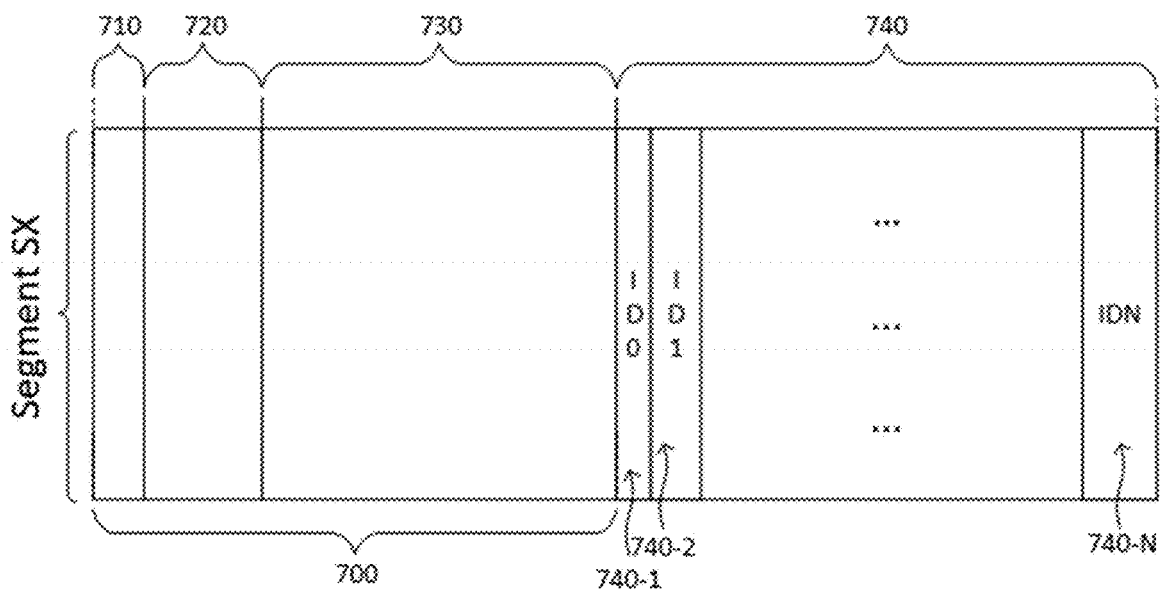
Figure 15:
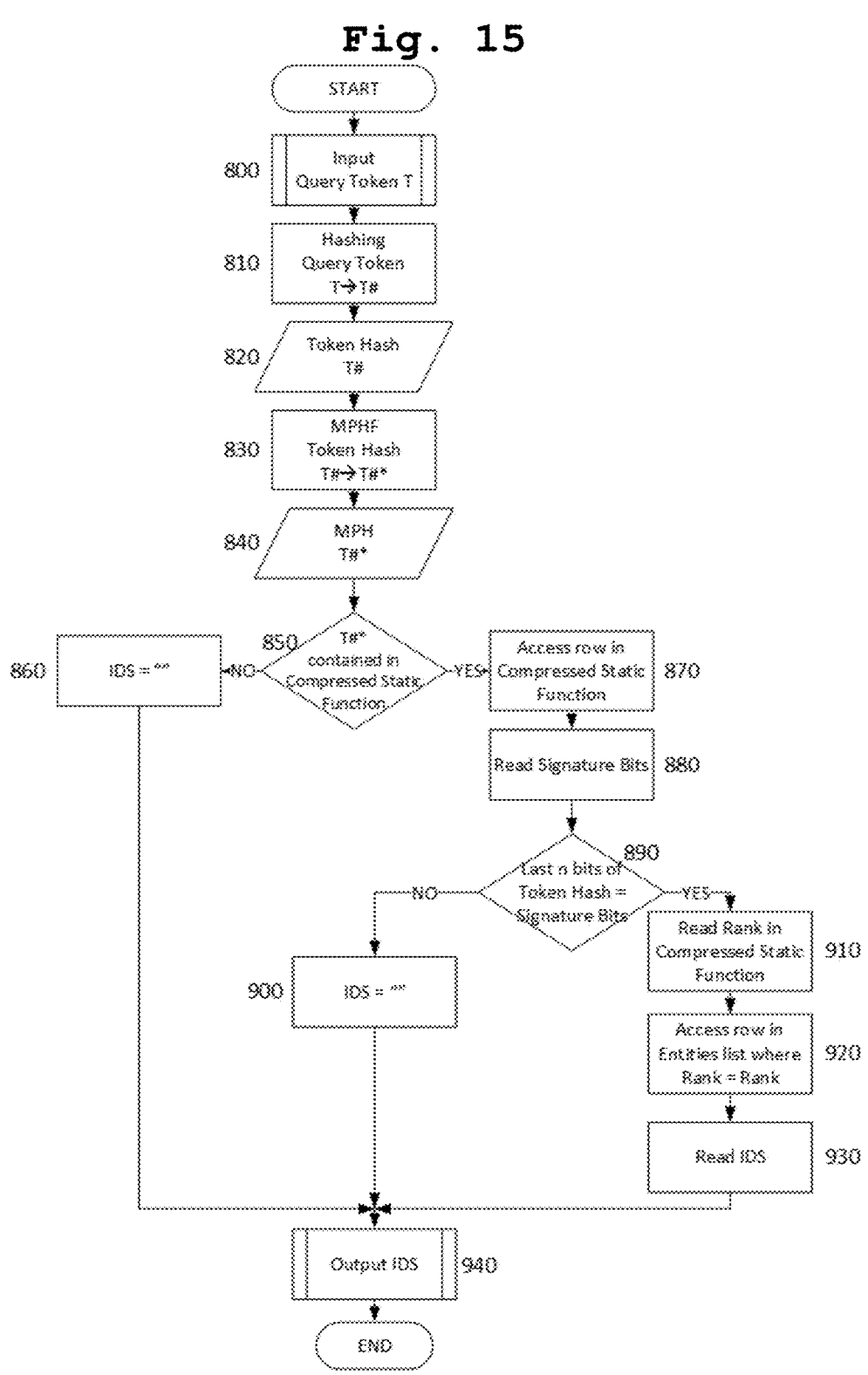
Figures 19, 20:
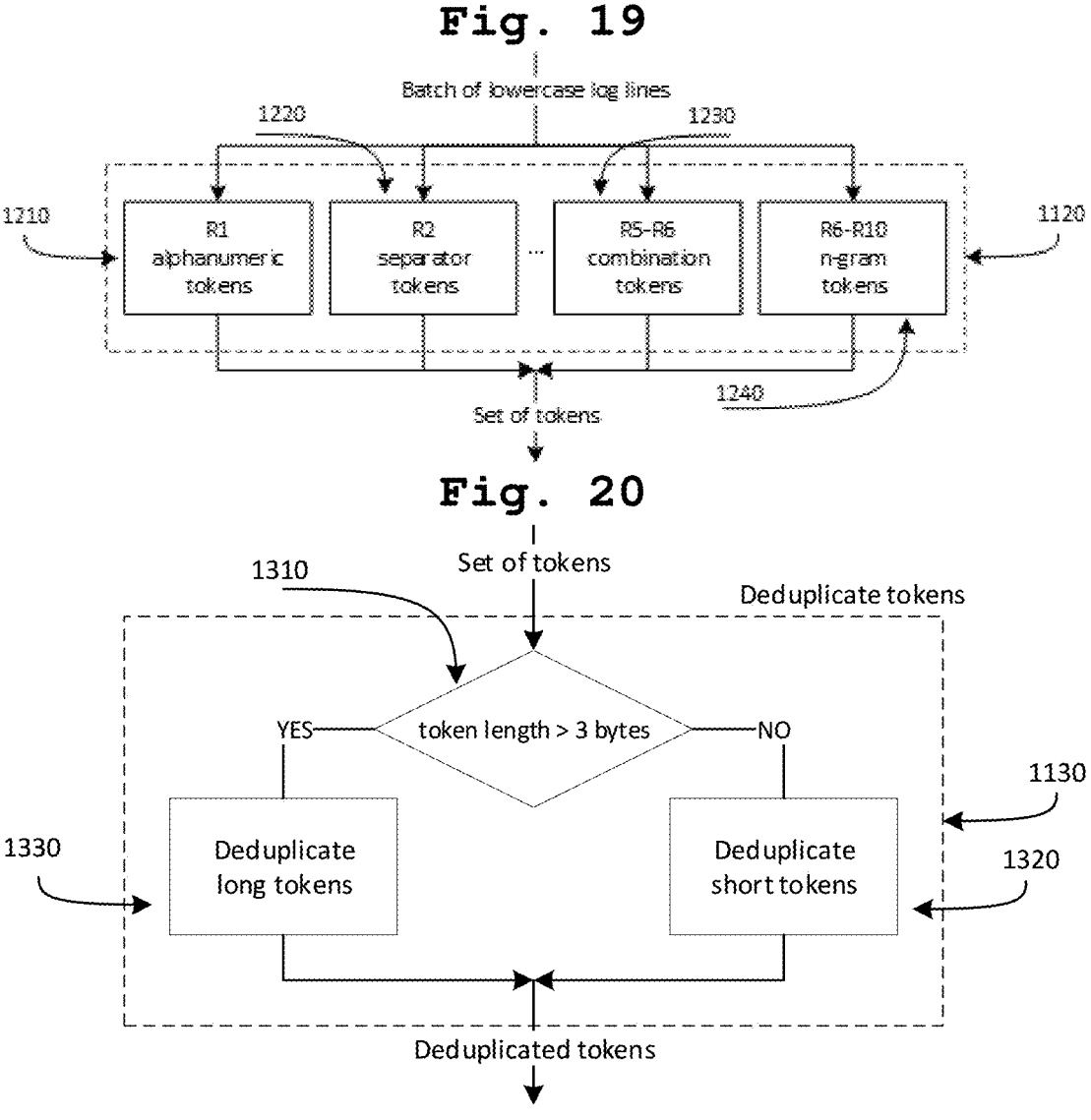
Figure 21:
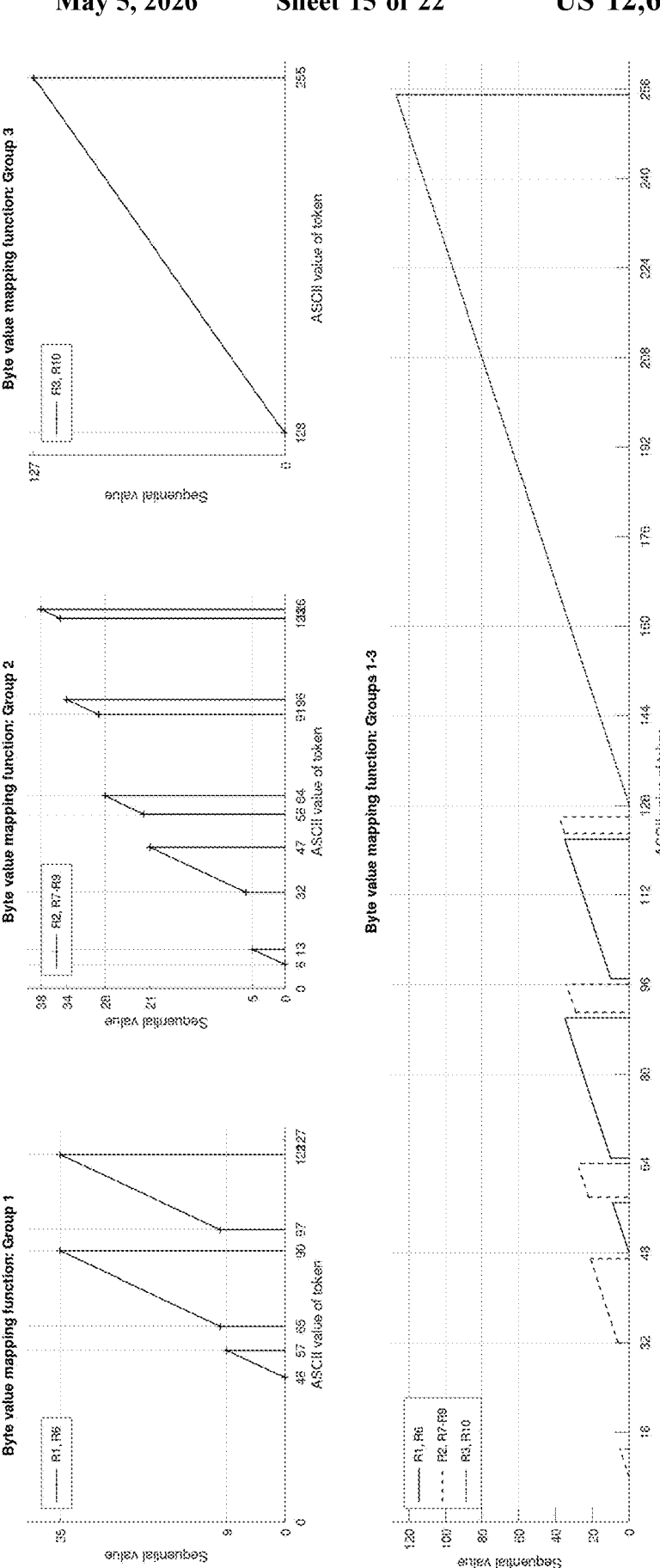
Figure 22:
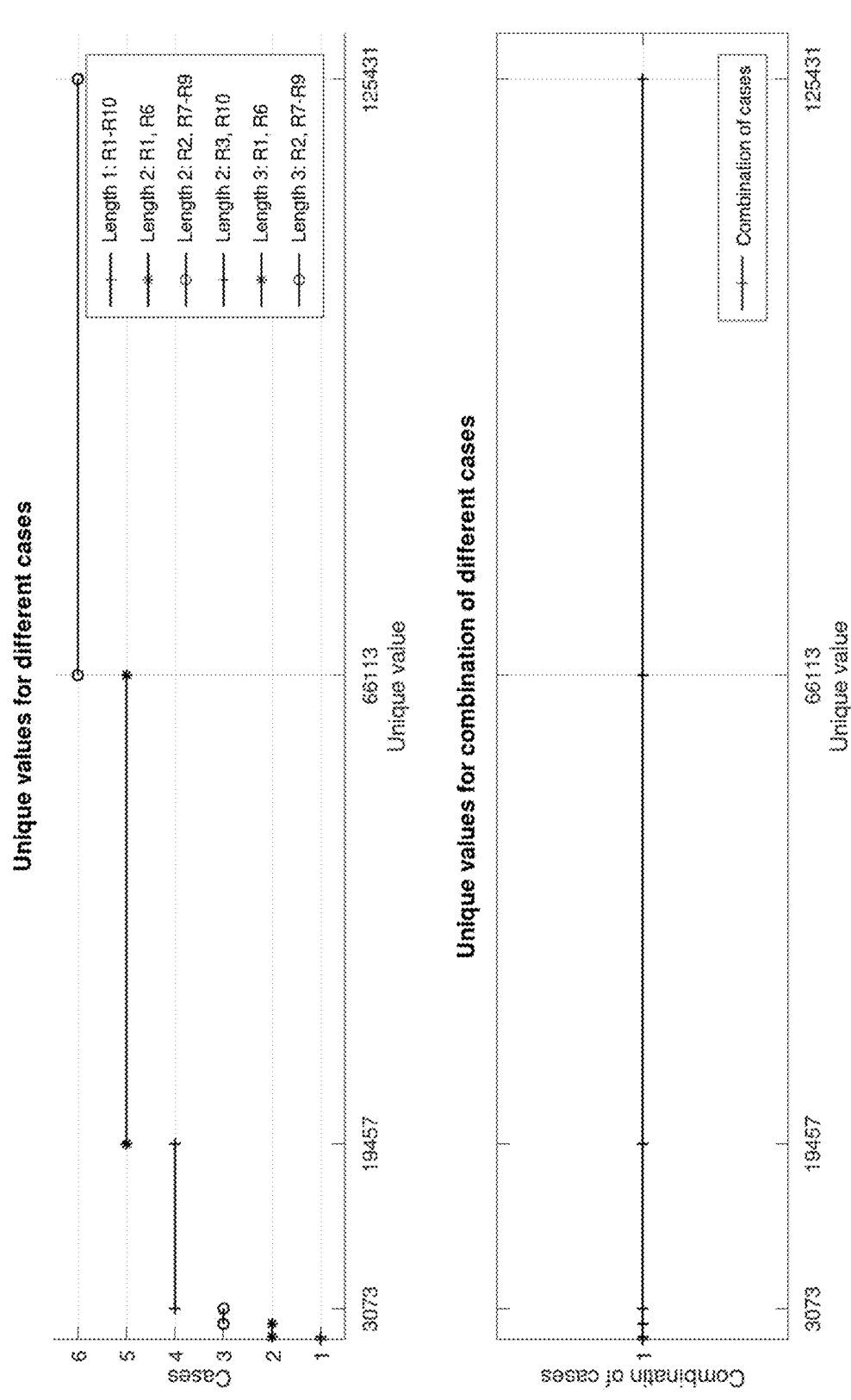
Figure 24:
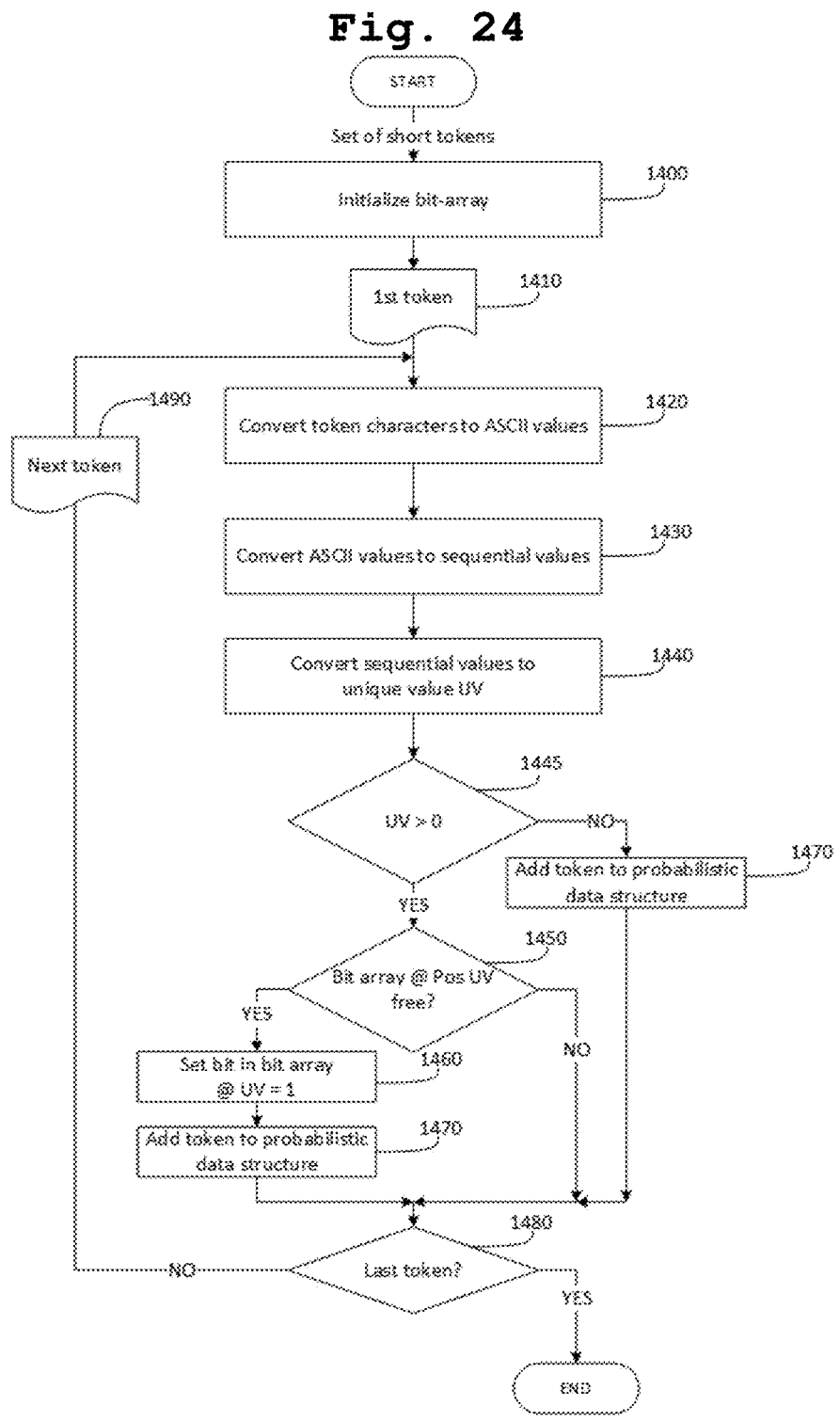
Figure 27:
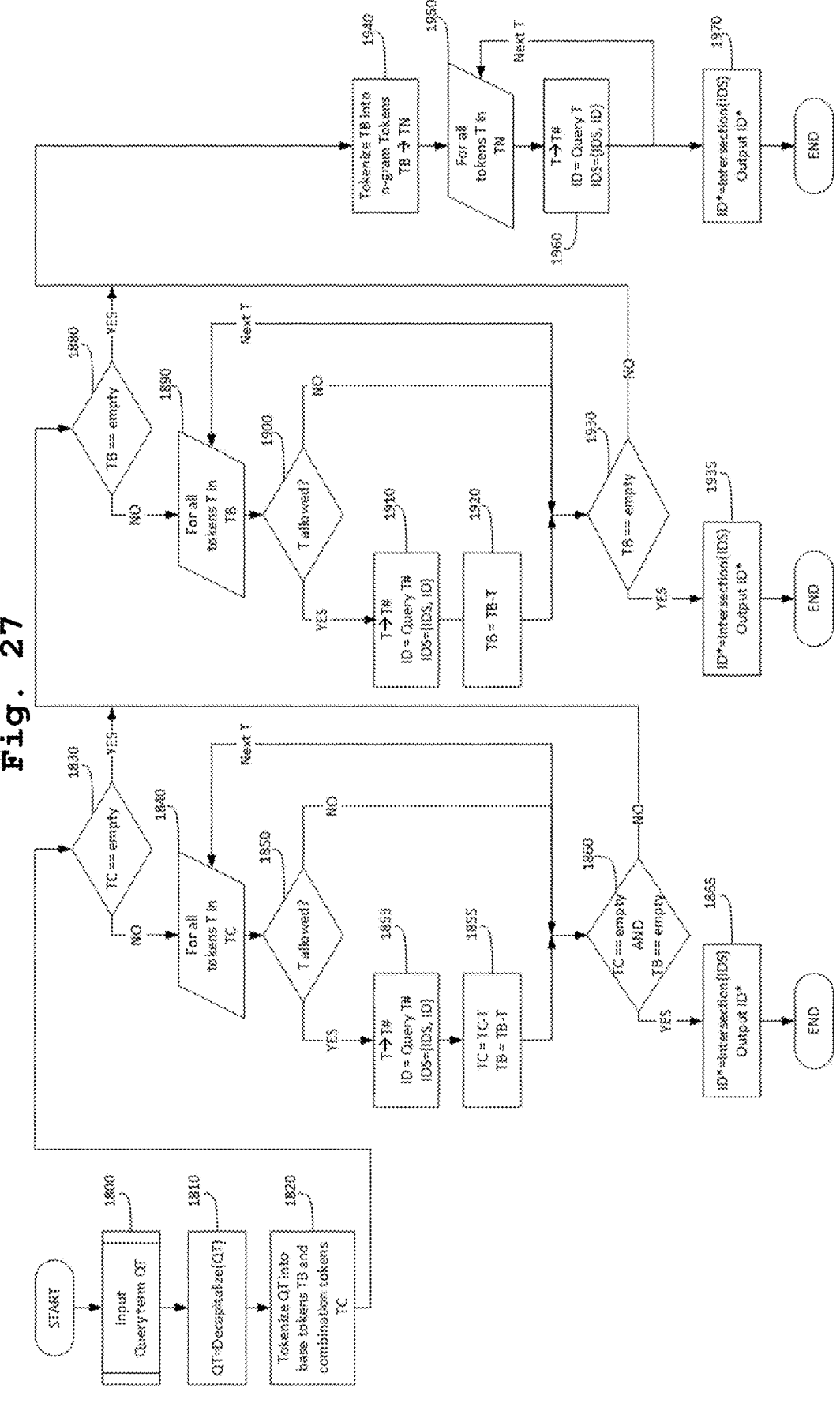

The accompanying drawings, which are incorporated in and constitute part of this specification, illustrate embodiments of the disclosure and together with the description, serve to explain the principles of the disclosure. The embodiments illustrated herein are presently preferred, it being understood, however, that the disclosure is not limited to the precise arrangements and instrumentalities shown, wherein:

FIG. 1 schematically shows two storage entities/batches containing log lines and a computer storing log lines to a probabilistic data structure, FIG. 2 shows the structure of the data tables during storing log lines to the probabilistic data structure, FIGS. 3a and 3b show the steps for storing log lines to the probabilistic data structure, FIGS. 4 and 5 show two statuses of the data tables during storing log lines to the probabilistic data structure, FIG. 6 shows a first scheme for querying the uncompressed probabilistic data structure, i.e. before compressing the probabilistic data structure, FIGS. 7 and 8 show the steps for querying the uncompressed probabilistic data structure, FIG. 9 shows a second scheme for querying the uncompressed probabilistic data structure, FIG. 10 shows the steps for compressing the probabilistic data structure, FIG. 11 shows a scheme for generating hash values for the token hashes by executing a Minimal Perfect Hash Function, FIG. 12 shows the compression ratio of the token hashes in the token map table by executing the Minimal Perfect Hash Function, FIG. 13 shows the compression ratio of the address column ADD in the token map table by executing a Compressed Static Function, FIG. 14 shows the compression ratio of the identities list IDS in the entities list table by executing a Binary Interpolative Coding, FIG. 15 show the steps for querying the compressed probabilistic data structure, i.e. after compressing the probabilistic data structure, FIG. 16 shows a file format for storing the compressed probabilistic data structure on disk or for loading it into the RAM of a computer, FIG. 17 schematically shows two computers producing streams of log lines and a computer batch wise adding log lines to the data structure, FIG. 18 shows a schema for the batch wise adding of log lines to a probabilistic data structure, FIG. 19 shows a schema for the tokenization of log lines, FIG. 20 shows the separation of tokens into long and short tokens and the respective deduplication method for both types of tokens, FIG. 21 shows the mapping from byte-values of a token character to sequential values SV, FIG. 22 shows the mapping from sequential-values SV to unique values UV, FIG. 23 shows a table of short tokens, byte values, sequential-values and unique values UV, FIG. 24 shows a schema for the deduplication of short tokens, FIG. 25 shows a schema for the deduplication of long tokens, FIG. 26 shows a token map and an entities list used for querying according to FIG. 27, FIG. 27 shows a schema for the querying of combination tokens, base tokens and n-gram tokens, and FIG. 28 shows a token map and an entities list after having added the log line L10 to a probabilistic data structure.

Corresponding reference numerals indicate corresponding parts throughout the several views of the drawings.

DETAILED DESCRIPTION

Example embodiments will now be described more fully with reference to the accompanying drawings.

A first application example shows how streams of log lines are added to an initially empty probabilistic data structure, how the data tables of the probabilistic data structure are iteratively updated when data is added, and how duplicates are handled.

FIG. 1 shows two buckets 10, 20, namely a first bucket 10 with ID 0 and a second bucket 20 with ID 1, producing two streams of log lines. It is to be understood that the log line L1 from bucket 10 arrives at the computer 30, i.e. the computer 30 adding the log line to the data structure 40, first and at that time, the computer is not aware of any data received later. After the first log line L1, three more log lines L2 . . . . L4 arrive at the computer 30. L1 and L2 originate at bucket 10 with ID 0, whereas L3 and L4 originate at bucket 20 with ID 1.

The following log lines L1 . . . . L4 are used in this example.

| Log lines | | ID |
|---|---|---|
| L1 | authenticating client with clientId 81195 | 0 |
| L2 | authentication of client 81195 failed | 0 |
| L3 | authenticating client with clientId 81195 | 1 |
| L4 | authentication of client 81195 failed | 1 |

Each log line is associated to an identity "ID", i.e. the ID of an entity, e.g. a specific storage location or data bucket, containing the log line. The disclosure is not limited to log lines/messages from specific sources. As operating systems for clients and servers, applications (both locally installed, web based and hybrid), networks including the cloud, and containers (such as Docker or Kubernetes) etc. generate log messages during their operation, all these log lines can be stored in a database or storage system. The ID is used to identify log lines from a specific source/entity and to locate/access them later in a database. The probabilistic data structure is used to add and subsequently quickly find a "keyword" (e.g. a token) in the database. If the keyword is found in the database, the ID of the entity comprising the log line containing the keyword is returned or output to the query customer.

Generally, buckets 10, 20 can be located on the same computer, or can be located at different computers. In addition, one or multiple computers can feed log data into a bucket. In many cases, data buckets are connected via the internet with computer 30. After having added the log lines to the probabilistic data structure 40, the buckets or batches containing the log lines are stored using an object storage service, such as AWS S3 (see the compressed raw data storage 740 in FIG. 16 containing batches 740-1 . . . 740-N).

In a first step 100, the log line L1 is received by the computer 30. As L1 originates at bucket 10 having the ID 0, the log line L1 and the ID form a pair (L1, 0)="(authenticating client with clientId 81195, 0)" (see block 110 in FIG. 3*a*).

In step 120, the log line L1 is split into individual tokens, in this case into n=5 tokens. This step is also called tokenizing the log line or tokenization. Different tokenization strategies can be applied at this step. In this example it is assumed that the tokens in log lines are separated by white-space characters. As this example is not about tokenization, it is not limited to a specific tokenization strategy. Each token is then combined with the ID of the log line, which results in the following list of pairs:

L1 $\left(\underbrace{\overset{token}{\text{authenticating}}, \overset{ID}{0}}_{1^{st}\,pair}\right)$, $\underbrace{\text{(client, 0)}}_{2^{nd}\,pair}$, $\underbrace{\text{(with, 0)}}_{3^{rd}\,pair}$, $\underbrace{\text{(clientId, 0)}}_{4^{th}\,pair}$, $\underbrace{\text{(81195, 0)}}_{5^{th}\,pair}$ L2 (authentication, 0), (of, 0), $\underbrace{\text{(client, 0)}}_{3^{rd}\,pair}$, $\underbrace{\text{(81195, 0)}}_{4^{th}\,pair}$, $\underbrace{\text{(failed, 0)}}_{5^{th}\,pair}$ L3 $\underbrace{\text{(authenticating, 1)}}_{1^{st}\,pair}$, (client, 1), (with, 1), (clientId, 1), (81195, 1)

L4 (authentication, 1), (of, 1), (client, 1), (81195, 1), $\underbrace{\text{(failed, 1)}}_{5^{th}\,pair}$, The 1$^{st}$ pair or pair 1 is schematically depicted in FIG. 3*a*. As FIG. 3 is too large to fit onto one page, the figure is split into two, namely FIG. 3*a* showing the top part and FIG. 3*b* showing the bottom part. A dotted and dashed line shows the split between the upper and the lower part.

In this application example, the mutable probabilistic data structure before compression comprises three data tables, namely a table Token Map, a table Entities List and a table Lookup Map (see FIG. 2). FIG. 2 shows these tables with some data; however, the shown data is not limiting. The term mutable means that the construction of the data structure is not yet finished, i.e. that more data may be added during the ongoing construction of the probabilistic data structure. The token map table comprises two columns, one column titled "TokenHash" containing the token hashes of the tokens and another column titled "ADD" containing addresses or pointers to respective rows in the entities list. The entities list table comprises four columns in this example, one column titled "ADD" containing addresses of the respective rows in the entities list. This column "ADD" is not a separate column as such as it contains the addresses of the rows in the entities list table only. As every row in a table inherently has an address, the address does not need to be stored separately in the entities list table. The second column titled "TC", which is short for token count, contains the numbers of tokens linked to or pointing to the respective row in the entities list. The third column titled "IDS #" contains the hash values of the column IDS, and the fourth column titled "IDS" contains a list of identities, e.g. "0, 1". The lookup map table comprises two columns, one titled "IDS #" and another one titled "ADD", both as described above. All data tables are initially empty. In addition to the three data tables, for some steps a Temporary Entities List is used.

During the process of storing log lines to the probabilistic data structure the Lookup Map is not strictly necessary, as it was introduced to improve performance only. In other words, it would be possible to search the column "IDS" of the entities list table, whether and where a specific list of identities IDS is present. As both the length of the entities list and the length of individual identities lists IDS may be different, searching has quadratic complexity O(n²) and the access time varies widely. In the application example, the lookup map contains the address ADD of a row in the entities list and consequently, searching IDS has constant complexity O(1) and constant access time.

After tokenizing L1, each pair is added separately to the probabilistic data structure. The process is started with the 1ˢᵗ pair of L1. In step 130, a 4-byte hash value is calculated for the token T₁ "authenticating" of the first pair, resulting in the pair (T #, ID). The hash values are represented by hexadecimal strings, for example:

| (T, ID) | → | (T#, ID) |
|---|---|---|
| (authenticating, 0) | → | (0xd9a3428f, 0) |

The hash value T # can be considered as a compact signature of the token T. The token "authenticating" has a length of 14 bytes, whereas the token hash is 4 bytes long. In this example, all token hashes T # have a length of 4 bytes, irrespective of the length of the token. Many hashing functions exist mapping a token to a 4-byte hash value, e.g. CRC-32.

In step 140, the token map is checked for the presence of the token hash "0xd9a3428f".

TABLE 1

| Token Map | |
|---|---|
| TokenHash | ADD |

As the token map is initially empty (see Table 1), the token hash "0xd9a3428f" is not contained in the token map. Since the token map shall contain all unique token hashes being present in the data structure, the token hash T # is added to the token map in step 150. The address field ADD in the 1ˢᵗ row of the token map is left empty for the time being (see Table 2).

TABLE 2

| Token Map | |
|---|---|
| Token Hash | ADD |
| 0xd9a3428f | |

In step 160, IDS is set to the entity ID, i.e. IDS: ="0". In step 170, the hash value IDS # for IDS is computed by applying a hash function to IDS. In our case, IDS # is "0x2362f9de". In step 175, the tuple (1, IDS #, IDS) is written to a temporary variable, called the temporary entities list, see Table 3:

TABLE 3

| Temporary Entities list | | |
|---|---|---|
| TC | IDS# | IDS |
| 1 | 0x2362f9de | 0 |

In step 180, it is checked whether the lookup map contains IDS #. Since the lookup map is initially empty, it does not contain 0x2362f9de.

TABLE 4

| Lookup Map | |
|---|---|
| IDS# | ADD |

In step 190, the temporary entities list is added to the initially empty entities list table. Each row in the entities list table has an address ADD, which can be used to access the respective row in the entities list. In step 200, the variable ADD is set to the new row just added to the entities list table; in this example, the first row is assumed to have the address "0" (see Table 5).

TABLE 5

| Entities List | | | |
|---|---|---|---|
| ADD | TC | IDS# | IDS |
| 0 | 1 | 0x2362f9de | 0 |

In step 210, IDS # and ADD are added to the lookup map (see Table 6), wherein ADD serves as a pointer to a specific row in the entities list.

TABLE 6

| Lookup Map | |
|---|---|
| IDS# | ADD |
| 0x2362f9de | 0 |

Finally in step 220, the address ADD "0" is added to the row of the token map containing the token hash of the $1^{st}$ token of L1. As ADD is contained in the token map, the entities list and the lookup map, all data tables are linked to each other, and corresponding entries can be found and accessed quickly. In order to improve the readability of this example, the token is subsequently printed in parenthesis next to the token hash in the token map. In reality, only the token hash is stored in the token map, not the token itself.

TABLE 7

| Token Map | |
| --- | --- |
| TokenHash | ADD |
| 0xd9a3428f (authenticating) | 0 |

After incrementing the counter i by 1 to i=2 in step 230, the second pair of L1 is added to the data structure. First, the token "client" is hashed.

| (Token, ID) | → | (T#, ID) |
| --- | --- | --- |
| (client, 0) | → | (0x09e9758e, 0) |

Since T # is not present in the token map, T # is added to the token map.

TABLE 8

| Token Map | |
| --- | --- |
| TokenHash | ADD |
| 0xd9a3428f (authenticating)<br>0x09e9758e (client) | 0 |

Next, the temporary entities list is formed in an analogous manner to the previous token.

TABLE 9

| Temporary Entities list | | |
| --- | --- | --- |
| TC | IDS# | IDS |
| 1 | 0x2362f9de | 0 |

In step 180 it is checked whether the lookup map already contains IDS #. In this case, the lookup map refers to the $1^{st}$ row of the entities list having the address ADD "0". The address ADD is read from the lookup map (step 240).

In step 250 the token count TC in the entities list is increased by 1 to 2. Finally, in step 260 the address ADD of the $1^{st}$ row in the entities list is written into the token map, such that also the second row refers to the $1^{st}$ row of the entities list. The status of the resulting data structure is given below:

TABLE 10

| Token Map | |
| --- | --- |
| TokenHash | ADD |
| 0xd9a3428f (authenticating)<br>0x09e9758e (client) | 0<br>0 |

TABLE 11

| Entities list | | | |
| --- | --- | --- | --- |
| ADD | TC | IDS# | IDS |
| 0 | 2 | 0x2362f9de | 0 |

TABLE 12

| Lookup Map | |
| --- | --- |
| IDS# | ADD |
| 0x2362f9de | 0 |

The same steps are repeated for all remaining pairs of L1 and the $1^{st}$ and $2^{nd}$ pair of the second log line L2, resulting in the following state of the data structure:

TABLE 13

| Token Map | |
| --- | --- |
| TokenHash | ADD |
| 0xd9a3428f (authenticating) | 0 |
| 0x09e9758e (client) | 0 |
| 0xd112a2e8 (with) | 0 |
| 0x7003937f (clientId) | 0 |
| 0x63a2c684 (81195) | 0 |
| 0xc1e61e57 (authentication) | 0 |
| 0x3cb4f048 (of) | 0 |

TABLE 14

| Entities list | | | |
| --- | --- | --- | --- |
| ADD | TC | IDS# | IDS |
| 0 | 7 | 0x2362f9de | 0 |

TABLE 15

| Lookup Map | |
| --- | --- |
| IDS# | ADD |
| 0x2362f9de | 0 |

The next particularly interesting case happens when the $3^{rd}$ pair of L2 is added to the probabilistic data structure, since this specific combination of token and ID was already added to the data structure before.

In step 130 the token is transformed to the token hash value:

| (Token, ID) | → | (T#, ID) |
| --- | --- | --- |
| (client, 0) | → | (0x09e9758e, 0) |

When checking the token map in step 140, the existing entry

| TokenHash | ADD |
| --- | --- |
| 0x09e9758e (client) | 0 | is found, therefore the YES path in the IF block 140 is executed. In step 300, the address ADD "0" of the $2^{nd}$ row of the token map is read in. Next, the field IDS in the $1^{st}$ row of the entities list having the address "0" is read-in (step 310) and it is checked, whether ID is contained in IDS (step 320). The check is performed by binary searching for the ID "0" within the IDS field. Since the identity ID "0" is contained in the respective row in the entities list, no other steps need to be done and the next token can be processed. After this, the status of the data structure is:

TABLE 16

| Token Map | |
|---|---|
| TokenHash | ADD |
| 0xd9a3428f (authenticating) | 0 |
| 0x09e9758e (client) | 0 |
| 0xd112a2e8 (with) | 0 |
| 0x7003937f (clientId) | 0 |
| 0x63a2c684 (81195) | 0 |
| 0xc1e61e57 (authentication) | 0 |
| 0x3cb4f048 (of) | 0 |

TABLE 17

| Entities list | | | |
|---|---|---|---|
| ADD | TC | IDS# | IDS |
| 0 | 7 | 0x2362f9de | 0 |

TABLE 18

| Lookup Map | |
|---|---|
| IDS# | ADD |
| 0x2362f9de | 0 |

The $4^{th}$ and $5^{th}$ pair of L2 are added to the data structure as described above. After this, the status of the data structure is as follows:

TABLE 19

| Token Map | |
|---|---|
| TokenHash | ADD |
| 0xd9a3428f (authenticating) | 0 |
| 0x09e9758e (client) | 0 |
| 0xd112a2e8 (with) | 0 |
| 0x7003937f (clientId) | 0 |
| 0x63a2c684 (81195) | 0 |
| 0xc1e61e57 (authentication) | 0 |
| 0x3cb4f048 (of) | 0 |
| 0xdcf4527d (failed) | 0 |

TABLE 20

| Entities list | | | |
|---|---|---|---|
| ADD | TC | IDS# | IDS |
| 0 | 8 | 0x2362f9de | 0 |

TABLE 21

| Lookup Map | |
|---|---|
| IDS# | IDS |
| 0x2362f9de | 0 |

After receiving the third log line L3 from the steam of log lines (step 100) and tokenizing it (step 120), the five pairs of the third log line L3 are added to the data structure, leading to some additional new cases.

In step 130, the hash for the $1^{st}$ pair of L3 is calculated:

| (T, ID) | $\rightarrow$ | (T#, ID) |
|---|---|---|
| (authenticating, 1) | $\rightarrow$ | (0xd9a3428f, 1) |

When checking the token map for the presence of the token hash "0xd9a3428f", the address ADD "0" of the $1^{st}$ row of the entities list is found. After reading the field IDS from the $1^{st}$ row of the entities list linked to the token map and searching it whether it contains the ID "1", it is confirmed that the ID "1" is not present (step 320). Therefore, the NO path in the IF block 320 is executed.

In step 330, the ID "1" is added to the list of identities IDS, making IDS: ="0, 1". Step 340 specifies that the hash value IDS # for the list of identities IDS is calculated. The hash function used to update IDS # is a commutative hash function. A commutative hash function is not just computationally more efficient than a "normal" or non-commutative hash function, the resulting hash value is also independent from the order of hashing done. A function F: A×B à A is said to be commutative if $$F(F(a, b), c) = F(F(a, c), b), \text{ for all } a \in A \text{ and } b, c \in B$$

Coming back to our example: Applying a commutative hash function for hashing the list of identities IDS "0, 1" creates the same results as hashing the identities ID "1, 0". Hashing IDS "0, 1" creates the hash value IDS #0x3ad85688. Each identity ID is first hashed individually with a classic, non-commutative hash function. This ensures a uniform distribution of the resulting 4-byte hash values over the whole 4-byte value range. The hash values of the individual identities are then combined via a bitwise "XOR" operation, which is by definition commutative. The hash value of an identities list IDS containing only a single ID is equal to the hash value of the single ID. To "extend" a hash value IDS with another ID, the ID to be added is hashed individually first, and the resulting hash is then combined through the bitwise XOR operation with the previous hash value IDS #. This process guarantees a constant runtime for the update of an IDS #, independent of the number of identities in the entities list IDS.

Let us show this by way of an example: The hash value IDS # for the ID "0" is 0x2362f9d2 (see above) or binary "0010 0011 0110 0010 1111 1001 1101 0010". The hash value IDS # for the ID "1" is 0x19baaf5a or binary "0001 1001 1011 1010 1010 1111 0101 1010". Performing a binary "XOR" (or Exclusive Or) operation on both hash values results in 0x3ad85688 or binary "0011 1010 1101 1000 0101 0110 1000 1000" (see also below). This value is identical to the hash value IDS # for the list of identities IDS (0, 1).

| IDS | | IDS# | | | | | | | |
|---|---|---|---|---|---|---|---|---|---|
| 0 | a = | 0010 | 0011 | 0110 | 0010 | 1111 | 1001 | 1101 | 0010 |
| 1 | b = | 0001 | 1001 | 1011 | 1010 | 1010 | 1111 | 0101 | 1010 |
| | XOR(a, b) | 0011 | 1010 | 1101 | 1000 | 0101 | 0110 | 1000 | 1000 |
| 0, 1 | | 0011 | 1010 | 1101 | 1000 | 0101 | 0110 | 1000 | 1000 |

Since the commutative hash function is implemented by two non-commutative hash functions in combination with a bitwise XOR function, the hash value of the IDS, IDS #, is stored in both the temporary entities list as well as in the entities list. In other words, it is very beneficial to store IDS # for IDS, since-if another ID, say identity ID=b, is added to IDS, then the commutative hash value for the entities IDs (a,b) is simply the result of the bitwise XOR operation being performed on the IDS # value for the ID (a) and the IDS # for the ID (b). Please note that the ID (a) can be a single identity ID, such as "0", or already a (long) list of identities IDS.

| IDS# | IDS |
|---|---|
| xx | (a) |
| yy | (b) |
| XOR(xx, yy) | (a, b) |

The token count TC in the temporary entities list is set to one. The resulting temporary entities list is shown below (see step 350):

TABLE 22

| Temporary Entities list | | |
|---|---|---|
| TC | IDS# | IDS |
| 1 | 0x3ad85688 | 0, 1 |

In step 360 the token count in the entities list table is decreased by one, i.e. reducing TC from 8 to 7.

Subsequently step 180 checks whether the lookup map contains IDS #"0x3ad85688". As this is not the case, the NO path of the IF block 180 is executed. In step 190, the temporary entities list is added to the entities list table. ADD is set to the address of the new row in the entities list, in our case ADD=1. In addition, IDS # and ADD are added to the lookup map (step 210). Furthermore, in step 220, ADD is added to the token map to point to the new row 1 in the entities list. Performing all these steps, results in the following status of the probabilistic data structure (see also FIG. 4):

TABLE 23

| Token Map | |
|---|---|
| TokenHash | ADD |
| 0xd9a3428f (authenticating) | 1 |
| 0x09e9758e (client) | 0 |
| 0xd112a2e8 (with) | 0 |
| 0x7003937f (clientId) | 0 |
| 0x63a2c684 (81195) | 0 |
| 0xc1e61e57 (authenticating) | 0 |
| 0x3cb4f048 (of) | 0 |
| 0xdcf4527d (failed) | 0 |

TABLE 24

| Entities list | | | |
|---|---|---|---|
| ADD | TC | IDS# | IDS |
| 0 | 7 | 0x2362f9de | 0 |
| 1 | 1 | 0x3ad85688 | 0, 1 |

TABLE 25

| Lookup Map | |
|---|---|
| IDS# | IDS |
| 0x2362f9de | 0 |
| 0x3ad85688 | 1 |

The above steps are repeated for all other pairs but the last pair of the last log line L4, leading to the following status of the data structure:

TABLE 26

| Token Map | |
|---|---|
| TokenHash | ADD |
| 0xd9a3428f (authenticating) | 1 |
| 0x09e9758e (client) | 1 |
| 0xd112a2e8 (with) | 1 |
| 0x7003937f (clientId) | 1 |
| 0x63a2c684 (81195) | 1 |
| 0xc1e61e57 (authentication) | 1 |
| 0x3cb4f048 (of) | 1 |
| 0xdcf4527d (failed) | 0 |

TABLE 27

| Entities list | | | |
|---|---|---|---|
| ADD | TC | IDS# | IDS |
| 0 | 1 | 0x2362f9de | 0 |
| 1 | 7 | 0x3ad85688 | 0, 1 |

TABLE 28

| Lookup Map | |
|---|---|
| IDS# | IDS |
| 0x2362f9de | 0 |
| 0x3ad85688 | 1 |

The very last pair, i.e. the $5^{th}$ pair of L4, leads to another special case during the construction of the probabilistic data structure. As before, the token is first hashed into a 4-byte hash:

| (T, ID) | → | (T#, ID) |
|---|---|---|
| (failed, 1) | → | (0xdcf4527d, 1) |

As for some earlier tokens, the token hash 0xdcf4527d is contained in the token map and the token map is referencing to the 1$^{st}$ row with ADD=0 of the entities list. After decrementing the token count by 1 to 0 in the entities list (step 360), the YES path of the IF block 370 is executed. In this path, the row in the entities list table with ADD=0 is removed (step 380) and the row having the entities ID hash 0x2362f9de in the lookup map is removed too (step 390). The unused rows in these tables can be reused later. The removal of the 1$^{st}$ row in the entities list and the 1$^{st}$ row in the lookup map are indicated by crossing out the rows in FIG. 5.

The final state of the data structure in this example is given below:

TABLE 29

| Token Map | |
|---|---|
| TokenHash | ADD |
| 0xd9a3428f (authenticating) | 1 |
| 0x09e9758e (client) | 1 |
| 0xd112a2e8 (with) | 1 |
| 0x7003937f (clientId) | 1 |
| 0x63a2c684 (81195) | 1 |
| 0xc1e61e57 (authentication) | 1 |
| 0x3cb4f048 (of) | 1 |
| 0xdcf4527d (failed) | 1 |

TABLE 30

| Entities List | | | |
|---|---|---|---|
| ADD | TC | IDS# | IDS |
| 1 | 8 | 0x3ad85688 | 0, 1 |

TABLE 31

| Lookup Map | |
|---|---|
| IDS# | ADD |
| 0x3ad85688 | 1 |

Instead of storing the identities IDs in the column IDS of the entities list as a list of separate identities (e.g. the identities 0 and 1 in Table 30 above), the identities can also be stored in a bit array. In this case, a maximum number of identities is defined, e.g. 4096 identities, and a bit array of corresponding length is allocated (for storing max. 4096 different identities, only 12 Bytes are required). So in order to store the identities 0 and 1 in a 4096-bit array corresponding to the entries 0 and 1 of Table 30, only the bits at position 0 and 1 are set to 1 and all other bits of the bit array are set to 0. The alternative representation of identities IDs in the entities list IDS is particularly suitable for densely populated identities lists IDS since e.g. a list of 256 identities, where each identity is stored by a 2-byte integer value, already takes up the same amount of memory as a 512-Byte bit array capable of storing 4096 different identities in the entities list IDS.

According to another embodiment of the disclosure, the size of the mutable probabilistic data structure is kept within a size limit, e.g. a limit of 32 MB. Once the size in memory of the mutable data structure exceeds the size limit, the data structure is compressed into an immutable data structure which is written to disk. Additional data is written into an additional, initially empty data structure. This produces a segmented probabilistic data structure. It is evident that querying the segmented probabilistic data structure involves querying of all segments and merging of the query results from the individual segments.

In the next application example it will be demonstrated how queries are executed on the mutable data structure as constructed above. The following state of the data structure will be assumed. The lookup map is irrelevant for querying:

TABLE 32

| Token Map | |
|---|---|
| TokenHash | ADD |
| 0xd9a3428f (authenticating) | 1 |
| 0x09e9758e (client) | 1 |
| 0xd112a2e8 (with) | 1 |
| 0x7003937f (clientId) | 1 |
| 0x63a2c684 (81195) | 1 |
| 0xc1e61e57 (authentication) | 1 |
| 0x3cb4f048 (of) | 1 |
| 0xdcf4527d (failed) | 1 |

TABLE 33

| Entities List | | | |
|---|---|---|---|
| ADD | TC | IDS# | IDS |
| 1 | 8 | 0x3ad85688 | 0, 1 |

Every query starts with a list (including a list with a single element) of query tokens T for which the matching identities IDS are accessed in the probabilistic data structure; the query consumer is notified about the matching identities IDS for the queried tokens by outputting IDS. In case the hashes of the query tokens are not contained in the token map, an empty list of identities IDS is output to the query consumer. For some queries it is required that the query consumer indicates whether the query should be continued or aborted. When a query is aborted, the remaining query tokens will not be processed. Query consumers can combine the identities IDS of different rows of the entities list by the application of Boolean logic. For example, a query consumer might only be interested in identities which appear in all rows of the entities list of the queried tokens. In this case, the query performance is improved by aborting the query once the intersection of the processed entities lists is empty. In case where multiple query tokens reference the same row of the entities list, the identities IDS will be passed to the query consumer only once. This deduplication of lists during querying is a unique capability of the probabilistic data structure according to the disclosure and is possible because lists of identities IDS are kept only once in the data structure. This improves query performance considerably by reducing the number of identities which need to be decoded and processed. Deduplication does not influence the set of matching identities if the identities of different entities lists are combined through Boolean logic.

FIGS. 6 and 7 show a first application example for querying, when the hash value of a single token is not contained within the token map.

After inputting the query token T in step 500, the token hash T # is calculated in step 510. The hash function used during querying is the same hash function used during the construction of the probabilistic data structure.

| Token T | à | Token hash T# |
|---------|---|---------------|
| unknown | à | 0xc16814de |

In step 520, a lookup is performed within the Token Map for the calculated token hash T #. As the token map does not contain T #, IDS is set to be an empty list, i.e. IDS: =" " (step 530), and in step 540 an empty list of identities is output to the query consumer. In FIG. 7, the YES path of the IF block 520 is displayed dotted as this path it is not taken. Since only one query token was involved in this query, the query is finished.

FIGS. 8 and 9 illustrate a second application example for querying. In this case, the query tries to access the identities IDS of a single token "failed" which is contained within the token map. In step 510, the token hash T # is calculated for the query token T.

| Token T | à | Token hash T# |
|---------|---|---------------|
| failed | à | 0xdcf4527d |

In this case, the token map contains an entry for the queried token hash and refers to the row having the address ADD "1" in the entities list. In steps 550 and 560, the row of the entities list with ADD "1" is accessed and IDS="0, 1" is read in. In step 540, the matching IDS are output to the query consumer.

Finally, a more complex query with multiple query tokens is presented. In step 510, the token hashes T # of the individual query tokens T are calculated:

| Token T | à | Token hash T# |
|---------|---|---------------|
| client | à | 0x09e9758e |
| failed | à | 0xdcf4527d |
| unknown | à | 0xc16814de |
| 81195 | à | 0x63a2c684 |

The token map contains an entry for the first token hash "0x09e9758e", pointing to the row of the entities list with ADD "1". The identities IDS "0" and "1" are output to the query consumer. Let's assume the query consumer indicates to continue the query. The token map also has an entry for the second token hash "0xdcf4527d", again pointing to the same row of the entities list. Since the identities IDS were already output to the query consumer, they are not output again. In this case, the query consumer cannot provide an indicator for the query continuation and the query is continued by default.

For the third token hash—"0xc16814de"—the token map does not contain an entry and an empty list " " of identities IDS is output to the query consumer. Let's assume the query consumer indicates to abort the query. The query execution stops and the last query token "81195" is not processed anymore.

The compression of probabilistic data structure by transforming it from a mutable probabilistic data structure into an immutable probabilistic data structure designed for long term storage will be demonstrated in the next two application examples. The term mutable means that the construction of the data structure is not yet finished, i.e. that additional log lines or tokens may be added to the data structure. Contrary to this, the term immutable means that the construction of the probabilistic data structure is finished, and no additional log lines/tokens are going to be added to the data structure. By finishing the construction of the data structure or in other words, allowing the data structure to become immutable at some time, enables the disclosure to employ a multitude of optimization strategies aimed at reducing the size on disk of the data structure. The probabilistic data structure may be declared finished e.g. after a certain period of time, e.g. after 1 day, or after the size of the mutable data structure reaches a size limit. In both cases, the previous/earlier data structure will be declared immutable and additional log lines/tokens will be added to a new probabilistic data structure.

FIG. 10 shows that the compression of the probabilistic data structure can be separated into three main parts, viz. i) encoding the column TokenHash containing token hashes in the token map (step 600), ii) encoding the column ADD containing pointers from the token map to the entities lists (step 610), and iii) encoding of the list of identities IDS in the entities list (step 620).

We will assume the following state for the token map and entities list, which will subsequently be transformed into the immutable probabilistic data structure. The lookup map is irrelevant for compression.

TABLE 34

| Token Map | |
|---|---|
| TokenHash | ADD |
| 0xd9a3428f (authenticating) | 1 |
| 0x09e9758e (client) | 1 |
| 0xd112a2e8 (with) | 1 |
| 0x7003937f (clientId) | 1 |
| 0x63a2c684 (81195) | 0 |
| 0xc1e61e57 (authentication) | 2 |
| 0x3cb4f048 (of) | 1 |
| 0xdcf4527d (failed) | 2 |

TABLE 35

| Entities List | | | |
|---|---|---|---|
| ADD | TC | IDS# | IDS |
| 0 | 1 | 0xfbf1402a | 1 |
| 1 | 5 | 0x5a140182 | 0, 1, 3, 5, 6 |
| 2 | 2 | 0xe0eb777a | 0, 2 |

For the encoding of the 4-byte token hashes (column TokenHash), we are using an algorithm from the class of "Minimal Perfect Hash Functions" (short MPHF). A MPHF maps a static set K of keys (our token hashes) to the value range $[0, |K|-1]$, without any gaps or collisions. The information theoretic space lower bound for an MPHF is $\log_2 e \approx 1.44$ bits per key, while most practical implementations achieve roughly 3 bits per key. As a tradeoff, the MPHF usually returns an arbitrary value within the value range $[0, |K|-1]$ when accessed with a key which is not included in the static set K.

While any MPHF implementation could be used for the token hash encoding, the BBHash algorithm is used in this example due to its simplicity and fast construction speed.

To start the construction of the BBHash structure, we need to create a bit set. In the simplest case, the length of the bit set is set equal to the number of token hashes in our token map. This first bit set is called "level 0". As our token map contains 8 token hashes, "level 0" has eight bits, labeled 0 to 7. Initially, all bits are set to zero.

TABLE 36

| BBHash Level 0 - Initial setting | | | | | | | | |
|---|---|---|---|---|---|---|---|---|
| Position | 0 | 1 | 2 | 3 | 4 | 5 | 6 | 7 |
| Bit | 0 | 0 | 0 | 0 | 0 | 0 | 0 | 0 |

Each token hash now needs to be mapped to a position within level 0. Usually, a hash function is first applied to the key, to ensure a uniform distribution, and then a modulo operation is used to map the hashed key to a position. Since our token hashes are already uniformly distributed, this step can be skipped for the first level. Let us assume that the token hashes are mapped to the following positions:

| TokenHash | à | Position |
|---|---|---|
| 0xd9a3428f | à | 6 |
| 0x09e9758e | à | 0 |
| 0xd112a2e8 | à | 3 |
| 0x7003937f | à | 1 |
| 0x63a2c684 | à | 6 |
| 0xc1e61e57 | à | 2 |
| 0x3cb4f048 | à | 3 |
| 0xdcf4527d | à | 5 |

In the next step, a bit in level 0 is set to "1", if exactly one token hash maps its position. This results in the following state for level 0. If more than one token hash maps to some position, a collision occurs and the bit in level 0 stays zero.

TABLE 37

| BBHash Level 0 | | | | | | | | |
|---|---|---|---|---|---|---|---|---|
| Position | 0 | 1 | 2 | 3 | 4 | 5 | 6 | 7 |
| Bit | 1 | 1 | 1 | 0 | 0 | 1 | 0 | 0 |

For all token hashes involved in collisions (i.e. token hashes 0xd112a2e8 and 0x3cb4f048 both pointing to position 3, and token hashes 0xd9a3428f and 0x63a2c684 both pointing to position 6), another level is constructed. This process of creating levels will be repeated until no more collisions occur. Since four collisions occurred in level 0, level 1 will have a size of four bits, again initially set to zero.

TABLE 38

| BBHash Level 1 - Initial setting | | | | |
|---|---|---|---|---|
| Position | 0 | 1 | 2 | 3 |
| Bit | 0 | 0 | 0 | 0 |

Let's assume the collided token hashes map to the following positions within level 1.

| Token hash | à | Position |
|---|---|---|
| 0xd9a3428f | à | 2 |
| 0xd112a2e8 | à | 3 |
| 0x63a2c684 | à | 1 |
| 0x3cb4f048 | à | 0 |

These positions result in the following state for level 1:

TABLE 39

| BBHash Level 1 | | | | |
|---|---|---|---|---|
| Position | 0 | 1 | 2 | 3 |
| Bit | 1 | 1 | 1 | 1 |

Since level 1 has no more collisions, no further level needs to be added, resulting in the following final state for all levels:

TABLE 40

| BBHash Levels 0 and 1 | | | | | | | | | |
|---|---|---|---|---|---|---|---|---|---|
| Level | | | | | | | | | |
| 0 | Position | 0 | 1 | 2 | 3 | 4 | 5 | 6 | 7 |
| | Bit | 1 | 1 | 1 | 0 | 0 | 1 | 0 | 0 |
| 1 | Position | 0 | 1 | 2 | 3 | | | | |
| | Bit | 1 | 1 | 1 | 1 | | | | |

The minimal perfect hash value (abbreviated as MPH or TokenHash*) for a token hash T can be directly inferred from these levels. Let's look at an example for the token hash 0x63a2c684 of the token "81195":

First, the token hash will be mapped to a position within level 0, exactly as during the construction of the levels. The token hash maps to position 6 within level 0. Since the bit at position 6 is zero, the algorithm must proceed to level 1. Now, the token hash is mapped to position 1 within level 1. Since no collision occurs at the mapped position at level 1, a match has been found and the bit at position 1 is set to one. The MPH of the token hash 0x63a2c684 is now defined as the number of bits set one until a match is found (in this case, finding the position 1 in level 1), including the 1-bits from all lower levels. In other words, as the match for the token hash 0x63a2c684 is at level 1, position 1, the "1" bits until that position need to be summed up. Starting at position 0 at level 0, four bits are set at 1 at level 0, and continuing at level 1, 1 more bit set at 1 needs to be added until the position 1 at level 1 is reached. This results in a total of 5 bits set at 1. Therefore, the token hash 0x63a2c684 is mapped to 5. The counting of bits is also shown in FIG. 11.

Let's do one more example. For the token hash 0xd112a2e8 (token with) no match can be found on level 0, however, a match is found on level 1 at position 3. Summing up 3 bits set at 1 at level 0 and 3 bits (position 3) at level 1, results in a total of 7 bits set at 1. Therefore, the token hash 0xd112a2e8 is mapped to 7.

If this process would not encounter a 1-bit throughout all levels, the accessed token hash wasn't included in the initial key set used for the construction of the levels.

Applying these steps to all token hashes, results in the following MPHs (see also column Token Hash* in FIG. 12):

| TokenHash T# | à | MPH = T#* (Decimal notation) |
|---|---|---|
| 0xd9a3428f | à | 6 |
| 0x09e9758e | à | 0 |
| 0xd112a2e8 | à | 7 |
| 0x7003937f | à | 1 |
| 0x63a2c684 | à | 5 |
| 0xc1e61e57 | à | 2 |
| 0x3cb4f048 | à | 4 |
| 0xdcf4527d | à | 3 |

The counting of preceding 1-bits needs to be done whenever the MPH of a token hash is needed. This process can be sped up by pre-calculating these counts for some of the bit positions in regular intervals. This ensures that only the bits between two pre-calculated intervals need to be counted when the MPH for a token hash is accessed. Data structures which pre-calculate the sums of preceding values within sequences are sometimes referred to as "prefix sum".

As explained above, an MPHF will in most cases produce a random MPH when accessed with a token hash which wasn't included in the initial key set. This is also true for the BBHash. For the probabilistic data structure, we need to be able to determine, at least with a certain probability, whether a token hash, accessed for example during a query, has been added to the data structure at all.

This is achieved by storing a configurable number of the least-significant bits of each token hash, referred to as "signature bits". The signature bits of all token hashes in the token map are stored within one bit set, where the MPH of a token hash determines the position of the signature bits within the bit set.

A configuration of 8 signature bits per token hash would result in the following mapping between token hashes, MPH (both in decimal and binary notation), and signature bits (both in hexadecimal and binary notation):

TABLE 41

| | | | | |
|---|---|---|---|---|
| | | MPH and Signature Bits | | |
| TokenHash | T#* Dec. | T#* Bin. | Signature Bits Hex. | Signature Bits Bin. |
| 0x09e9758e | 0 | 000 | 0x8e | 1000 1110 |
| 0x7003937f | 1 | 001 | 0x7f | 0111 1111 |
| 0xc1e61e57 | 2 | 010 | 0x57 | 0101 0111 |
| 0xdcf4527d | 3 | 011 | 0x7d | 0111 1101 |
| 0x3cb4f048 | 4 | 100 | 0x48 | 0100 1000 |
| 0x63a2c684 | 5 | 101 | 0x84 | 1000 0100 |
| 0xd9a3428f | 6 | 110 | 0x8f | 1000 1111 |
| 0xd112a2e8 | 7 | 111 | 0xe8 | 1110 1000 |

When accessing the MPH of a token hash, the least-significant bits of the token hash are compared to the signature bits. If they aren't equal, the queried token hash was not included in the probabilistic data structure. Using 8 signature bits would result in a chance of ~99.6% to correctly recognize that a queried token hash is not included within the data structure. In practice, the MPHF and signature bits result in a space usage of ~11 bits per stored token hash, which is a significant reduction from the 4 bytes of the token hashes and an even larger reduction when compared to the size of the original tokens.

The possibility to use an MPHF for the encoding of the tokens is a direct result of the design choice to accept a small false-positive rate during queries and represents a unique capability of our disclosure compared to other inverted indices. The step 600 in FIG. 10 compresses the token hashes by some 66% (see also FIG. 12).

After building the optimized representation of the tokens, the references ADD between the individual token hashes in the token map and their associated identities lists IDS are encoded. Two facts enable us to reduce the number of required bits per reference. First, the number of unique entities list IDS is typically orders of magnitude lower than the number of unique tokens within the probabilistic data structure. Second, entities lists are usually not equally often referenced by tokens and as soon as values follow a non-uniform distribution, compression techniques based on their entropy can be applied.

As the first step in the encoding of the references, the entities lists are ordered by the number of tokens referencing them. This reference count is tracked in the column "Token-Count" of the entities lists. The position of an entities list in this ordered sequence is referred to as its "rank". Entities lists with a higher token count will get a lower rank. If multiple entities lists have the same token count, the ordering between them does not matter. In our example, we would get the following ranks for the entities lists.

| Rank | à | ADD |
|---|---|---|
| 0 | à | 1 |
| 1 | à | 2 |
| 2 | à | 0 |

Instead of storing a reference to its entities list for every token, the algorithm will store the rank of the referenced entities list. Since lower ranks will be stored more often, binary code words with fewer bits to are assigned to them. This type of frequency-based code word assignment is typically referred to as entropy coding. The code word will use the minimal number of bits necessary to encode the rank. Ranks are not uniquely decodable. The table below shows the final assignment between ADD and the rank, both in decimal and binary notation.

TABLE 42

| | | |
|---|---|---|
| | Rank Encoding | |
| ADD | Rank Dec. | Rank Bin. |
| 0 | 2 | 10 |
| 1 | 0 | 0 |
| 2 | 1 | 1 |

The ability to use entropy encoding for ranks is a direct consequence of the probabilistic data structure design according to the disclosure and is possible because of the deduplication done for entities lists.

Based on this mapping between the address ADD of a row in the token map, the rank and the binary code word, the algorithm can encode the entities list references for each token hash by inserting the according binary code words into a bit sequence. The position of the binary code word for a token hash must be determinable through the MPH/Token Hash* of the token hash. Since the binary code words have a variable length, an additional support data structure is used to determine the position of the binary code word for a token hash within this bit sequence.

To achieve this, the length of the binary code word of every token hash is added to a prefix sum data structure. Since the number of ranks is equal to the number of entities lists, the length of the longest binary code word is given by $\lceil \log_2 |\text{entities\_lists}| \rceil$ and the number of bits necessary to encode the length of the longest binary code word is given by $\lceil \log_2 \lceil \log_2 |\text{entities\_lists}| \rceil \rceil$. In our example, the longest binary code word requires 2 bits to encode the highest rank 2 and therefore the length of each binary code word can be encoded using 2 bits.

The prefix sum for the encoded ranks can already be initialized to the correct size, because it is known to need a value for each token hash and the number of bits needed for every value is also known. The values of the prefix sum will be initialized to zero.

TABLE 43

Rank Offset Prefix Sum - Initial Setting

| Position | 0 | 1 | 2 | 3 | 4 | 5 | 6 | 7 |
|---|---|---|---|---|---|---|---|---|
| Value | 0 | 0 | 0 | 0 | 0 | 0 | 0 | 0 |
| Sum | 0 | 0 | 0 | 0 | 0 | 0 | 0 | 0 |

Note that the "values" within the prefix sum data structure need to be stored, while the "sums" can be inferred from the values. Only some of the sums will be stored to get a good tradeoff between required storage space and access times for sums. The sums are defined as the sum of all values before the position of the sum. The "values" within the prefix sum data structure correspond to the binary code word lengths.

As the first step, the token hash 0xd9a3428f is mapped to its MPH, which is 6, and its address ADD is resolved, which is 1. The entities list ID 1 can be mapped to rank 0 and the binary code word "0". The length of the binary code word is inserted into the prefix sum data structure at position 6, defined by the MPH, resulting in the following state.

TABLE 44

Rank Offset Prefix Sum

| Position | 0 | 1 | 2 | 3 | 4 | 5 | 6 | 7 |
|---|---|---|---|---|---|---|---|---|
| Value | 0 | 0 | 0 | 0 | 0 | 0 | 1 | 0 |
| Sum | 0 | 0 | 0 | 0 | 0 | 0 | 0 | 1 |

Repeating these steps for every token in the token map, will result in the following state for the prefix sum data structure:

TABLE 45

Rank Offset Prefix Sum

| Position | 0 | 1 | 2 | 3 | 4 | 5 | 6 | 7 |
|---|---|---|---|---|---|---|---|---|
| Value | 1 | 1 | 1 | 1 | 1 | 2 | 1 | 1 |
| Sum | 0 | 1 | 2 | 3 | 4 | 5 | 7 | 8 |

Based on the prefix sums, it is possible to iteratively encode the ranks of all token hashes into a consecutive bit sequence. First, we will initialize the bit sequence to the required size. The size can be calculated by adding the last sum within the prefix sum data structure to the last value. In our example, 9 bits will be needed to encode all binary rank code words.

TABLE 46

Encoded Ranks - Initial Setting

| Position | 0 | 1 | 2 | 3 | 4 | 5 | 6 | 7 | 8 |
|---|---|---|---|---|---|---|---|---|---|
| Bit | 0 | 0 | 0 | 0 | 0 | 0 | 0 | 0 | 0 |

To start, we again get the MPH (6) and binary rank code word (0) for the first token hash 0xd9a3428f, exactly as before. Then, the sum at the position equal to the MPH is fetched from the prefix sum data structure, which is 7. This sum determines how many bits will be needed to encode the binary rank code words for all token hashes with a lower MPHF than the current one. In turn, this means that the binary rank code word of the current token hash can be written to position 7 in the bit sequence, resulting in the following state (the modified bits are highlighted as bold text).

TABLE 47

Encoded Ranks

| Position | 0 | 1 | 2 | 3 | 4 | 5 | 6 | 7 | 8 |
|---|---|---|---|---|---|---|---|---|---|
| Bit | 0 | 0 | 0 | 0 | 0 | 0 | 0 | 0 | 0 |

Repeating the same procedure for all other token hashes results in the following bit sequence for the encoded ranks.

TABLE 48

Encoded Ranks

| Position | 0 | 1 | 2 | 3 | 4 | 5 | 6 | 7 | 8 |
|---|---|---|---|---|---|---|---|---|---|
| Bit | 0 | 0 | 1 | 1 | 0 | 1 | 0 | 0 | 0 |

Together, the encoded ranks and the rank offset prefix sum allow the mapping from the MPH value for a token hash to the rank of its entities list.

The combination of a MPHF, signature bits and entropy coded values is referred to as a "Compressed Static Function" in literature. The usage of a compressed static function for the encoding of a probabilistic data structure is a unique feature of the disclosure. In the $1^{st}$ and $2^{nd}$ step of compressing the probabilistic data structure, the size reduced compressed by some 76% (see FIG. 13).

Two pieces are still missing for the compression of the probabilistic data structure. First, a storage format for the entities lists is needed and second, a mapping from the rank of an entities list to its storage position is required. We will start by explaining the storage format for the entities lists.

First, the token count and the hash value IDS # of the list of identities IDS do not have to be stored, as they are only required for the entities list deduplication during the construction of the mutable probabilistic data structure. The IDS lists are available as a sorted list of unique, positive integer values. "Binary Interpolative Coding" (abbreviated as BIC) is a specialized algorithm for the encoding of such lists, and we use it for the encoding of the identities lists IDS. However, any algorithm capable of encoding lists of integers could be used.

The entities lists IDS are encoded in ascending order of their ranks. Therefore, we will start with encoding the entities list with entities list ID "1", containing the identities "0, 1, 3, 5, 6".

In addition to the integer sequence, BIC requires an initial value range. No element in the integer sequence must be smaller than the lower bound of the value range or larger than the upper bound. Within the probabilistic data structure, the natural lower bound is zero, as negative identities IDS aren't allowed, and identities are supposed to start at zero and increase monotonically. For the upper bound, the highest identity within the data structure is used. Therefore, the initial value range is (0, 6) in our example, with 0 being the lower bound and 6 being the upper bound.

As the first step, we will encode the length of the current entities list. Since the entities list can at most contain all elements within the value range, the length cannot be larger than seven. Therefore, the number of bits required to encode the length of the entities list is given by $\lceil \log_2(\text{upper\_bound}-\text{lower\_bound}+1) \rceil$, which results in 3 bits for the value range of our example. As the list "0, 1, 3, 5, 6" contains 5 elements, the number 5 is encoded by 3 bits. The encoded value is appended to a bit sequence, as shown below.

TABLE 49

| | BIC encoded entities lists | | | | | | | | | |
|---|---|---|---|---|---|---|---|---|---|---|
| Position | 0 | 1 | 2 | 3 | 4 | 5 | 6 | 7 | 8 9 10 |
| Bit | 1 | 0 | 1 | | | | | | |

5 by 3 bits

During decoding, the same initial value range must be provided to the algorithm as during encoding. From this value range, the decoding algorithm could infer that the length was stored with 3 bits.

After encoding the list length, BIC encodes the median value of the entities list, then recursively encodes the identities IDs left of the median value and then recursively encodes the identity IDs right of the median value. The same order of operations must be performed during decoding. The decoding algorithm can then infer the length of the left and right sub-lists from the length of the current list.

The first median value in our example is "3". The number of bits required to encode the median value is again defined by the value range, with the same formula used to determine the number of bits required for the length. Therefore, the identity ID "3" is encoded using 3 bits and the result appended to the bit sequence.

TABLE 50

| | BIC encoded entities lists | | | | | | | | |
|---|---|---|---|---|---|---|---|---|---|
| Position | 0 | 1 | 2 | 3 | 4 | 5 | 6 | 7 8 9 10 |
| Bit | 1 | 0 | 1 | 0 | 1 | 1 | | |

3 by 3 bits

Next, the left sub-list "0, 1" is encoded. Whenever the BIC algorithm recursively encodes a left sub-list, the upper bound of the value range is limited to the previously encoded median value minus one. Since the identity IDs are sorted and unique, every element left of the current median must be smaller. In our example, the value range for the encoding of the left sub-list is limited to (0, 2). The decoding algorithm would limit the value range in the same way after reading the first median value "3". This enables BIC to uniquely decode a variable bit-length encoding without having to store the individual lengths explicitly.

The next median value to encode is "1". For even list lengths, the choice of the median element must be done consistently, but the concrete choice doesn't matter. Based on the value range (0, 2), 2 bits are needed for the encoding, leading to the following bit sequence. Therefore "0 1" is appended to the bit string.

TABLE 51

| | BIC encoded entities lists | | | | | | | | | |
|---|---|---|---|---|---|---|---|---|---|---|
| Position | 0 | 1 | 2 | 3 | 4 | 5 | 6 | 7 | 8 | 9 | 10 |
| Bit | 1 | 0 | 1 | 0 | 1 | 1 | 0 | 1 | | |

Afterwards, the left sub-list "0" is recursively encoded and the value range reduced to (0, 0). The median value in this single-element list is of course "O". However, since zero is the only value allowed by the value range, there is no need to store it. During decoding, it can be implicitly inferred from the value range.

Since the list "0" has neither a left, nor a right sub-list, the recursive algorithm returns to the previous list "0, 1". As the left sub-list has already been encoded and there is no right sub-list, the algorithm goes back another step to the original list "0, 1, 3, 5, 6" and then recursively encodes the right sub-list "5, 6".

When moving to a right sub-list, the lower bound of the value range is limited to the previously encoded median value plus one. Since the identity IDs are sorted and unique, every element right of the current median must be larger. In our example, the value range is limited to (4, 6).

The median of the sub-list is "6". Since the value range encompasses 3 possible values, 2 bits are needed for the encoding of the median. If the lower bound of the value range is larger than zero, it must be subtracted from the median before the encoding. Therefore, the value 2 will be encoded with 2 bits. During decoding, the lower bound can be easily added to the decoded value to get the original median. Appending the encoded median results in the following bit sequence.

TABLE 52

| | BIC encoded entities lists | | | | | | | | | |
|---|---|---|---|---|---|---|---|---|---|---|
| Position | 0 | 1 | 2 | 3 | 4 | 5 | 6 | 7 | 8 | 9 | 10 |
| Bit | 1 | 0 | 1 | 0 | 1 | 1 | 0 | 1 | 1 | 0 |

Finally, the algorithm recursively encodes the left sub-list "5" and limits the value range to (4, 5). The lower bound is again subtracted from the median "5" and the resulting value encoded with a single bit.

TABLE 53

| | BIC encoded entities lists | | | | | | | | | |
|---|---|---|---|---|---|---|---|---|---|---|
| Position | 0 | 1 | 2 | 3 | 4 | 5 | 6 | 7 | 8 | 9 | 10 |
| Bit | 1 | 0 | 1 | 0 | 1 | 1 | 0 | 1 | 1 | 0 | 1 |

The same process is employed to encode the next entities list "0, 2" with rank 1 and the resulting bits are appended to the same bit sequence. The initial value range is again (0, 6), leading to the following state.

TABLE 54

| | BIC encoded entities lists | | | | | | | | | | | | | | | | | |
|---|---|---|---|---|---|---|---|---|---|---|---|---|---|---|---|---|---|---|
| Position | 0 | 1 | 2 | 3 | 4 | 5 | 6 | 7 | 8 | 9 | 10 | 11 | 12 | 13 | 14 | 15 | 16 | 17 |
| Bit | 1 | 0 | 1 | 0 | 1 | 1 | 0 | 1 | 1 | 0 | 1 | 0 | 1 | 0 | 0 | 1 | 0 | 0 |

After encoding the third entities list "1" with rank 2, we end up with the following final bit sequence.

TABLE 55

| | BIC encoded entities lists | | | | | | | | | | | | | | | | | | | | | | | |
|---|---|---|---|---|---|---|---|---|---|---|---|---|---|---|---|---|---|---|---|---|---|---|---|---|
| Position | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| Bit | 1 | 0 | 1 | 0 | 1 | 1 | 0 | 1 | 1 | 0 | 1 | 0 | 1 | 0 | 0 | 1 | 0 | 0 | 0 | 0 | 1 | 0 | 0 | 1 |

From the encoding process, we also directly get the offsets of the individual entities lists within the bit sequence, which we can use to build a mapping from the entities list rank to the corresponding offset.

| Rank | à | Offset |
|---|---|---|
| 0 | à | 0 |
| 1 | à | 11 |
| 2 | à | 18 |

As demonstrated above and shown in Tab. 55 and FIG. 14, three lists of IDS "1; 0, 1, 3, 5, 6; 0, 2" were encoded by 23 bits only. If we assume that a single integer has a length of 4 bytes, then 8 integers making up the 3 lists take at least 32 bytes, which is 256 bits. Therefore, the BIC encoding of the column IDS in the entities list brings about a 91% reduction of size.

As can be seen in the example, the MPHF, the signature bits, the rank offset prefix sum, the encoded ranks, and the encoded entities lists are all stored in bit sequences, which comprise the immutable probabilistic data structure. To execute queries, no other data structures need to be created based on these bit sequences. This fact makes it highly efficient to load an immutable probabilistic data structure into memory for query execution, as it only requires loading byte arrays from disk without further transformations. It also enables the data structure to operate on memory mapped files and rely on the operating system to keep frequently used memory regions in main memory. Due to the small size of the immutable data structure, multiple computers, CPUs or cores can simultaneously load it, preferably into the RAM, and queries can be executed in parallel, which greatly improves the speed in case of complex queries.

Of course it would have been possible to compress the mutable probabilistic data structure by compression algorithms known in the art, e.g. ZIP or zStandard compression. However, before querying the compressed data structure, the data would have to be decompressed first, and then the data tables would have to be built-up. Only after these steps, the query can be executed.

The necessary steps to retrieve the identities IDS for a queried token are explained in the next examples. In this example, we will demonstrate how queries are executed on the immutable probabilistic data structure constructed in the previous example.

We assume the following state for the compressed static function which encodes the mapping from the token hash T to its MPH value T #*, and from the T #* to the signature bits and the entities list rank. The state is taken from the previous example and the exact bit-level encoding of the compressed static function can be seen there. Note that the column TokenHash is not part of the Compressed Static Function and was printed in Tab. 56 for easier understanding only; only the columns T #*, Signature Bits and Rank in Tab. 56 and the compressed Entities list in Tab. 57 form the Compressed Static Function.

TABLE 56

| Compressed Static Function | | | |
|---|---|---|---|
| TokenHash T# | T#* | Signature Bits | Rank |
| 0x09e9758e (client) | 0 | 0x8e | 0 |
| 0x7003937f (clientId) | 1 | 0x7f | 0 |
| 0xc1e61e57 (authentication) | 2 | 0x57 | 0 |
| 0xdcf4527d (failed) | 3 | 0x7d | 0 |
| 0x3cb4f048 (of) | 4 | 0x48 | 2 |
| 0x63a2c684 (81195) | 5 | 0x84 | 1 |
| 0xd9a3428f (authenticating) | 6 | 0x8f | 0 |
| 0xd112a2e8 (with) | 7 | 0xe8 | 1 |

For the entities lists, the following state is assumed. It is again taken from the previous example, which also shows the bit-level encodings.

TABLE 57

| Entities lists | | |
|---|---|---|
| Rank | Offset | IDS |
| 0 | 0 | 0, 1, 3, 5, 6 |
| 1 | 11 | 0, 2 |
| 2 | 18 | 1 |

FIG. 15 is used to explain the querying of query tokens on the immutable, compressed probabilistic data structure.

In a first application example, let's assume a query which tries to retrieve the identity IDS for a single token which is not contained in the data structure. After receiving the query token T from the query consumer (step 800), the token T is hashed with the same hash function used during the construction of the probabilistic data structure (step 810).

| Token T | à | Token hash T# |
|---|---|---|
| unknown | à | 0xc16814de |

Next, the token hash T # is hashed again using the MPHF (step 830). Since the token hash wasn't included in the key set for the construction of the MPHF, the MPHF will either directly determine that the token hash isn't encoded in it, or it will return a random MPH. Since the latter case is more likely, it is assumed that T #*="3" is returned.

Based on T #*, the column T #* in the compressed static function is checked whether it contains T #* (step 850). As T #*="3" is contained, the signature bits "0x7d" in the fourth row are retrieved and compared to the least-significant bits of the token hash (steps 870 and 880). Since the signature bits "0x7d" do not match the least-significant 8 bits "0xde" of the token hash in step 890, IDS is an empty list, i.e. IDS=" " (step 900). In step 940, the query consumer is notified about the empty list of identities IDS and the query execution stops.

The second case handles a query which tries to retrieve the identities IDS for a single token which is contained in the data structure. Again, the query starts by hashing the query token T.

| Token T | à | Token hash T# |
|---------|---|---------------|
| 81195 | à | 0x63a2c684 |

Next, T # is hashed again using the MPHF resulting in T #*="5" (steps 830 and 840). As T #* is contained in column T #* of the compressed static function, the $6^{th}$ row is accessed and the signature bits "0x84" are read-in (steps 870 and 880). In step 890, the least-significant bits of the token hash "0x84" are compared to the signature bits "0x84". Since the signature bits are equal, the query token is assumed to be contained in the probabilistic data structure. In step 910, the rank "1" is read from the Compressed Static Function, the rank of the entities list for this token can be decoded from the compressed static function.

The decoded rank "1" can afterwards be mapped to offset "11" of the corresponding entities list in the encoded entities lists bit sequence. Having the exact offset, it's possible to decode the BIC encoded identities IDS "0" and "2" (step 930). In step 940, IDS is output to the query consumer. Since only a single token was queried, the query execution stops at this point.

More complex queries with multiple query tokens are handled as described in the query example for the mutable probabilistic data structure above. Entities lists IDS are deduplicated during the query execution and after every entities list passed to the query consumer, the query can be aborted early. The only difference is the process of finding and decoding the entities list of a single query token, which was described above.

The file format for storing an immutable probabilistic data structure 700 is displayed in FIG. 16. The first part 710 of the data structure 700 is about 20 bytes long and contains the version of the probabilistic data structure and the utilized encoding steps. The second part 720 is about 100 bytes long and contains header information for the data structures, e.g.

groups together all header information of internal data-structures (number of rows, bits per value, etc.). The third part 730 contains all the data stored in the probabilistic data structure. The grouping of all header information in the second part 720 of the data structure file ensures a minimum number of accessed disk pages when creating a data structure reader. The information stored in the first and second parts 710, 720 is sufficient to determine the layout of all data stored in the third part 730 of the data structure. If the data structure reader operates on a memory mapped file, the third part 730 does not have to be accessed at all in order to create the data structure reader and parts 710 and 720 will typically fit into a single disk page. This file layout is especially beneficial if the data structure reader creation is done highly frequently.

As noted above, typically every database segment comprises a probabilistic data structure 700. FIG. 16 shows the setup for one segment SX comprising the probabilistic data structure 700 described above and a compressed raw data storage section 740 containing N individual storage entities 740-1 to 740-N. Every storage entity 740-1 to 740-N bears an identity, i.e. the storage entity (also called batch or bulk) 740-1 bears ID 0, storage entity 740-2 bears ID 1 etc. Each storage entity 740-1 to 740-N contains a number of log lines in compressed form. By querying the probabilistic data structure 700, a list of identities IDS of storage entities/batches is returned to the query customer. IDS can be empty in case a query token is not contained in the segment, or it can contain one or multiple entity IDs. If, e.g., a query returns one entity ID, say 0, then at least one log line matching the query is found in batch 0 740-1. In most cases, it is not necessary to download the entire compressed raw data storage section 740 of a segment, it is sufficient to download just the batches being returned by the query in order to review the log lines matching the query.

In the above examples, the tokenization of log lines by white spaces was used. Subsequently, a more advanced tokenization strategy for log lines will be discussed. In order to cover a wide range of log lines from many different sources without user interaction, multiple rules are employed for extracting both base tokens and derived tokens, i.e. tokens directly or indirectly derived from base tokens. The following table gives an overview of the different tokenization rules used. The different tokenization rules produce a wide variety of token types for almost any use-case. The described tokenization strategy is valid for all text encodings which encode ASCII characters within a single byte, and all Unicode text coding standards encoding characters with multiple bytes, such as UTF-8.

TABLE 58

Tokenization rules

| Rule | Name | Description | Byte Values | Examples |
|------|------|-------------|-------------|----------|
| R1 | Alphanumeric token | Sequences of bytes in the alphanumeric ASCII space | [48-57, 97-122] | trisberg |
| R2 | Separator token | Sequences of bytes in the non-alphanumeric ASCII space | [0-47, 58-64, 91-96, 124-127] | ${{ |
| R3 | Unicode token | Sequences of bytes outside the 7-bit ASCII space | [128-255] | ä, äö, äöü |
| R4 | Double alphanumeric token | Two sequential alphanumeric tokens connected by one of: ".", ":", "-", "_", "/", "@" | [45-47, 48-57, 58, 64, 95, 97-122] | trisberg@dynatrace |
| R5 | Triple alphanumeric token | Three sequential alphanumeric tokens connected by dots | [46, 48-57, 97-122] | 192.168.100 |

TABLE 58-continued

| | | | Byte | |
|---|---|---|---|---|
| Rule | Name | Description | Values | Examples |
| R6 | Alphanumeric 3-gram | All 3-byte sequences within an alphanumeric token | [48-57, 97-122] | tri, ris, isb |
| R7 | Separator 1-gram | All 1-byte sequences within a separator token | [0-47, 58-64, 91-96, 124-127] | $ |
| R8 | Separator 2-gram | All 2-byte sequences within a separator token | [0-47, 58-64, 91-96, 124-127] | ${ |
| R9 | Separator 3-gram | All 3-byte sequences within a separator token | [0-47, 58-64, 91-96, 124-127] | ${{ |
| R10 | Unicode 2-gram | All 2-byte sequences within a Unicode token | [128-255] | äö, öü |

We will refer to tokens produced by rules R1, R2 and R3 as base tokens, since all other types of tokens are derived from these tokens. Consequently, tokens produced by all other rules will be referred to as derived tokens. Additionally, tokens produced by rules R4 and R5 will be referred to as combination tokens, since they combine multiple base tokens. Tokens produced by rules R6 to R10 will be referred to as n-gram tokens, since they extract continuous n-grams of different lengths from base tokens. In summary, tokenization rules are present to create base tokens, comprising alphanumeric tokens, separator tokens, and optionally extended ASCII/Unicode tokens. In addition, multiple n-gram tokens are derived from base tokens. The n-gram tokens have a max. length of 3 bytes.

Note that coding space of Unicode 2-grams depend on the encoding system used. According to the "Extended ASCII" system, special characters such as "a", "o" . . . are encoded as 1-byte values. According to other encoding systems, these characters are represented as 2-byte or 4-byte values. Unicode 2-gram tokens according to rule R10 comprise 2 bytes, which can en-compass 2 special characters (according to extended ASCII coding), 1 special character (2-byte encoding) or ½ character (4-byte encoding). In any case, the disclosure in this document shall be independent of encoding system used.

Before tokenizing a log line, it is proposed to convert all uppercase characters (ASCII range 65-90 for characters A-Z) to lowercase characters (ASCII range 97-122 for characters a-z) for the purpose of indexing them. Specifically, this means that all byte values within a log line or batch of log lines having a binary value between 65 and 90 are increased by 32. As an example, the ASCII character "A" has a binary value of 65. Increasing 65 by 32 to 97 maps the upper-case ASCII character "A" to the lower-case ASCII character "a". This lower-case mapping can either be done before the tokenization step, or afterwards. However, it shall be done during ingesting data to the indexing structure and during querying. Mapping all ASCII alphanumeric characters to their lower-case representation enables case-insensitive query execution. Instead of mapping uppercase characters to lowercase characters, it would be possible to convert lowercase characters to uppercase characters. Either way is possible.

The application of tokenization rules differs slightly between data ingesting and data querying. During data ingesting, the rules from Table 58 can be directly applied as described.

In a preferred embodiment, the following data ingest optimizations can be performed to reduce the number of produced tokens and to improve ingest performance. Rule R6 is only applied to alphanumeric ASCII tokens produced by rule R1, which contain more than three bytes. Rules R7, R8 and R9 only produce n-grams which contain less bytes than the respective base token produced by Rule R2. Rule R8 is only applied to non-ASCII tokens produced by rule R3, which contain more than two bytes. The listed optimizations may be applied during data ingesting because the base and derived tokens are identical if both tokens have the same length. Note, however, that these optimizations are not applied during querying, as some tokens could be missed out.

In order to describe the different tokenization rules in more detail, let us consider the log line L10 in Table 59 as a simple example:

TABLE 59

| Example log line L10 |
|---|
| L10     trisberg@dynatrace.com connected from ssh://192.168.100.131 |

In the following paragraphs, the steps in tokenizing L10 according to different rules will be discussed in detail. We will start with base tokens (R1-R3) and continue with derived tokens (R4-R10).

R1 Alphanumeric tokens: As alphanumeric tokens are sequences of characters a-z and/or number 0-9 of arbitrary length, the tokens produced by R1 are: "trisberg", "dynatrace", "com", "connected", "from", "ssh", "192", "168" "100", "131".

R2 Separator tokens: Different to rule R1, separator tokens are sequences of separator characters as defined in Table 58 of arbitrary length. The tokens produced by R2 are: "@", ".", " ", "://", ".", ".", ".".

R3 Unicode tokens: Unicode tokens are sequences of characters outside the 7-bit ASCII space of arbitrary length. As no such characters are present in L10, rule R3 does not produce any tokens, i.e. R3={ }.

After treating base tokens, derived tokens are discussed next. Derived tokens can be divided into combination tokens (R4 and R5) and so-called n-gram tokens (R6-R10). Let us start with combination tokens:

The tokens produced by rule R4 comprise two alphanumeric tokens connected by one of ".", ":", "-", "/", "@". The alphanumeric tokens produced by R1 are: "trisberg", "dynatrace", "com", "connected", "from", "ssh", "192", "168", "100", "131", of which tokens 1 and 2, 2 and 3, 7 and 8, 8 and 9, and 9 and 10 are connected by at least one of .:-_/@. Hence, R4 produces the following tokens: "trisberg@dynatrace", "dynatrace.com", "192.168", "168.100", "100.131".

Rule R5 produces tokens for three alphanumeric tokens connected by dots. This applies to tokens 7, 8 and 9 as well as for tokens 8, 9 and 10 produced by rule R1. Hence, rule R5 produces the following tokens: "192.168.100", "168.100.131".

After having discussed both base tokens and combined tokens, n-gram tokens will be treated next.

The first n-gram tokens are alphanumeric 3-gram tokens produced by rule R6, which operates on alphanumeric tokens produced by rule R1. The tokens produced by R1 are: "trisberg", "dynatrace", "com", "connected", "from", "ssh", "192", "168", "100", "131". According to the optimization mentioned above, only base tokens R1 having a length of more than 3 bytes will be considered. These are: "trisberg", "dynatrace", "connected", "from". Consequently, R6 derives the following alphanumeric 3-gram tokens: "tri", "ris", "isb", "sbe", "ber", "erg", "dyn", "yna", "nat", "atr", "tra", "rac", "ace", "con", "onn", "nne", "nec", "ect", "cte", "ted", "fro", "rom".

Next, separator 1-gram tokens according to rule R7 are discussed. All separator n-gram tokens are based on separator tokens produced by rule R2, i.e. "@", ".", " ", " ", "://", ".", ".", ".". According to the optimization mentioned above, only base tokens having a length of more than 1 byte will be considered. These are: "://". Hence, rule R7 produces the tokens: ":", "/", "/".

Following R7, separator 2-gram tokens according to rule R8 will be discussed. According to the optimization step for rule R8, only base tokens having a length of more than 2 bytes will be considered. These are: "://". Hence, rule R8 produces the tokens: ":/", "//".

The last separator n-gram tokens being discussed are separator 3-gram tokens according to rule R9. According to the optimization step for rule R9, only base tokens having a length of more than 3 bytes will be considered. As no such base token exists, rule R9 does not produce any tokens.

The last category of tokens being discussed are Unicode 2-gram tokens according to rule R10. These tokens are derived from base tokens according to rule R3. As no such tokens exist, R10 does not produce any tokens.

Based on log line L10 as input, Table 60 lists all tokens being produced by rules R1-R10, grouped by the rules which produced them. Tokens are written between quotation marks and separated by commas for readability.

By looking at the 52 tokens produced for a single log line L10, it is noticed that some tokens, e.g. token " " (2×), "." (3×), and "/" (2×) appear multiple times. Adding tokens multiple times to an inverted index or a probabilistic data structure should be avoided since it does not add any new information.

Instead of adding tokens multiple times to a data structure, it is preferred to remove multiple instances of tokens before indexing them. This issue becomes even more important when indexing of log lines does not take place line wise (i.e. line per line) but batch wise, i.e. adding log lines from the same source to a batch of log lines. The log lines in a batch are tokenized, tokens are deduplicated, and deduplicated tokens are added to an index.

This procedure is in-line with the general idea of indexing, namely that after all data has been added to an indexing structure, it should contain a mapping between each added, unique token and the identifiers where this token appeared. However, many tokens will appear multiple times within the data associated to the same identifier. Adding the same token-identifier mappings to an indexing structure multiple times does not add any new information, but produces a lot of processing overhead, since the indexing structure must deduplicate the redundant mappings internally. This overhead is especially severe for tokenization strategies producing n-gram tokens due to the high number of tokens and the high redundancy of these tokens.

The token deduplication system acts, among other functionality, as a layer between the tokenization and some indexing structure and removes a large fraction of duplicate tokens before adding them to the indexing structure. Consequently, the deduplication performed by our system needs to be considerably more efficient than the deduplication which would be performed within the indexing structure.

In other words, data which needs to be stored, e.g. log lines from different processes or computers, is grouped into a configurable number of larger batches having a configurable size. The decision which piece of data is assigned to which batch can be based on various properties of the data. Log data, for example, might be grouped by the process instance producing the log lines. Alternatively, highly similar log lines can be grouped in the same batch. Each batch is assigned a unique, monotonously increasing identifier. When 1000 batches are created, for example, they will be assigned the identifiers 0 to 999. If, for example, a batch has reached its capacity, or alternatively after some period of time, no more data will be added to the batch, and all data within a batch will be tokenized according to the tokenization strategy.

TABLE 60

| Produced tokens for log line L10 | |
| --- | --- |
| Rule | Tokens |
| R1 | "trisberg", "dynatrace", "com", "connected", "from", "ssh", "192", "168", "100", "131" |
| R2 | "@", ".", " ", " ", "://", ".", ".", "." |
| R3 | |
| R4 | "trisberg@dynatrace", "dynatrace.com", "192.168", "168.100", "100.131" |
| R5 | "192.168.100", "168.100.131" |
| R6 | "tri", "ris", "isb", "sbe", "ber", "erg", "dyn", "yna", "nat", "atr", "tra", "rac", "ace", "con", "onn", "nne", "nec", "ect", "cte", "ted", "fro", "rom" |
| R7 | ":", "/", "/" |
| R8 | ":/", "//" |
| R9 | |
| R10 | |

In this disclosure, log lines are added to storage entities/ batches and the ID of a storage entity is added as ID to the probabilistic data structure.

Consider the following log lines L10 and L11 from Table 61. We assume that both logs come from the same batch having the Entity ID 0. Furthermore, it is assumed that the batch is finished and tokenization of the log lines in batch 0 is started:

TABLE 61

Example log lines L10 and L11

| ID = 0 | L10 | trisberg@dynatrace.com connected from ssh://192.168.100.131 |
| | L11 | reichinger@dynatrace.com connected from ssh://192.168.100.201 |

A high level overview of different tokenization rules is given in FIG. 19, such as rule R1 for creating a sequence of alphanumeric characters, R2 for creating a sequence of separator characters, R5-R6 for creating combination tokens, and R6-10 for creating n-gram tokens.

Without repeating all tokenization steps for L10 in detail, tokenizing log lines L10 and L11 produces 60 unique tokens and 48 duplicate tokens (see Table 62 below).

TABLE 62

Produced tokens for log lines L10 and L11 before deduplication

| Rule | Tokens |
|---|---|
| R1 | "trisberg", "dynatrace", "com", "connected", "from", "ssh", "192", "168", "100", "131", "reichinger", "dynatrace", "com", "connected", "from", "ssh", "192", "168", "100", "201" |
| R2 | "@", ".", " ", " ", "://", ".", ".", ".", "@", ".", " ", " ", "://", ".", ".", ".", "." |
| R3 | |
| R4 | "trisberg@dynatrace", "dynatrace.com", "192.168", "168. 100", "100.131" "reichinger@dynatrace", "dynatrace.com", "192.168", "168.100", "100.201" |
| R5 | "192.168.100", "168.100.131", "192.168.100", "168.100.201" |
| R6 | "tri", "ris", "isb", "sbe", "ber", „erg", "dyn", "yna", "nat", "atr", "tra", "rac", "ace", „con", "onn", "nne", "nec", "ect", "cte", "ted", "fro", "rom" "rei", "eic", "ich", "chi", "hin", „ing", "nge", "ger" ,"dyn", "yna", "nat", "atr", "tra", "rac", "ace", „con", "onn", "nne", "nec", "ect", "cte", "ted", "fro", "rom" |
| R7 | ":", "/", "/", ":", "/", "/" |
| R8 | ":/", "//", ":/", "//" |
| R9 | |
| R10 | |

Table 63 shows the produced tokens in another way. While the column "Unique Tokens" shows all unique tokens produced per tokenization rule, the column "Duplicate Tokens" shows the total number of duplicate tokens per tokenization rule.

TABLE 63

Produced tokens for log lines L10 and L11 after deduplication

| Rule | Unique Tokens | Duplicate Tokens |
|---|---|---|
| R1 | "trisberg", "dynatrace", "com", "connected", "from", "ssh", "192", "168", "100", "131", "reichinger", "201" | 8 |
| R2 | "@", ".", " ", "://" | 14 |
| R3 | | 0 |
| R4 | "trisberg@dynatrace", "dynatrace.com", "192.168", "168.100", "100.131", "reichinger@dynatrace", "100.201" | 3 |
| R5 | "192.168.100", "168.100.131", "168.100.201" | 1 |
| R6 | "tri", "ris", "isb", "sbe", "ber", "erg", "dyn", "yna", "nat", "atr", "tra" "rac", "ace", „con", "onn", "nne", "nec", "ect", "cte", "ted", "fro" "rom", "rei", "eic", "ich", "chi", "hin", "ing", "ger" | 16 |

TABLE 63-continued

| | Produced tokens for log lines L10 and L11 after deduplication | |
|---|---|---|
| Rule | Unique Tokens | Duplicate Tokens |
| R7 | ":", "/" | 4 |
| R8 | ":/", "//" | 2 |
| R9 | | 0 |
| R10 | | 0 |

Generally, the ratio of duplicates within a batch of data will increase with the size of the batch. This is especially true for highly redundant data, like log lines produced by the same software application.

FIG. 18 shows the steps involved before tokens are being added to the probabilistic data structure, i.e. indexing the data. Assuming that log lines from a specific entity ID are collected in a respective batch, here batch 0, upper-case characters in log lines are converted to lowercase characters (step 1110). After this, the tokenization of log lines takes place (step 1120). Following this, duplicate tokens are removed in step 1130. Following deduplication of tokens, unique tokens are added to the probabilistic data structure in step 1140.

Next, some methods for deduplication of tokens will be discussed.

A simple method for avoiding duplicate tokens is to sort all tokens and then to remove duplicate tokens. While this strategy is simple, it does not work very efficiently in combination with the probabilistic data structure disclosed in this document. Instead, it is proposed to employ one distinct deduplication method for short tokens, with a length of up to three bytes, and another method for longer tokens. Short tokens are mostly produced by n-gram rules R6 to R10, but also rules R1 to R3 frequently produce base tokens with a max. length of 3 bytes. Longer tokens are either produced by the base token rules R1 to R3, or by rules R4 and R5 for combination tokens.

The deduplication of long tokens will be described first. After tokenization, long tokens are hashed into random, uniformly distributed hash values, e.g. 4-byte hash values. After hashing, the deduplication method operates solely on token hashes not tokens. If two tokens are hashed to the same token hash, the deduplication method treats them as identical tokens. This deduplication method, therefore, is best suitable for indexing structures which operate on hash values and not on original tokens. One such indexing structure is the compact probabilistic data structure disclosed in this document. An indexing structure operating on the original tokens, e.g. an inverted index, would receive only one of the tokens with an identical token hash. Therefore, querying for the token which was not added to the indexing structure would not return any results, even though the token is included in the data. For an indexing structure operating directly on hash values, this problem does not exist. In case both tokens have the same token hash value, and only token hashes are added to the indexing structure, queries for either of the two tokens would return the same result.

For demonstrating the deduplication of long tokens, 5 tokens from Table 63 will be used. Table 64 shows the tokens and their hash values:

TABLE 64

| | | Token hashes | | | |
|---|---|---|---|---|---|
| Token T | trisberg | dyna-trace.com | reichinger | 192.168 | dyna-trace.com |
| Token hash | 0x4f80a23a | 0x1c55b726 | 0xfa80cc2e | 0x1c55b726 | 0x1c55b726 |

After hashing the tokens, the token hashes are sequentially added into to fixed-size array of hash values (4-byte elements in this example). The size of the array is configurable but will not be resized during deduplication of tokens. The intended position of a token hash is calculated by taking the modulo of the token hash by the length of the array. If the array at the calculated position is empty, the token hash was not added to the indexing structure before. In this case, the token hash is written into the empty position of the deduplication array and is added to the indexing structure, together with the identifier of the batch. If the array at the calculated position already contains the same token hash, this token hash was already added to the indexing structure and is not added again. However, if the array at the calculated position already contains a different token hash, it cannot be determined whether the current token hash was already added or not, so it is added to the indexing structure together with the ID of the batch.

Consider the following, empty deduplication array having a length of 8 elements. All elements are initialized to the value 0. This value serves as a special marker which indicates that an element is empty. Consequently, a token hash of 0 cannot be deduplicated. However, as the chance of a token having a token hash value of 0 is almost 0, this does not significantly limit performance.

TABLE 65

| | Empty deduplication array | | | | | | | |
|---|---|---|---|---|---|---|---|---|
| | Index | | | | | | | |
| | 0 | 1 | 2 | 3 | 4 | 5 | 6 | 7 |
| Value | 0 | 0 | 0 | 0 | 0 | 0 | 0 | 0 |

The first token hash to be processed is 0x4f80a23a (token "trisberg"). Taking the modulo of the token hash by the length of the array, results in POS=2. Since position 2 of the deduplication array is empty, the token hash is written to the deduplication array at index 2. In addition, the token hash and the batch ID=0 are added to the indexing structure.

TABLE 66

| | | | | Intermediate status of deduplication array | | | | |
|---|---|---|---|---|---|---|---|---|
| | | | | Index | | | | |
| | 0 | 1 | 2 | 3 | 4 | 5 | 6 | 7 |
| Value | 0 | 0 | 0x4f80a23a | 0 | 0 | 0 | 0 | 0 |

Next, the token hash 0x1c55b726 (of token "dynatrace.com") is added at position 6. Since the position is empty, also this token is added to the indexing structure and the token hash written to the deduplication array.

TABLE 67

| | | | | Intermediate status of deduplication array | | | | |
|---|---|---|---|---|---|---|---|---|
| | | | | Index | | | | |
| | 0 | 1 | 2 | 3 | 4 | 5 | 6 | 7 |
| Value | 0 | 0 | 0x4f80a23a | 0 | 0 | 0 | 0x1c55b726 | 0 |

Then, the position of token hash 0xfa80cc2e (of token "reichinger") is calculated, which is also 6. Since the element at position 6 of the deduplication array already contains a different token hash, the algorithm cannot determine whether the current token hash was already added to the indexing structure or not. Therefore, it is added to the indexing structure. Note that the deduplication array remains unchanged.

TABLE 68

| | | | | Intermediate status of deduplication array | | | | |
|---|---|---|---|---|---|---|---|---|
| | | | | Index | | | | |
| | 0 | 1 | 2 | 3 | 4 | 5 | 6 | 7 |
| Value | 0 | 0 | 0x4f80a23a | 0 | 0 | 0 | 0x1c55b726 | 0 |

The next processed token "192.168" has the same token hash, namely 0x1c55b726, as the previous token "dynatrace.com". Consequently, the element at the same position is checked and the token hashes are determined to be equal. Therefore, the token hash is not added to the indexing structure again, even though the original tokens are different.

TABLE 69

| | | | | Final status of deduplication array | | | | |
|---|---|---|---|---|---|---|---|---|
| | | | | Index | | | | |
| | 0 | 1 | 2 | 3 | 4 | 5 | 6 | 7 |
| Value | 0 | 0 | 0x4f80a23a | 0 | 0 | 0 | 0x1c55b726 | 0 |

Lastly, the token "dynatrace.com" is processed a second time. Since its token hash is already contained at position 2 of the deduplication array, the token is not added to the indexing structure again.

Note that for 4-byte token hashes $2^{32}$, i.e. more than 4 billion different hashes exist. It is understood that a deduplication array having a length of 8 would not be sufficient for real-world applications. Instead, a longer length, e.g. between $2^{10}$ and $2^{20}$, would be more appropriate. However, the short deduplication array allows easy illustration of the concept.

Next the deduplication of short tokens will be discussed.

After the deduplication of long tokens, the deduplication of short tokens having a length of at most 3 bytes will be explained. In contrast to the deduplication of long tokens, the deduplication of short tokens does not operate on token hashes, but directly on tokens. Since there can be no token hash collisions between different short tokens, the deduplication is suitable for any indexing structure, e.g. a traditional inverted index or a compact probabilistic data structure. As this deduplication method only handles short tokens with a length of up to 3 bytes, the total number of possible tokens is limited. Additionally, depending on the domain of the processed data, some of those tokens might appear extremely seldom within the data. Such unlikely tokens do not need to be deduplicated, as it will not yield any performance improvements but would increase the memory requirements for the deduplication.

We will first define a mapping function, shown in Table 70, for the byte value ranges from Table 58. The value ranges of each token rule are individually mapped to a new, consecutive value range, starting at 0. We refer to these new consecutive value ranges as sequential values SV. Only those byte values, for which the containing tokens should be deduplicated, are mapped to sequential values.

TABLE 70

| | Byte value mapping function | | | |
|---|---|---|---|---|
| Token Rule | Byte Values | Max. possible byte values | Sequential Values SV | Max. possible sequential values |
|---|---|---|---|---|
| R1 | [48-57], | 62 | [0-9], | 36 |
| R6 | [65-90], | | [10-35], | |
| | [97-122] | | [10-35] | |
| R2 | [0-7] | 66 | — | 39 |
| R7 | [8-13] | | [0-5] | |
| R8 | [14-31] | | — | |
| R9 | [32-47] | | [6-21] | |
| | [58-64] | | [22-28] | |
| | [91-96] | | [29-34] | |
| | [123-126] | | [35-38] | |
| | [127] | | — | |
| R3 | [128-255] | 128 | [0-127] | 128 |
| R10 | | | | |

FIG. 21 shows the mapping function mapping ASCII byte values of tokens to sequential values for all three groups as defined in Tab. 70. The third sawtooth in the mapping function for group 1 (R1, R6) is optional when the token is converted to lowercase characters before tokenization and deduplication.

Tokens which contain at least one byte without a value mapping will not be deduplicated, except for one special case described further below. Since non-printable, ASCII control characters with byte values 0 to 7 and 14 to 31 will most likely never appear in textual data, no deduplication is performed for them, and no mapping is defined. However, other sets of byte values could be excluded from the deduplication process for other use-cases.

Since we want to index only lower-case representations of alphanumeric ASCII characters, the byte values 65 to 90 ("A" to "Z") and 97 to 122 ("a" to "z"), are mapped to the same sequential values. Through this mapping, upper-case and lower-case tokens are treated as identical tokens during the deduplication.

Based on the sequential values for each token rule, another mapping function is used to assign unique values to a single consecutive value range for each token we want to deduplicate. The value range again starts at 0 and we will assign offsets within this value range to different groups of tokens. These groups are defined by the length of the token and the byte values which can be contained in the tokens. The offset of a token group is the total number of unique tokens which are included in all previous token groups. The offset, together with the total number of unique tokens within a certain token group, defines the exclusive sub-range of the token group within the overall consecutive value range. A detailed example is given in the following paragraphs.

We start by defining the mapping of tokens with length 1. Because of the low number of possible tokens, all 256 possible single-byte tokens are deduplicated, even if no value mapping was defined for some of the byte values. This is done because of the low number of possible single-byte tokens and for increased computational efficiency. When assigning the offset zero to the group of single-byte tokens, the value of the byte can be directly used as its unique value within the consecutive value range, without any additional operations. This significantly reduces the computational overhead for the mapping from the token to its unique value. The exclusive sub-range of this token group within the consecutive value range is therefore 0 to 255.

For tokens of length two, we distinguish three different token groups. The first group contains all tokens which are either produced by rule R1 or have been derived from such a base token. Tokens of rule R6 are solely derived from R1 base tokens, therefore, they are treated as if they were produced by R1 for the token deduplication. Differentiating between the producing rules of tokens is possible because the producing rule of a token is known from the tokenization step. Rule R1 has 36 sequential values defined in the byte value mapping. Therefore, there are exactly 1296 (36 times 36) unique two-byte tokens in this token group which should be deduplicated. Its offset is 256 and its exclusive sub-range within the consecutive value range is 256 to 1551.

The second token group contains all tokens which are either produced by rule R2 or have been derived only from such a base token. Tokens of rule R7, R8 and R9 are solely derived from R2 base tokens, therefore, they are treated as if they were produced by R2 for the token deduplication. The third token group all tokens which are either produced by rule R3 or have been derived only from such a base token. Tokens of rule R10 are solely derived from R3 base tokens, therefore, they are treated as if they were produced by R3 for the token deduplication.

Combo tokens produced by rules R4 and R5 are never handled in the short token deduplication, since they always combine two types of base tokens and can, therefore, contain more unique byte value combinations. Further token groups, their offsets and exclusive sub-ranges can be seen in Table 71.

TABLE 71

| Token group offsets | | | | |
|---|---|---|---|---|
| Token Group | Unique Tokens | $s_G$ | Offset $o_G$ | Sub-Range |
| Length: 1 Types: all | 256 | 256 | 0 | [0-255] |
| Length: 2 Types: R1, R6 | $1296 = 36^2$ | 36 | 256 | [256-1551] |

TABLE 71-continued

| Token group offsets | | | | |
|---|---|---|---|---|
| Token Group | Unique Tokens | $s_G$ | Offset $o_G$ | Sub-Range |
| Length: 2 Types: R2, R7-R9 | $1521 = 39^2$ | 39 | 1552 | [1552-3072] |
| Length: 2 Types: R3, R10 | $16384 = 128^2$ | 128 | 3073 | [3073-19456] |
| Length: 3 Types: R1, R6 | $46656 = 36^3$ | 36 | 19457 | [19457-66112] |
| Length: 3 Types: R2, R7-R9 | $59319 = 39^3$ | 39 | 66113 | [66113-125431] |

Note that tokens based on types R3 or R10 having a length of 3 bytes are not deduplicated at all.

The value of a specific token within the consecutive value range is defined by Equation 1, where t is the byte sequence of a token, $t_i$ is the i-th byte of token t, |t| is the length of the token, $SV(t_i)$ is the sequential value of the byte $t_i$, $s_g$ is the number of sequential values of token group g, and $o_g$ is the offset of token group g.

$$UV = o_G + \sum_{i=0}^{|t|-1} SV(t_i) \cdot s_G^i$$

Equation 1
Consider the token "a01"

| | Byte t | | |
|---|---|---|---|
| | 0 | 1 | 2 |
| Token char | $t_0 = \text{'a'}$ | $t_1 = \text{'0'}$ | $t_2 = \text{'1'}$ |
| Sequential values | $SV(t_0) = 10$ | $SV(t_1) = 0$ | $SV(t_2) = 1$ | produced by rule R1 and having length 3, i.e. t=3. The sequential values of bytes 0 ("a"), 1 ("0") and 2 ("1") according to Table 70 are 10, 0 and 1, respectively. The offset $o_G$ is 19457 and the number of sequential values $s_G$ is 36. Hence, the unique value UV of the token within the consecutive value range as defined in Equation 1 is therefore:

$$UV = o_G + \sum_{i=0}^{|t|-1} SV(t_i) \cdot s_G^i$$

$$UV = 19457 + 10 * 36^0 + 0 * 36^1 + 1 * 36^2 = 20763$$

The results of $$SV(t_i) * s_g^i$$

can be precomputed for the possible values of i (0, 1, 2) and the byte values which have a mapping. The precomputed results are stored in three arrays with 256 elements, one for each possible value of i. The token byte $t_i$ defines the position of the precomputed result in the array for i. For byte values without a value mapping a negative value is stored. The negative value must be small enough to ensure a single byte value without a mapping will lead to a negative result in Equation 1, e.g., −184752 for the defined byte value mappings and token groups. If the result of Equation 1 is negative, this indicates a token which should not be deduplicated.

Overall, there are 125432 unique tokens which should be deduplicated. Through the token mapping function, we can map each of these tokens to a unique position within a deduplication bit array with a size of 125432 bits. Initially, none of the bits of the deduplication bit array are set. When a short token is produced by the tokenizer, we calculate the position of the token within the deduplication bit array.

If the calculated position is negative, the token should not be deduplicated by the short token deduplication strategy. In this case, it is added to the indexing structure, together with the identifier of the batch. If the indexing structure is a compact probabilistic data structure which operates on hash values, the hash of the token must be calculated before adding it to the indexing structure.

If the calculated position is positive and the bit at the calculated position is not set, the token did not appear within the batch before. In this case, the token hash together with the identifier ID of the batch are added to the indexing structure. Also, the bit at the token's position is set. If the calculated position is positive and the bit was already set, the token already appeared within the batch before and is not added to the indexing structure again.

Once the processing of a batch is completed, all values within the deduplication array are initialized to zero again and the deduplication bit array is reset so that no bits are set anymore. Afterwards, a new batch can be processed, and its tokens can be deduplicated. The byte value and token mapping functions only need to be built once and can then be used for all processed data.

Although the specific mappings presented above from byte values to sequential values SV and from SV to unique values UV are preferred, they are just one embodiment of the disclosure. As a person skilled in the art can easily find alternative mappings, the disclosure is not limited to these specifics.

Instead of mapping the first, second or third byte-values from a token first to a first, second or third sequential value, and then map the sequential values to a unique value, it would in theory be possible to skip the mapping from byte-values to sequential values and solely have a mapping from byte-values to a unique value. This is, however, less memory efficient as the method described for deduplication of short tokens. Let us elaborate this a bit further: Considering the ASCII alphabet, there are 256 tokens of length 1, $256^2$ tokens of length 2 and $256^3$ tokens of length 3. So in total, there are 16.84 million combinations for tokens having a length≤3. The disclosed method reduces this to just 125431 combinations, which is less than 1% of 16.84 M. In other words, the disclosed method reduces the memory footprint by some 2 orders of magnitude.

Let us now come back to the setting depicted in FIG. 17. The computer 1010 produces log lines L1 and L2. The log lines from computer 1010 are collected in the storage entity/batch 1015 having the entity ID 0, such that batch 0 1015 contains:

L1 "authenticating client with clientID 81195"
L2 "authentication of client 81195 failed"

Let us further assume that for batch 0 the decapitalization 1110, tokenization 1120, deduplication 1130 and the indexing 1140 according to FIG. 18 is started.

In a first step, uppercase characters in the log lines are converted to lowercase characters. As only L1 contains 2 uppercase characters ID, the converted log lines are:

L1 "authenticating client with clientid 81195"
L2 "authentication of client 81195 failed"

Since the log lines contain alphanumeric characters and spaces only, only the rules R1 and R2 produce base tokens. The produced base tokens R1.L1 and R2.L1 for L1, R1.L2 and R2.L2 for L2, and R1 and R2 for both L1 and L2 are:

R1.L1: "authenticating", "client", "with", "clientid" "81195".

R1.L2: "authentication", "of", "client", "81195", "failed"

R1: "authenticating", "client", "with", "clientid", "81195", "authentication", "of", "client", "81195", "failed".

R2.L1: " ", " ", " ", " ".

R2.L2: " ", " ", " ", " ".

R2: " ", " ", " ", " ", " ", " ", " ", " ".

In addition, no combination tokens according to rules R4 and R5 exist. However, as alphanumeric base tokens exit, also alphanumeric 3-gram tokens according to rule R6 exist. Note that according to an optimization rule described above, only base tokens having a length >3 are considered when deriving alphanumeric 3-gram tokens. As such, the base token "of" stemming from R1.L2 is not used for deriving alphanumeric 3-gram tokens.

The base tokens R1 after optimization (base token >3 bytes) are:

R1.L1: "authenticating" "client" "with" "clientid" "81195"

R1.L2: "authentication" "client" "81195" "failed"

The derivation of alphanumeric 3-grams can be done as follows. The alphanumeric 3-grams R6.L1 for L1 are:

"aut" "cli" "wit" "cli" "811"
"uth" "lie" "ith" "lie" "119"
"the" "ien"
"ien" "195"
"hen" "ent"
"ent"
"ent"
"nti"
"nti"
"tid"
"tic"
"ica"
"cat"
"ati"
"tin"
"ing"

R6.L1: "aut" "cli" "wit" "cli" "811" "uth" "lie" "ith" "lie" "119" "the" "ien" "ien" "195" "hen" ""ent" "ent" "ent" "nti" "nti" "tid" "tic" "ica" "cat" "ati" "tin" "ing"

The alphanumeric 3-grams R6.L2 for L2 are:

```
"aut" "cli" "811" "fai"
    "uth" "lie" "119" "ail"
        "the" "ien" "195" "ile"
            "hen" "ent"
                "led"
                    "ent"
                        "nti"
                            "tic"
                                "ica"
                                    "cat"
                                        "ati"
                                            "tio"
                                                "ion"
R6.L2: "aut" "cli" "811" "fai" "uth" ""lie" "119" "ail" "the" "ien" "195" "ile" "hen" "ent"
"led" "ent" "nti" "tic" "ica" "cat" "ati" "tio" "ion"
```

Consequently, rule R6 produces the following tokens: R6: "aut" "cli" "wit" "cli" "811" "uth" "lie" "ith" "lie" "119" "the" "ien" "ien" "195" "hen" "ent" "ent" "ent" "nti" "nti" "tid" "tic" "ica" "cat" "ati" "tin" "ing" "aut" "cli" "811" "fai" "uth" "lie" "119" "ail" "the" "ien" "195" "ile" "hen" "ent" "led" "ent" "nti" "tic" "ica" "cat" "ati" "tio" "ion".

The separator 1-gram tokens according to rule R7 are based on the separator tokens according to rule R2. According to the optimization, only base tokens having a length >1 byte are considered. However, as all base tokens according to rule R2 have a length of 1 byte, rule R7 does not produce any tokens. Note that the rules R8-R10 do not produce any tokens either. Hence, in total 68 tokens are produced. By tokenizing a batch of log lines, a set of tokens is produced. Next, the deduplication of tokens is discussed (step 1130 in FIG. 18).

At first, classic token deduplication is briefly discussed. According to this, the tokens are first sorted and duplicated entries removed. This results in 36 unique tokens and 32 duplicate tokens being present at least twice.

Next, the new method for deduplication of tokens is discussed. According to FIG. 20, the duplication strategy being used depends on the token length. In our case, tokens having a length≤3 bytes are treated by a method for deduplicating short tokens 1320 and tokens having a length >3 bytes are treated by a method for deduplicating long tokens 1330. As there are 59 short tokens and 9 long tokens, let us start with the deduplication of short tokens.

Table 71 proposes to map short tokens to a bit-array of 125432 bits, i.e. some 16 KB. The deduplication of short tokens is shown in FIG. 24. In a first step 1400, the bit array is initialized such that all values are zero. In step 1410, the computer loads the $1^{st}$ token in the set of short tokens and converts the token characters to ASCII values, step 1420. In step 1430, each ASCII value is converted to a sequential value SV (see FIG. 21). In step 1140, the sequential values of the token are mapped to one unique value UV (see FIG. 22). Step 1445 is insignificant in this example, as all unique values UV>0. However, as noted above, in case a character cannot be mapped to a sequential value SV (see "gaps" on the x-axis of FIG. 21, i.e. ASCII values 0-7, 14-31 and 127), the sequential value is preset to −184752. This SV value ensures that UV<0, hence such tokens are never added to the probabilistic data structure. The mapping may depend on the length of the token and the rule having produced the token. In case the bit array is free at position UV, this bit is set to 1 and the token is added to the probabilistic data structure, i.e. add the token to the index. In case the position UV in the bit array is already taken, there is no need to index this token again. The condition 1480 checks if another token is present.

If yes, the next token is loaded in step 1490. Otherwise, the deduplication of short tokens is ended. The ASCII values of the token characters, the sequential values, and the unique value per token are given in FIG. 23.

Consequently, out of the 59 short tokens, 29 unique tokens were indexed and 30 were not as they were identified as duplicates. E.g. the n-gram "ent" having UV=57883 was present 5 times and was indexed once.

Next, the deduplication of long tokens (step 1330 in FIG. 20) will be described (see also FIG. 25). Out of the 60 tokens, 9 tokens are long tokens; these are "authenticating", "client", "with", "clientid", "81195", "authentication", "client", "81195", and "failed".

In a first step 1500, a deduplication array—here an array of 8 elements having a width of 4-bytes, is initialized, see Table 72.

TABLE 72

| | Initialized deduplication array | | | | | | | |
|---|---|---|---|---|---|---|---|---|
| | | | | Index | | | | |
| | 0 | 1 | 2 | 3 | 4 | 5 | 6 | 7 |
| Value | 0 | 0 | 0 | 0 | 0 | 0 | 0 | 0 |

Next, the $1^{st}$ token is loaded (step 1510), and the hash token T # is calculated (step 1520). Instead, of loading the tokens subsequently, the hashing of all tokens can happen at one (see below).

| Nr. | Token T | Token hash T# |
|---|---|---|
| 1 | "authenticating" | 0x9e734018 |
| 2 | "client" | 0xc7440455 |
| 3 | "with" | 0x9890e20e |
| 4 | "clientid" | 0x7f98cd1c |
| 5 | "81195" | 0x627a5da0 |
| 6 | "authentication" | 0xfeb4c9fd |
| 7 | "client" | 0xc7440455 |
| 8 | "81195" | 0x627a5da0 |
| 9 | "failed" | 0x9e8ba377 |

For this hashing operation, it is preferred to use the same hashing algorithm as for calculating T # when adding it to the probabilistic data structure.

In step 1530, the value for POS, i.e. the token hash T # modulo the length of the deduplication array (here 8), is calculated (see below):

| Nr. | Token T | Token hash T# | POS = T# % 8 |
|---|---|---|---|
| 1 | "authenticating" | 0x9e734018 | 0 |
| 2 | "client" | 0xc7440455 | 5 |
| 3 | "with" | 0x9890e20e | 6 |
| 4 | "clientid" | 0x7f98cd1c | 4 |
| 5 | "81195" | 0x627a5da0 | 0 |
| 6 | "authentication" | 0xfeb4c9fd | 5 |
| 7 | "client" | 0xc7440455 | 5 |
| 8 | "81195" | 0x627a5da0 | 0 |
| 9 | "failed" | 0x9e8ba377 | 7 |

After this, processing continues with the $1^{st}$ token. In step 1540 it is checked whether the array at position POS is empty. As this is the case, the token hash T # of the token is written to the array at position POS, and T # is added to the probabilistic data structure. After this, the array is as follows:

TABLE 73

Intermediate status of deduplication array

| | Index | | | | | | |
|---|---|---|---|---|---|---|---|
| | 0 | 1 | 2 | 3 | 4 | 5 | 6 | 7 |
| Value | 0x9e734018 | 0 | 0 | 0 | 0 | 0 | 0 | 0 |

Processing continues with the $2^{nd}$ token. As the array is empty at position 5, the token hash T # of the $2^{nd}$ token is written to POS and T # is added to the probabilistic data structure. The same happens for tokens 3 and 4. After this, the status of the array is:

TABLE 74

Intermediate status of deduplication array

| | Index | | | | | | |
|---|---|---|---|---|---|---|---|
| | 0 | 1 | 2 | 3 | 4 | 5 | 6 | 7 |
| Value | 0x9e734018 | 0 | 0 | 0 | 0x7f98cd1c | 0xc7440455 | 0x9890e20e | 0 |

Processing continues with the $5^{th}$ token. As POS is 5, in step 1540 it is checked whether the array at position 5 is empty. This is not the case. Hence, in step 1570 the hash value at this position is read from the array and compared to T #. In step 1580 it is found that these values are inequal, hence T # is added to the probabilistic data structure. Step 1600 validates that this was not the last token and another token is processed in step 1610.

The processing of the $6^{th}$ token leads to an analogous result as the processing of the $5^{th}$ token. Hence, also 0xfeb4c9fd is indexed.

Processing continues with the $7^{th}$ token. As POS is 5, in step 1540 it is checked whether the array at position 5 is empty. This is not the case. Hence, in step 1570 the hash value at this position is read from the array and compared to T #. Unlike for the $5^{th}$ token, in step 1580 it is found that these values are equal, such that T # is detected as a duplicate and is not indexed again.

Processing continues with the $8^{th}$ token. As POS is 0, in step 1540 it is checked whether the array at position 0 is empty. This is not the case. Hence, in step 1570 the hash value at this position is read from the array and compared to T #. Step 1580 ascertains that these values are inequal, such that T # added to the probabilistic data structure.

Finally, the 9th and last token is processed. As POS is 7, in step 1540 it is found that the array at position 7 is empty. Therefore, T # is written to the array at position 7 and T # is indexed. The final status of the deduplication array is as follows:

TABLE 75

Final status of deduplication array

| | Index | | | | | | |
|---|---|---|---|---|---|---|---|
| | 0 | 1 | 2 | 3 | 4 | 5 | 6 | 7 |
| Value | 0x9e73-4018 | 0 | 0 | 0 | 0x7f98-cd1c | 0xc744-0455 | 0x9890-e20e | 0x9e8b-a3770 |

In summary, the deduplication of long tokens added all 7 unique tokens to the index, however, did not detect that token 8 "81195" is a duplicate of token 5. This is, however, not a problem since duplicates are not added twice to the probabilistic data structure (see above). However, the cost for removing duplicates at that stage is higher than at the deduplication stage.

As all 29 short tokens and all 7 long tokens have ID=0, i.e. originate from the batch 1015 having ID 0, adding the tokens to the probabilistic data structure yields the tables given in FIG. 26. In the column TokenHash of the table Token Map the token is printed in brackets next to the token hash. Note that TC=36 as all tokens point to the $1^{st}$ row of the entities list having ADD=0. Note further that 0xf4dbdf21 is the hash value for the ID "0".

Based on these data tables, querying the probabilistic data structure will be explained for different query types, such as phrase queries, prefix-, postfix- and infix-queries. The steps taken are depicted in FIG. 27.

Before going into the details, some background explanations are added. For each query type, our method determines the set of allowed and optimal tokens within the query term. A token is allowed, if it is guaranteed that it would have also been produced during data ingest, in case the query phrase is included in one of the added log lines. A token is optimal, if it is not included in another allowed, more selective token. E.g., if "trisberg@dynatrace" and "trisberg" both are allowed tokens, only "trisberg@dynatrace" is an optimal token. Every log line containing the token "trisberg@dynatrace" necessarily contains the token "trisberg", but the same isn't true the other way around. By querying optimal tokens only, the presented method avoids unnecessary computational overhead and IO operations, because no tokens are accessed which cannot influence the final result. More details are provided in the following examples.

First, phrase queries will be demonstrated. In a phrase query, the query term is tokenized, however, only base tokens and combined tokens are used for querying and all of these tokens are allowed.

Let us, for example, consider the query term "Fail". After inputting the query term QT in step 1800, e.g. via a keyboard or as an input parameter from another application, the query term is converted to lowercase characters, i.e. QT="fail". In step 1820 the lowercase term is tokenized into base tokens TB first, applying rules R1-R3. Taking into account the base tokens TB, combination tokens TC are derived from QT, applying rules R4-R5. This process generates only one base token "fail" and no combination tokens. Hence TB={"fail"} and TC={ }. The condition 1830 checks whether TC is empty, which is the case. Condition 1880 checks whether TB is empty, which is not the case. Step 1890 starts a loop over all tokens T in TB. For the 1$^{st}$ and only token T="fail" condition 1900 confirms that the token is allowed. In step 1910 the token T is hashed into the query token hash T #=0x86272b49 and after this, T # is looked up in the column TokenHash of the token map. As the token map does not contain T #, ID is set to an empty set. The empty set is added to IDS, such that IDS={{ }}. In step 1920 the token T is deducted from the TB yielding TB={ }. Step 1930 confirms that TB is empty and step 1935 outputs an empty set to the query customer, i.e. reporting that the original query term QT is not contained in the index.

Second, let us consider the query term "81195". As the query term does not contain any uppercase characters, decapitalization in step 1810 has no effect. In step 1820 the query term is tokenized into base tokens TB and combination tokens TC, yielding TB={"81195"} and TC={ }. The condition 1830 confirms that TC is empty and condition 1880 checks whether TB is empty. TB is not empty, as it contains "81195". Step 1890 starts a loop over all tokens T in TB. For the 1$^{st}$ and only token T="81195" condition 1900 confirms that the token is allowed. In step 1910 the token T is hashed into T #=0x627a5da0. After this, T # is looked up in the column TokenHash of the token map. As the token map contains T #, IDS=0 is read from the Entities List linked to the respective row in the Token Map. Hence, ID=0. ID is added to IDS, such that IDS={{0}}. In step 1920 the token T is deducted from TB yielding TB={ }. Step 1930 confirms that TB is empty and ID*=0 is output to the query customer, i.e. reporting that the original query term QT is contained at ID=0 in the index.

Next, so-called prefix queries will be demonstrated. In these queries, the last portion of the query term is disregarded when producing base- or combination tokens. However, the disregarded tokens are added to the query as n-grams. The computer executing the query may identify prefix queries by an appended "*" to the query term, e.g. "gate*" for "gates", "gate-keeper" . . . .

In a first example, let us consider the same query term "Fail" as above, however, used in a prefix query. The query term may be input to the query computer as "Fail*" (step 1800). The wildcard "*" appended to the query term indicates a prefix query, in which a sequence of any characters or no character can follow the query term, e.g. "Failure", "Failed" or "Fail". In step 1810 the query term is converted to lowercase characters, i.e. QT="fail". Next, the lowercase term is tokenized into base and combination tokens, yielding TB={"fail"} and TC={ }. Condition 1830 confirms that TC is empty. Condition 1880 checks whether TB is empty, which is not the case. Step 1890 starts a loop over all tokens T in TB. For the 1$^{st}$ and only token "fail" step 1900 decides that this token is not allowed as it is connected to a wildcard. Step 1930 confirms that TB is still not empty, thus TB is tokenized into n-grams TN in step 1940. Tokenizing TB by rule R6 produces two tokens, i.e. TN={"fai", "ail"}. Step 1950 starts a loop covering all tokens T in TN. In step 1960 the first token T="fai" is hashed to T # and queried. It is found that T # is present in the index at ID=0. Thus IDS={{0}}. Also the next token hash T # for T="ail" is present at ID=0. Adding ID to IDS yields IDS={{0}, {0}}. Step 1970 calculates the intersection between the sets contained in IDS, which is ID=0. Thus ID*=0 is output to the query customer in step 1970 indicating that the original query term is contained in the index at ID=0.

Next, so-called suffix (also known as postfix) queries will be demonstrated. In these queries, the first portion of the query term is disregarded when producing base- or combination tokens. However, the disregarded tokens are added to the query as n-grams.

In a first example, let us consider the query phrase "*195". Note that the first portion of the query phrase is a wildcard. The query term QT "195" is converted to lowercase characters in step 1810, i.e. QT="195". In step 1820 QT is tokenized into base and combination tokens, yielding TB={"195"} and TC={ }. The condition 1830 confirms that TC is empty. Condition 1880 checks whether TB is empty, which is not the case. In step 1890 a loop across all tokens T in TB is started. For the 1$^{st}$ and only token T="195" step 1900 holds that T is not allowed as it is connected to a wildcard. Step 1930 confirms that TB is not empty, such that TB is tokenized into n-grams TN in step 1940. Tokenizing TB yields TN={"195"}. The token T="195" is used for querying the probabilistic data structure in step 1860. After hashing T into T #=0x82df1f2c, the token hash is looked up in the token map. The query returns that T # and consequently T is contained in the index at ID=0. Thus, step 1970 outputs that the original query term is contained in the index at ID=0.

As the last query type, so-called infix queries will be demonstrated. In these queries, the first and the last portions of the query term are disregarded when producing base- or combination tokens. However, the disregarded tokens are added to the query as n-grams.

In a first example, let us consider the query phrase "*119*". Note that the first and the last portions of the query phrase are wildcards. In step 1810 the query term is converted to lowercase characters, i.e. QT="119". Next, the lowercase term is tokenized into base and combination tokens, yielding TB={"119"}, TC={ }. Condition 1830 confirms that TC is empty, whereas condition 1880 holds that TB is not empty. In step 1890 a loop across all tokens T in TB is started. For the 1$^{st}$ and only token T="119" step 1900 decides that T is not allowed as it is connected on both sides to wildcards. Decision 1930 holds that TB is not empty. In step 1940 TB is tokenized into n-grams TN, yielding TN={"119"}. This token T="119" is used for querying the probabilistic data structure. After hashing T into T #=0x43b0d90f, the token hash is looked up in the token map. The query returns that T # is contained in the index at ID=0. Thus, step 1970 outputs that the original QT is contained in the index at ID=0.

When tokenizing a query term, the following order is taken: After having derived the base tokens for the query term, it is checked whether the query term contains one or more combination tokens. If combination tokens aren't disregarded, these tokens are used for querying. Next, the first remainder of the query term, i.e. the query term minus the allowed combination tokens, is formed. For the first remainder, the one or more base tokens are checked. The allowed base tokens are used for querying. Finally, the second remainder of the query term, i.e. the first remainder minus the allowed base tokens, is formed. For the second remainder one or more n-gram tokens are formed. These n-grams are also used for querying.

As final examples, consider the log line L10 of Table 59, its tokens in Table 60, the status of the probabilistic data structure in FIG. 28, and the method steps in FIG. 27. Based on the status of the probabilistic data structure, assume that we want to do a phrase query for "trisberg@dynatrace" first and a suffix query for the same query term second.

Let us start with the phrase query: The query term QT "trisberg@dynatrace" is input in step 1800 to the query computer. In step 1810, the query term is decapitalized. As QT does not contain any uppercase characters, QT does not change. In step 1820 the base and combination tokens for QT are derived, yielding TB={"trisberg", "@", "dynatrace"}, and TC={"trisberg@dynatrace"}. Step 1830 checks whether TC is empty, which is not the case. In step 1840 a loop over all tokens T in TC is started and for each token it is checked whether the token is allowed. As we have just one token and we are dealing with a phrase query, the token T="trisberg@dynatrace" is allowed. In step 1853, the token T is hashed to T #=0xeacbcb6a and the probabilistic data structure is queried for T #. As the respective row in the Token Map points to address 0 in the Entities List, ID=0 is returned. At last in step 1853, ID=0 is added to IDS, which was initialized to an empty set IDS={ } at start. After adding ID to IDS, IDS={{0}}. In step 1855, the token T is subtracted from TC and from TB, yielding TC={ } and TB={ }. When subtracting T form TB, the base tokens comprised in T are subtracted from the set of tokens TB. Step 1860 checks whether bother TC and TB are empty, which is the case. Consequently, step 1865 is executed and ID*=0 is output to the query customer.

Next, the same query term QT "trisberg@dynatrace" will be used in a suffix query. The input to a computer performing the query could be "*trisberg@dynatrace". In step 1810, the query term is decapitalized. As QT does not contain any uppercase characters, QT is not changed. Step 1820 derives the base and combination tokens for QT, yielding TB={"trisberg", "@", "dynatrace"}, and TC= {"trisberg@dynatrace"}. Step 1830 checks whether TC is empty, which is not the case. In step 1840 a loop over all tokens T in TC is started and in step 1850 for each token it is checked whether it is allowed. As we have just one token and we are dealing with a suffix query, the token T={"trisberg@dynatrace"} is not allowed. Step 1860 holds that neither TB nor TC are empty. Step 1880 confirms that TB is not empty, and step 1890 starts a loop across all tokens T in TB. Step 1900 finds that the $1^{st}$ token "trisberg" is not allowed since it is connected to the wildcard. Therefore, the next token is processed next. Hashing the $2^{nd}$ token T="@" and looking it up yields that ID={0}. In step 1920, the token T is deducted from TB, yielding TB={"trisberg", "dynatrace"}. Also the $3^{rd}$ token "dynatrace" yields ID={0}, such that IDS={{0}, {0}}. Deducting T from TB yields TB={"trisberg"}. Step 1930 confirms that TB is not empty, thus in step 1940 TB is tokenized into n-grams TN. These n-gram tokens are TN={"tri", "ris" isb", "sbe", "ber", "erg"}. Step 1950 starts a loop across all tokens T in TN. In step 1860 the respective token T is hashed, the hash value is looked up in the index, and the set ID is added to IDS. After all this, IDS comprises 8 times the set {0}. Step 1970 calculates the intersection of the sets contained in IDS, which is ID*=0. At the end, ID=0 is output to the query customer indicating that the original query term is contained at ID=0 in the index.

Note that if a sub-query returns an empty set, the execution can be stopped outputting an empty set to the query customer. As such it is no longer necessary to continue the query.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways.

What is claimed is:

1. A computer-implemented method for storing log data generated in a distributed computing environment, comprising:

receiving a log line from a given storage entity;

applying a first tokenization rule to the log line to create a plurality of base tokens, where each base token is a sequence of successive characters in the log line having same type;

applying a second tokenization rule to the log line to create a plurality of combination tokens, where each combination token is comprised of two or more base tokens appended together;

applying a third tokenization rule to the log line to create a plurality of n-gram tokens, where each n-gram token is an n-gram derived from a base token in the plurality of base tokens;

combining tokens from the plurality of base tokens, the plurality of combination tokens and the plurality of n-gram tokens to form a set of tokens;

for each token in the set of tokens, storing a given token by applying a hash function to the given token to generate a hash value, where the given token is associated with the given storage entity containing the log line;

updating a listing of storage entities with the given storage entity, where entries in the listing of storage entities are configured to identify more than one storage entity where the log line was stored and each entry in the listing of storage entities specifies a unique set of storage entities; and storing the hash value, along with an address, in a token map table of a probabilistic data structure, where the address maps the hash value to an entry in the listing of storage entities.

2. The method of claim 1 where the first tokenization rule defines a base token as one of a sequence of successive alphanumeric characters in the log line; a sequence of successive separator characters in the log line; or a sequence of successive characters outside of 7-bit ASCII space.

3. The method of claim 1 wherein the second tokenization rule defines a combination token as two base tokens comprised of alphanumeric characters and connected by a separator character.

4. The method of claim 1 wherein the second tokenization rule defines a combination token as three base tokens comprised of alphanumeric characters connected by a dot.

5. The method of claim 1 wherein each entry in the listing of storage entities further includes a counter, a list of storage entities and a hash value for the list of storage entities, where the counter indicates the number of entries in the probabilistic data structure mapped to a given entry in the listing of storage entities.

6. The method of claim 5 wherein updating the listing of storage entities with the given storage entity further comprises determining whether the hash value is stored in the probabilistic data structure;

retrieving an entry in the listing of storage entities corresponding to the hash value, where the entry is retrieved in response to a determination that the hash value is stored in the probabilistic data structure;

from the retrieved entry, determining whether the given storage entity is in the list of storage entries;

incrementing the counter by one in the retrieved entry in response to a determination that the given storage entity is contained in the list of storage entities; and creating a new entry in the listing of storage entities and setting the counter in the new entry to one in response to a determination that the given storage entity is absent from the list of storage entities.

7. The method of claim 6 wherein creating a new entry in the listing of storage entities includes generating a hash value for the list of storage entities using a commutative hash function.

8. The method of claim 6 wherein updating the listing of storage entities with the given storage entity further comprises adding an entry into the probabilistic data structure for the hash value, where the entry is added in response to a determination that the hash value is absent from the probabilistic data structure.

9. The method of claim 5 further comprises creating a lookup table having an index, where each entry in the lookup table includes a hash value for the list of storage entities and each entry corresponds to an entry in the listing of storage entities.

10. The method of claim 9 wherein each entry in the lookup table includes an address, where the address maps the hash value of the entry to an entry in the listing of storage entities.

* * * * *